(12) United States Patent
Farahmand

(10) Patent No.: US 10,948,312 B2
(45) Date of Patent: Mar. 16, 2021

(54) ENVIRONMENTAL MONITORING SYSTEMS, METHODS AND MEDIA

(71) Applicant: Aquatic Informatics Inc., Vancouver (CA)

(72) Inventor: Touraj Farahmand, Burnaby (CA)

(73) Assignee: Aquatic Informatics Inc.

( * ) Notice: Subject to any disclaimer, the term of this patent is extended or adjusted under 35 U.S.C. 154(b) by 490 days.

(21) Appl. No.: 15/778,841

(22) PCT Filed: Nov. 24, 2016

(86) PCT No.: PCT/CA2016/000290
§ 371 (c)(1),
(2) Date: May 24, 2018

(87) PCT Pub. No.: WO2017/088040
PCT Pub. Date: Jun. 1, 2017

(65) Prior Publication Data
US 2018/0348013 A1    Dec. 6, 2018

Related U.S. Application Data

(60) Provisional application No. 62/260,224, filed on Nov. 25, 2015.

(51) Int. Cl.
*G01V 3/00*       (2006.01)
*G01D 3/032*      (2006.01)
(Continued)

(52) U.S. Cl.
CPC ............... *G01D 3/032* (2013.01); *E02B 3/00* (2013.01); *E02B 9/00* (2013.01); *G01F 9/00* (2013.01);
(Continued)

(58) Field of Classification Search
CPC ..................................................... G01D 3/032
(Continued)

(56) References Cited

U.S. PATENT DOCUMENTS 8,825,456 B2    9/2014  Vasudevan et al.
2008/0168339 A1  7/2008  Hudson et al.
(Continued)

FOREIGN PATENT DOCUMENTS

CN         102693215 A    9/2012

OTHER PUBLICATIONS

Westerberg et al. "Stage-discharge uncertainty derived with a non-stationary rating curve in the Choluteca River, Honduras", Hydrological Processes, vol. 25, No. 4, pp. 603-613 (Feb. 15, 2011).
(Continued)

*Primary Examiner* — Aditya S Bhat
(74) *Attorney, Agent, or Firm* — BakerHostetler

(57) ABSTRACT

A system for monitoring a physical environmental property having non-stationary heteroscedastic noise is disclosed. A processor receives physical environmental measurement data, and constructs a combined input and output noise levels matrix containing output noise terms associated with the physical environmental property and input noise terms associated with the at least one independent variable. Using the combined input and output noise levels matrix, the processor constructs a main Gaussian Processes (GP) model for the physical environmental property and its non-stationary heteroscedastic noise. The processor generates and co-operates with the output device to perceptibly output a predictive probabilistic representation of the environmental property, using the main GP model. The predictive probabilistic representation includes a respective range of possible values of the physical environmental property for each respective value of the independent variable(s), the range
(Continued)

reflecting both the input noise terms and the output noise terms.

20 Claims, 15 Drawing Sheets

(51) Int. Cl.
   *G01F 9/00* (2006.01)
   *E02B 9/00* (2006.01)
   *E02B 3/00* (2006.01)
   *G01F 23/00* (2006.01)
   *G06F 17/18* (2006.01)
   *G06N 7/00* (2006.01)
   *G01F 1/00* (2006.01)

(52) U.S. Cl.
   CPC .......... *G01F 23/00* (2013.01); *G01F 23/0061* (2013.01); *G06F 17/18* (2013.01); *G06N 7/005* (2013.01); *G01F 1/002* (2013.01)

(58) Field of Classification Search
   USPC .......................................................... 702/2
   See application file for complete search history.

(56) References Cited

U.S. PATENT DOCUMENTS

| | | | |
|---|---|---|---|
| 2009/0150126 A1 | 6/2009 | Sellamanickam et al. | |
| 2010/0174514 A1* | 7/2010 | Melkumyan ............ | G06F 17/18 703/2 |
| 2016/0080908 A1* | 3/2016 | Julian ................... | H04L 41/142 455/457 |

OTHER PUBLICATIONS

Di Baldassarre et al. "Uncertainty in river discharge observations: a quantitative analysis", Hydrology and Earth System Sciences, vol. 13, pp. 913-921 (2009).
McMillan et al. "Impacts of uncertain river flow data on rainfall-runoff model calibration and discharge predictions", Hydrological Processes, vol. 24, No. 10, pp. 1270-1284 (May 15, 2010).
Rottman et al. "Learning Non-stationary System Dynamics Online using Gaussian Processes", Proceedings of the 32nd DAGM Conference on Pattern Recognition, Darmstadt, Germany, Sep. 22-24, 2010, 10 pages.
McHutchon et al. "Gaussian Process Training with Input Noise", NIPS '11, Proceedings of the 24th International Conference on Neural Information Processing Systems, Granada, Spain, Dec. 12-15, 2011, 9 pages.
Kersting et al. "Most Likely Heteroscedastic Gaussian Process Regression", ICML '07, Proceedings of the 24th International Conference on Machine Learning, Corvalis, OR, USA, Jun. 20-24, 2007, 8 pages.
Goldberg et al. "Regression with Input-dependent Noise: A Gaussian Process Treatment", NIPS '97, Proceedings of the 1997 Conference on Advances in Neural Information Processing Systems, Denver, CO, USA, Dec. 1-6, 1997, pp. 493-499.
International Patent Application No. PCT/CA2016/000290; Int'l Search Report and the Written Opinion; dated Mar. 28, 2017; 14 pages.
Canada Patent Application No. 3,006,333; Office Action; dated May 9, 2019; 4 pages.
Osborne et al.; "Prediction and Fault Detection of Environmental Signals with Uncharacterised Faults"; Proceedings of the 26th AAAI Conf. on Artificial Intelligence; 2012; p. 349-355.
Osborne et al.; "A Machine Learning Approach to Pattern Detection and Prediction for Environmental Monitoring and Water Sustainability"; Workshop on Machine Learning Global Challenges; 2011; 6 pages.
European Patent Application No. 16867470.3; Extend Search Report; dated Nov. 2, 2018; 14 pages.

\* cited by examiner

ENVIRONMENTAL MONITORING SYSTEMS, METHODS AND MEDIA

CROSS-REFERENCE TO RELATED APPLICATIONS

This application is the National Stage Application of International Patent Application No. PCT/CA2016/000290, filed Nov. 24, 2016, which claims the benefit of priority from U.S. Patent Application No. 62/260,224, filed on Nov. 25, 2015 the entire contents of both of which are incorporated herein by reference.

TECHNICAL FIELD

The present disclosure generally relates to computerized environmental monitoring and modeling systems, computer-implemented environmental monitoring and modeling methods and related computer-readable media.

More particularly, illustrative embodiments of the present disclosure include computerized systems for automated monitoring and analysis of environmental measurements that are degraded by noise or uncertainty which may be unknown and which may change over time.

BACKGROUND

In this specification, the term "environment" refers to Earth's natural environment. Thus, the term "environmental data" refers generally to data representing manual or automated measurements of one or more properties of Earth's natural environment, such as hydrological data representing water quantity such as water levels ("stage") and volumetric flow rates ("discharge"), or water quality such as turbidity and dissolved oxygen, for example.

The acquisition, analysis and practical usage of environmental data pose special challenges not typically encountered in other technical fields. Environmental data are typically acquired in two main ways: continuous or periodic acquisition, and discrete observation.

Continuous or periodic data are acquired by automated sensors that are located at stations in the environment, such as pressure transducers to measure water level or acoustic velocity meters to measure water velocity in waterways such as rivers or streams, for example. The remote sensors may wirelessly transmit their acquired data to a centralized database either continuously or periodically.

Discrete observations are typically manually acquired by an environmental scientist or other technician during a field visit to an environmental site being monitored, and may be either uploaded to the centralized database from the site, or may be merely recorded at the site in order to be manually uploaded into the centralized database after the technician has returned from the field. Discrete observations tend to be unevenly spaced in time, as the schedule of field visits is often adaptive to environmental conditions.

Water policy, planning, management, engineering design and environmental assessment decisions that depend on environmental data are complicated by uncertainties inherent in the methods of environmental monitoring. Uncertainties may result in degraded confidence in data that may be reliable, and trust in data that are not reliable. Uncertainty often results in delayed and/or tentative decision making rather than timely and confident decisions. At least some of these problems relate to the fact that environmental data generally tends to suffer from noise (uncertainty) that is non-stationary (time-varying), heteroscedastic (unequal variation of noise across the whole range of values) and typically unquantified. For example, sensors can suffer from inherent random measurement errors, systematic errors such as fouling drift resulting from ongoing exposure to the environment, or even data communication errors. Systematic errors in continuous data records are controlled by maintenance done during field visits, detected by comparison against manual observations during the field visit, and corrected by calibration against the field visit observations. However, the manual observations made during field visits are themselves subject to both random and systematic uncertainty. Discrete observations at a given environmental site could comprise data points from a sparse number of field visits spread over many years, potentially taken by different technicians using different techniques, potentially using different types of measurement devices with different inherent random measurement errors, and typically without any quantification of those inherent random measurement errors. In most cases the uncertainty of field visit observations is unknown. The uncertainty of field visit observations propagates to the uncertainty profile of the continuous data and the resultant uncertainty on continuous data is again propagated to, and compounded by, the modeling uncertainty of all information that is derived from the continuous data. In other words, when a given imperfect mathematical model is used to describe a real-world correlation between an independent variable input and a dependent variable output, the imperfection of the model may introduce further modeling or derivation errors beyond the measurement errors associated with the input measurement.

As stated above, environmental data drives many decisions needed for a vibrant economy, security from water threats, environmental health, and a robust physical infrastructure for community development. For example, water flow data is typically used by a water agency to calibrate, initialize and execute flood forecasting models to decide whether to evacuate residents from a flood plain near a river. Similarly, a hydroelectric power generation company may use water level and flow data to decide whether to open a spillway in order to maintain the downstream water level above a minimum level necessary for fish survival. Without uncertainty quantification, entities such as the water agencies and the hydropower companies in the above examples would have to effectively make educated or even arbitrary guesses as to their own acceptable safety margins, but could suffer serious adverse consequences if those safety margins are either too large or too small. If the adopted safety margin is larger than the uncertainty underlying the data, then the agency would tend to find itself unnecessarily evacuating residents from the flood plain on a routine basis even though no flooding was actually occurring, and likewise, the hydropower company could find itself unnecessarily opening the spillway and thereby wasting potential energy even though the downstream water level had not yet reached its minimum level. Conversely, if the adopted safety margin is smaller than the uncertainty underlying the environmental data, then the water agency may fail to evacuate even in situations where flooding does in fact occur, potentially resulting in a loss of human life, and likewise, the hydropower company may fail to open the spillway even in situations where the downstream water level drops below its minimum, potentially violating environmental compliance levels and adversely affecting aquatic life.

The above difficulties become magnified for "extreme" data points for which the available environmental discrete data tends to be much more sparse, and hence more uncertain. For example, for a given waterway, there may be a great deal of available environmental discrete observations within a typical range that prevails most of the time, but there might be very little data available for atypical extreme high and low water level conditions. The smaller numbers of measured data points within these extreme high and extreme low ranges result in increased uncertainty. In the hypothetical examples given above, even if the water agency and hydropower company were to adopt safety margins larger than the uncertainty associated with the typical range, but smaller than the uncertainty for atypical extreme highs and lows outside the typical range, then the catastrophic consequences discussed above may nevertheless result.

Another disadvantage relates to the burdensome task of manually analyzing and qualitatively assessing the quality of environmental data for which quantified uncertainty information is unavailable. For example, hydrologists typically analyze and grade (label) their data before they publicly release it, labeling each data point as "good" or "bad," which may for example depend on whether the data point satisfies predefined expectations or constraints that the hydrologist associates with reliability of the data (e.g. a pH reading of 0 or 14 may be considered a "bad" data point for a river, on the assumption or expectation that the river is neither an extremely strong acid nor an extremely strong base.) Significant expenditures of time and effort are typically required to massage, grade and publish (release) data, and hydrologists are typically reluctant to publicly release their raw data until this laborious process has been completed. Such delays in public accessibility of data pose difficulties for those who require access to the data, for critical decision-making or for other reasons.

Another problem associated with environmental data is the fact that real-world correlations can change over time. For example, if a particular mathematical model accurately described the relationship between measured water level ("stage") and flow ("discharge") at a particular location in the Fraser River in 1965, that model may no longer be accurate in 2015, due to physical changes in the cross-sectional area and shape of the river caused by accretion or erosion of sediment, growth or decay of vegetation, and other natural phenomena, for example. Conventional hydrological analysis results in the generation of a two-dimensional "rating curve" that correlates stage to discharge. However, the conventional rating curve is not a function of time, and will therefore begin to suffer increasing errors with the passage of time, until eventually hydrologists decide to shift the current rating curve or completely abandon it and build a new one from more recent data; the ongoing re-evaluation and re-building of rating curves are manual and often slow processes requiring expert judgment.

Environmental data also presents the technical difficulty that it is difficult to accurately model. Unlike typical industrial processes, which are most often linear and stationary, the underlying physical processes for environmental data are typically non-linear, non-stationary (time-varying), complex and can well be described as chaotic processes. Both independent (input) and dependent (output) observations used for modeling are typically degraded by heteroscedastic noise. In fact, the dependent variable uncertainty may change with time and also with the magnitude of the independent variables. Even the continuous or periodic data used in real-time operation (after training) as input feed to the model, also tend to be degraded by non-stationary noise.

These real-world complications tend to cause technical problems for existing statistical and Machine-Learning (ML) systems that attempt to model such environmental processes, which in turn exacerbate the above-noted difficulties that result from insufficient availability of uncertainty information. For example, although standard ML approaches for Gaussian processes (GP) can be useful for modeling data in general, standard GP approaches tend to suffer from at least two significant obstacles to modeling uncertainty information for environmental data, in respect of both output noise and input noise. With respect to output noise, standard GP approaches usually assume that the output noise associated with the dependent variable is fixed and stationary, but these assumptions are not typically valid for environmental data. With respect to input noise, standard GP approaches are generally unable to propagate input uncertainties for environmental data, for technical reasons, namely, that such propagation would require the Machine-Learning system to solve an analytically intractable differential equation, which cannot be solved using any combination of the predefined native instructions of a computer processor's instruction set architecture. In this regard, in a standard GP approach involving Bayesian inference, input noise propagation would require evaluation of the derivative (slope) of the mean of the posterior distribution at all training points, but the derivative of the posterior mean tends to be an analytically intractable differential equation. Some prior GP approaches, outside of the field of environmental monitoring, have attempted to circumvent these problems to account for input-dependent noise, i.e. noise associated with the independent variable(s), through certain assumptions and simplifications. For example, one approach uses separate GPs, comprising one noise-free GP and a separate GP to model the input noise, but this approach merely effectively considers only input noise, and does not involve any separate consideration of the output noise associated with the dependent variable representing the physical environmental property being ultimately measured; rather, the resulting noise term consists solely of the propagated input noise. Another prior approach assumes no input noise and assumes output noise to depend upon input signal level, to model output signal heteroscedastic noise behavior, while yet another prior approach considers only input noise but fictitiously assumes the input and output noise variances to be identical, and thus both of these approaches fail to overcome the output noise difficulties mentioned above. More generally, existing GP solutions are not generally capable of simultaneous consideration of both the input noise associate with the independent variable(s) and the output noise associated with the dependent variable(s).

SUMMARY

One illustrative embodiment provides a system for monitoring a physical environmental property that has non-stationary heteroscedastic noise. The system includes a database defined in a storage medium and configured to receive and store physical environmental measurement data comprising measured values of: a dependent variable which represents the physical environmental property; and at least one independent variable with which the physical environmental property is correlated. The system further includes a processor in communication with the storage medium, a communications interface in communication with the processor, an output device in communication with the processor, and a computer-readable medium in communication with the processor. The computer-readable medium stores executable instructions that configure the processor to execute a method which includes the processor receiving the physical environmental measurement data, and the processor constructing a combined input and output noise levels matrix containing output noise terms associated with the physical environmental property and input noise terms associated with the at least one independent variable with which the physical environmental property is correlated. The method further includes, using the combined input and output noise levels matrix, the processor constructing a main Gaussian Processes (GP) model that models the physical environmental property and its non-stationary heteroscedastic noise. The method further includes the processor generating and co-operating with the output device to perceptibly output a predictive probabilistic representation of the environmental property, using the main GP model, wherein the predictive probabilistic representation includes a respective range of possible values of the physical environmental property for each respective value of the at least one independent variable, the range of possible values reflecting both the input noise terms associated with the independent variable and the output noise terms associated with the physical environmental property.

Advantageously, such embodiments tend to provide significant enhancements to environmental measurements, thereby allowing for significantly better decision-making, resulting in significantly greater operational efficiency of any system relying upon such measurements. By generating and perceptibly outputting a predictive probabilistic representation a respective range of possible values of the physical environmental property for each respective value of the at least one independent variable, with each such range of possible values reflecting both the input noise terms associated with the independent variable and the output noise terms associated with the physical environmental property, the uncertainty associated with the dependent observed physical environmental property has been reliably quantified in the form of its respective range of possible values for each respective value of the independent variable(s). Moreover, this quantification of uncertainty is achieved without necessarily requiring any quantified uncertainty information for the independent observed physical environmental property. Such embodiments tend to overcome the numerous difficulties discussed above in connection with the currently prevailing lack of uncertainty quantification for environmental data. Decision-making entities, such as the government agencies and the hydroelectric power companies of the preceding examples, can thus proceed to make more reliable, informed decisions based on uncertainty that has been automatically quantified for them, enabling them to quantitatively understand the risk that the actual water level may vary from its expected value by more than a critical amount. By adopting safety margins that more closely reflect the quantified uncertainty, such entities can improve their operational efficiency by reducing the occurrence and cost of unnecessary wasteful precautionary measures that could result from unduly large safety margins, and can conversely reduce the likelihood of catastrophic harm to humans or animals that could result from unduly small safety margins.

Moreover, because a respective predictive probabilistic representation is generated for each respective value of the at least one independent variable(s), the system effectively generates "per-point" probabilistic representations of the dependent physical property; in other words, such an embodiment can generate a respective probability distribution function for each possible input data point (i.e. for each possible combination of independent variable values), and the probability distribution function for each such input point may be expressed in terms of moments of the probability distribution for the dependent variable, such as its expected value and variance. Advantageously, such embodiments tend to highlight the degree to which the variance itself varies over time and over the range of possible independent variable values: for example, the quantified variance tends to be larger near the extreme highs and extreme lows of the independent physical property, for which the available data is typically sparser. Advantageously, therefore, such "per point" quantification of uncertainty allows decision-makers, such as those from the above examples, to avoid the conventional pit-fall of adopting safety margins which, although larger than the underlying uncertainty associated with typical or commonly observed values of the independent variable(s), may actually be smaller than the uncertainty associated with the more rarely observed extreme high or extreme low values of the independent variable(s). Thus, such decision-makers could advantageously avoid catastrophic harm that could potentially be caused to humans or animals if a safety threshold were to be unwittingly exceeded because the unknown uncertainty had been underestimated in the vicinity of extreme highs or lows.

As a further advantage of such embodiments, the above system can solve the problems that result from the conventional use of subjective manual grading and qualitative labeling of data points to represent the uncertainty on data, by instead associating a quantitative probabilistic representation with each input data point. Thus, such embodiments do not merely automate the previously manual task of labeling data, but rather, they replace that subjective manual task with an entirely different objective methodology which advantageously achieves repeatability and consistency: in contrast with conventional approaches whereby hydrologists used their own subjective insights and approaches to qualitatively grade and label their data, such embodiments instead employ an objective approach to express a quantitative measure of uncertainty, in the form of the predictive probabilistic representation for each input point. Moreover, the grading of the data also tends to affect the resulting "rating curve" representing the functional relationship between the dependent and independent variable(s), since different hydrologists would tend to reach different conclusions as to which data points should be excluded from the rating curve model as outliers or "bad" data points. Thus, whereas the conventional approach typically results in different hydrologists producing slightly different "rating curves" based on the same underlying data due to differences in the subjective approaches of the various hydrologists, such embodiments of the present disclosure avoid these difficulties and always arrive at the same rating curve if modeling the same underlying set of measurements.

In such embodiments, significant advantages also flow from the creation of the combined input and output noise levels matrix containing both input noise terms associated with the independent variable(s) and output noise terms associated with the physical environmental property, and more particularly from the resulting fact that the respective predictive probabilistic representations of the ranges of possible values of the physical environmental property reflect both the input noise terms and output noise terms. It will be recalled that conventional Gaussian processes approaches tend to suffer from output noise assumptions that are not valid for environmental data, from a general inability to propagate input uncertainty without encountering analytically intractable differential equations, from a related inability to circumvent the latter problem and propagate input noise without aggravating the former problem by imposing invalid assumptions or constraints for output noise, and more generally from an inability to simultaneously consider both the input noise associated with the independent variable(s) and the output noise associated with the physical environmental property. In contrast, the method of the above embodiment, and in particular the creation of the combined input and output noise levels matrix that is used to construct the main GP model, allows the environmental property to be modeled with consideration of both output noise and input noise, while avoiding intractability and other technical difficulties associated with conventional GP approaches. Consequently, such a method solves a first technical problem with the operation of the computer processor that is being used to model and monitor the physical environmental property, by enabling a tractable solution to be obtained using a combination of native instructions from among the processor's predefined instruction set architecture. In addition, it has been found that such a method tends to converge quickly in a small number of iterations, thereby providing a further technical advantage of improving the operational efficiency of the processor by reducing the number of floating-point operations that the processor must perform to arrive at a solution. This latter technical advantage is particularly useful for processing the large data sets that tend to typify environmental data.

The predictive probabilistic representation may include, for each respective value of the at least one independent variable, an expected value of the physical environmental property and an associated variance. The output device may include a video display device or a printer, and the instructions that configure the processor to co-operate with the output device may include instructions that configure the processor to co-operate with the video display device or the printer to output a graphical representation of an expected value curve and a heteroscedastic combined variance band that reflects both the input noise terms and the output noise terms. In such embodiments, the expected value curve includes the expected values of the physical environmental property, the heteroscedastic combined variance band extends above and below the expected value curve, and a height of the heteroscedastic combined variance band for a particular expected value is proportional to the associated variance for the particular expected value.

The instructions may further configure the processor to co-operate with the output device to generate and perceptibly output a time-varying rating surface or hypersurface reflecting the evolution over time of a relationship between the dependent observed physical environmental property and the at least one independent observed physical environmental property. It will be recalled that the conventional practice is to formulate a time-invariant "rating curve," and to later abandon it and formulate a new rating curve once it is eventually discovered that the original rating curve has become outdated and is no longer valid due to environmental changes that have occurred over time. In contrast, with such embodiments it will no longer be necessary to continue to use an outdated model, as such embodiments can automatically reveal the evolution over time of the rating curve relationship. Advantageously, in such embodiments the system may automatically model the evolution over time of the relationship between the independent and dependent environmental properties, thereby avoiding the conventional need to intuitively know when a two-dimensional stationary time-invariant rating curve has become obsolete and needs to be shifted or rebuilt.

More generally, the instructions may further configure the processor to co-operate with the output device to generate and perceptibly output a rating hypersurface comprising an expected value of the dependent observed physical environmental property for each possible combination of values of the at least one independent variable. As a particular example, the rating surface or hypersurface may include a time-varying three-dimensional rating surface including an expected value of the flow rate for each combination of values of stage and time.

The instructions may further configure the processor to receive a new value of the at least one independent variable through the communications interface, and to then use the main GP model to generate, and cause the output device to perceptibly output, a predictive probabilistic representation of a range of possible values of the dependent observed physical environmental property corresponding to the new value of the at least one independent variable. The predictive probabilistic representation has moments including an expected value of the dependent variable and a variance. Thus, as new environmental measurements of the independent variable(s) are received from remote environmental sensors, the system automatically uses the main GP model to express a corresponding output measurement of the physical environmental property, in terms of both its expected value and variance.

The instructions may further configure the processor to receive new field data including at least one new discrete field observation of the at least one independent variable and of the dependent variable, and to re-generate the combined input and output noise levels matrix and the main GP model to take into account the new field data. Advantageously, therefore, as new direct measurements of the dependent variable representing the physical environmental property become available, the system effectively re-generates its model to account for the new observations.

The instructions that configure the processor to construct the main GP model may include instructions that configure the processor to use a composite covariance function to generate an environmentally adapted covariance matrix corresponding to the values of the at least one independent variable. The composite covariance function may include at least one stationary term including a rational quadratic term, and may further include at least one non-stationary term.

Advantageously in such embodiments, by using a composite covariance function that includes at least a non-stationary term in combination with a stationary term that includes a rational quadratic term, the system can generate an environmentally adapted covariance matrix that best describes the prior knowledge for the shape and curvature of the rating curve before observing any data, thereby achieving more accurate and efficient modeling of the environmental data, especially for environmental properties whose values and associated noise can both vary over time. The inclusion of a non-stationary term, such as an exponential or linear term for example, tends to more accurately model global changes over larger time-scales and longer-term trends in rating curves, while the inclusion of the stationary term tends to more accurately model local changes (over small time scales). Such a composite covariance function and its resulting covariance matrix tend to be particularly advantageous and well adapted for modeling numerous types of environmental data, such as the stage-discharge relationship of a waterway, or higher-dimensional relationships between discharge and multiple independent observed physical environmental properties such as stage and index velocity, for example. In addition, the use of such an environmentally adapted composite covariance matrix tends to reduce the number of iterations to optimize the associated hyperparameters, thereby providing the advantageous technical effect of reducing the number of floating point operations that the processor must complete in order to arrive at a solution.

The at least one non-stationary term may include a linear term, and may further include an exponential term. In this regard, the inclusion of an exponential term, of the form, $a(x+b)^c$, for example, tends to be useful for basic modeling of a range of environmental data types including water channel stage-discharge relationship, for example. In particular, such a combination of terms tends to be particularly advantageous for embodiments in which the physical environmental data includes hydrological data relating to a waterway and the at least one independent variable includes stage and time, wherein the stage represents a measured water level of the waterway and the time represents a time at which the water level was measured, and wherein the dependent variable comprises a flow rate of the waterway at the time. In such embodiments, the combination of the rational quadratic term with the exponential term tends to provide greater flexibility to accommodate breakpoints across the channel and possible nonlinear changes in the time dimension resulting from environmental changes. The inclusion of a linear term, in combination with the other terms, tends to allow for more accurate results at extreme high and extreme low regions where there are just a few or even no manual observations and the model needs to rely on prior knowledge in prediction.

The instructions may further configure the processor to automatically select the composite covariance function from among a plurality of predefined composite covariance functions, each of the predefined composite covariance functions corresponding to a particular respective observed physical environmental property. Advantageously therefore, the user need not possess specialized expertise as to the form of composite covariance function that is best adapted to the specific type of environmental data being measured; instead, the processor may automatically select the predefined composite covariance function that corresponds to the particular type of data being measured (e.g. stage, or turbidity, etc.).

The instructions may further configure the processor to continuously or periodically receive new values of the at least one independent variable, the new values including new environmental sensor data inputs, each of the inputs including at least a new stage value and a new measurement time value, and to co-operate with the output device to generate and perceptibly output a new expected flow rate value and a new flow rate variance value corresponding to the new stage and new measurement time values.

The instructions that configure the processor to construct the combined input and output noise levels matrix may include instructions that configure the processor to construct a simplified GP model representing the environmental property with stationary noise independent of inputs, and to use the simplified GP model to construct a noise GP model representing noise levels associated with the environmental property. The instructions may further configure the processor to use the simplified GP model and the noise GP model to construct the main GP model.

The instructions that configure the processor to construct the simplified GP model may include instructions that configure the processor to estimate hyperparameters of the simplified GP model.

The instructions that configure the processor to construct the noise GP model may include instructions that configure the processor to generate an average value of the simplified GP model for each of a plurality of training points, to generate an empirical error term of the simplified GP model for at least some of the plurality of training points, to construct a training data set for the noise GP model using the empirical error terms, and to estimate hyperparameters of the noise GP model.

The instructions that configure the processor to construct the main GP model may include instructions that configure the processor to generate output noise levels for the main GP model using the noise GP model. The instructions that configure the processor to construct the combined input and output noise levels matrix may include instructions that configure the processor to generate the combined input and output noise levels matrix for the main GP model using the generated output noise levels. The instructions that configure the processor to construct the main GP model may include instructions that configure the processor to estimate hyperparameters of the main GP model using the combined input and output noise levels matrix.

The output device may include a display device and the instructions may configure the processor to cause the display device to display the predictive probabilistic representation. Alternatively or in addition, the output device may include a printer and the instructions may configure the processor to cause the printer to print the predictive probabilistic representation.

The system may further include one or more remote sensors disposed in the environment and configured to measure at least the at least one independent variable, and the instructions that configure the processor to receive the physical environmental measurement data may include instructions that configure the processor to receive measurement signals transmitted by either the one or more remote sensors or by an associated remote data logger disposed in the environment in proximity to the remote sensors.

For example, the one or more remote sensors may include one or more stage sensors disposed in a waterway, and the instructions that configure the processor to receive the measurement signals may include instructions that configure the processor to receive at least time and stage values representing a water level of a waterway as measured by the one or more stage sensors disposed in the waterway.

The processor may include a hardware processor structurally configured to perform only a predefined set of native operations in response to receiving corresponding instructions selected from a predefined instruction set architecture of the processor. The instructions that configure the processor to receive the physical environmental measurement data, the instructions that configure the processor to construct the combined input and output noise levels matrix, the instructions that configure the processor to construct the main GP model, and the instructions that configure the processor to co-operate with the output device to generate and perceptibly output the predictive probabilistic representation, may respectively include a first set, a second set, a third set, and a fourth set of machine codes selected from the instruction set architecture of the processor.

In another illustrative embodiment, a system for controlling a spillway of a hydroelectric power generation station located in a waterway includes a system as described above, in which the physical environmental property represented by the dependent variable includes stage, the stage representing a measured water level of the waterway. In such an embodiment, the instructions may further include instructions that configure the processor to receive a new measured stage value, and to use the main GP model to generate and perceptibly output a predictive probabilistic representation of a range of possible stage values corresponding to the new measured stage value. The instructions may further configure the processor to cause the spillway to be opened if the range of possible stage values includes any value below a predefined minimum stage threshold value, regardless of whether the new measured stage value is below the threshold value.

In another illustrative embodiment, an environmental monitoring system includes a storage medium including a database storing physical environmental data including values of at least one independent variable and a dependent variable representing a dependent observed physical environmental property that is correlated with the independent variable. The system further includes a processor in communication with the storage medium, a communications interface in communication with the processor, an output device in communication with the processor, and a computer-readable medium in communication with the processor. The computer-readable medium stores executable instructions that configure the processor to use a composite covariance function to generate an environmentally adapted covariance matrix corresponding to the values of the at least one independent variable, the composite covariance function including at least one stationary term including a rational quadratic term, and at least one non-stationary term. The instructions further configure the processor to receive a new value of the at least one independent variable through the communications interface, and to use the environmentally adapted covariance matrix and the physical environmental data to generate a predictive probabilistic representation of a range of possible values of the dependent observed physical environmental property corresponding to the new value of the at least one independent variable. The predictive probabilistic representation has moments including an expected value of the dependent variable and a variance. The instructions further configure the processor to cause the output device to perceptibly output the predictive probabilistic representation. Advantages of using the composite covariance function to construct the environmentally adapted covariance matrix, and advantages of the predictive probabilistic representations, are discussed above in connection with another illustrative embodiment.

Another illustrative embodiment includes a computer-implemented method of monitoring a physical environmental property that has non-stationary heteroscedastic noise. The method includes a processor receiving physical environmental measurement data comprising measured values of a dependent variable which represents the physical environmental property, and at least one independent variable with which the physical environmental property is correlated. The processor constructs a combined input and output noise levels matrix containing output noise terms associated with the physical environmental property and input noise terms associated with the at least one independent variable with which the physical environmental property is correlated. Using the combined input and output noise levels matrix, the processor constructs a main Gaussian Processes (GP) model that models the physical environmental property and its non-stationary heteroscedastic noise. The processor co-operates with an output device to generate and perceptibly output a predictive probabilistic representation of the environmental property, using the main GP model. The predictive probabilistic representation includes a respective range of possible values of the physical environmental property for each respective value of the at least one independent variable, the range of possible values reflecting both the input noise terms associated with the independent variable and the output noise terms associated with the physical environmental property.

In another illustrative embodiment, a computer-implemented method of controlling a spillway of a hydroelectric power generation located in a waterway includes the method described above, wherein the physical environmental property represented by the dependent variable comprises stage, wherein the stage represents a measured water level of the waterway, and wherein the independent variable comprises a time at which the water level was measured. The method further includes the processor receiving a new measured stage value and a new measured time value at which the new measured stage value was measured. The processor uses the main GP model to generate and perceptibly output a predictive probabilistic representation of a range of possible stage values corresponding to the new measured stage value and time value. The processor then causes the spillway to be opened if the range of possible stage values includes any value below a predefined minimum stage threshold value, regardless of whether the new measured stage value is below the threshold value.

In another illustrative embodiment, a computer-implemented environmental monitoring method includes a processor receiving physical environmental data including values of at least one independent variable and a dependent variable representing a dependent observed physical environmental property that is correlated with the independent variable. The processor uses a composite covariance function to generate an environmentally adapted covariance matrix corresponding to the values of the at least one independent variable, the composite covariance function including at least one stationary term including a rational quadratic term, and at least one non-stationary term. The processor receives a new value of the at least one independent variable, and uses the environmentally adapted covariance matrix and the physical environmental data to generate and perceptibly output a predictive probabilistic representation of a range of possible values of the dependent observed physical environmental property corresponding to the new value of the at least one independent variable, the predictive probabilistic representation having moments including an expected value of the dependent variable and a variance.

In another illustrative embodiment, a non-transitory computer-readable medium stores instruction codes which, when executed by a processor, cause any one or more of the computer-implemented methods described herein to be carried out. In a related embodiment, an environmental monitoring system includes the processor in communication with the medium and with an output device to perceptibly output the predictive probabilistic representation of the environmental property.

Other aspects and features of illustrative embodiments will be apparent to those of ordinary skill in the art from the following description of such embodiments in conjunction with the accompanying drawings.

BRIEF DESCRIPTION OF THE DRAWINGS

In drawings which illustrate embodiments of the present disclosure.

DETAILED DESCRIPTION

System Overview

Figure 1:
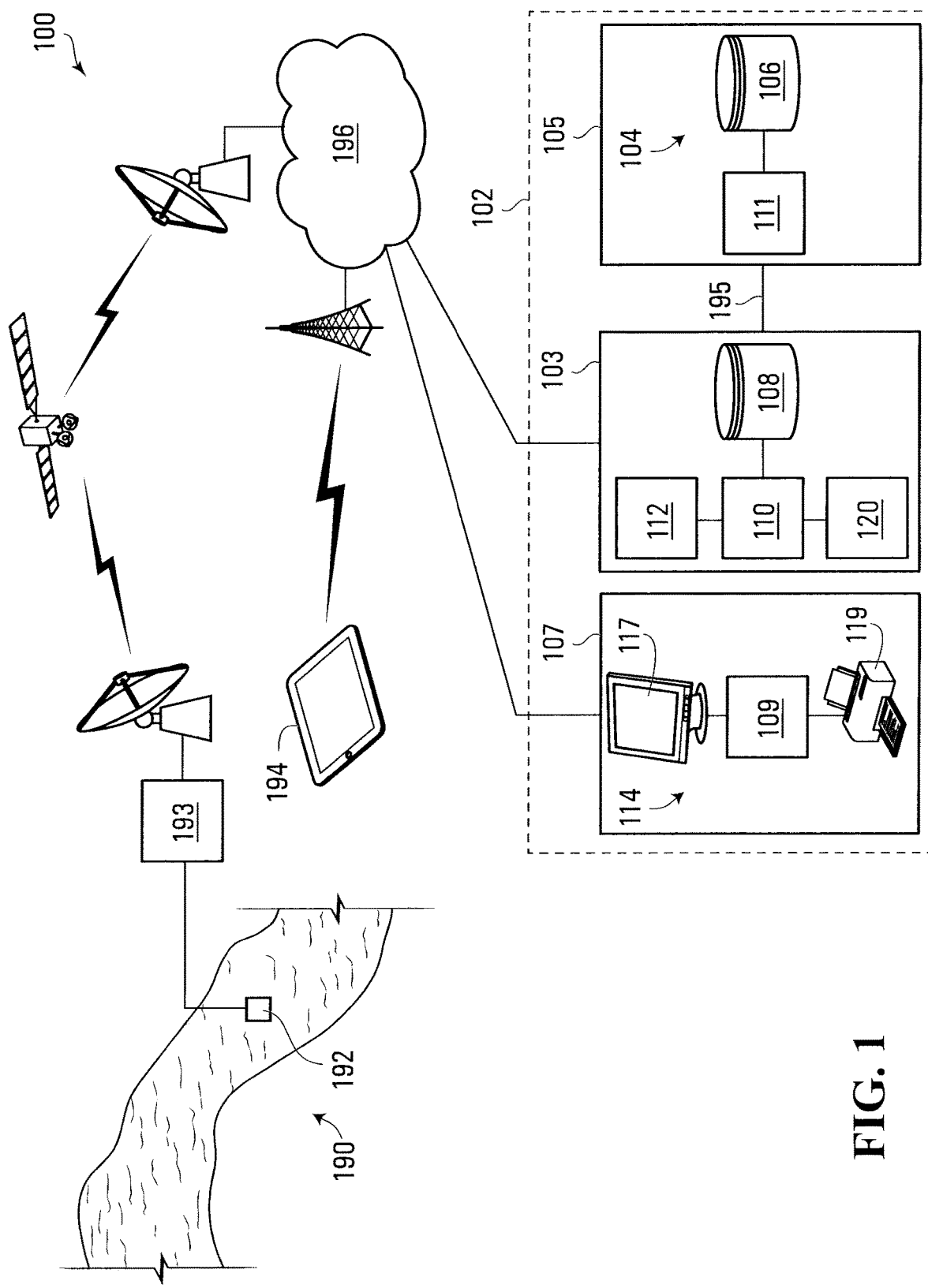
FIG. 1 is a schematic representation of an environmental monitoring system according to a first embodiment of the present disclosure.
Figure 2A:
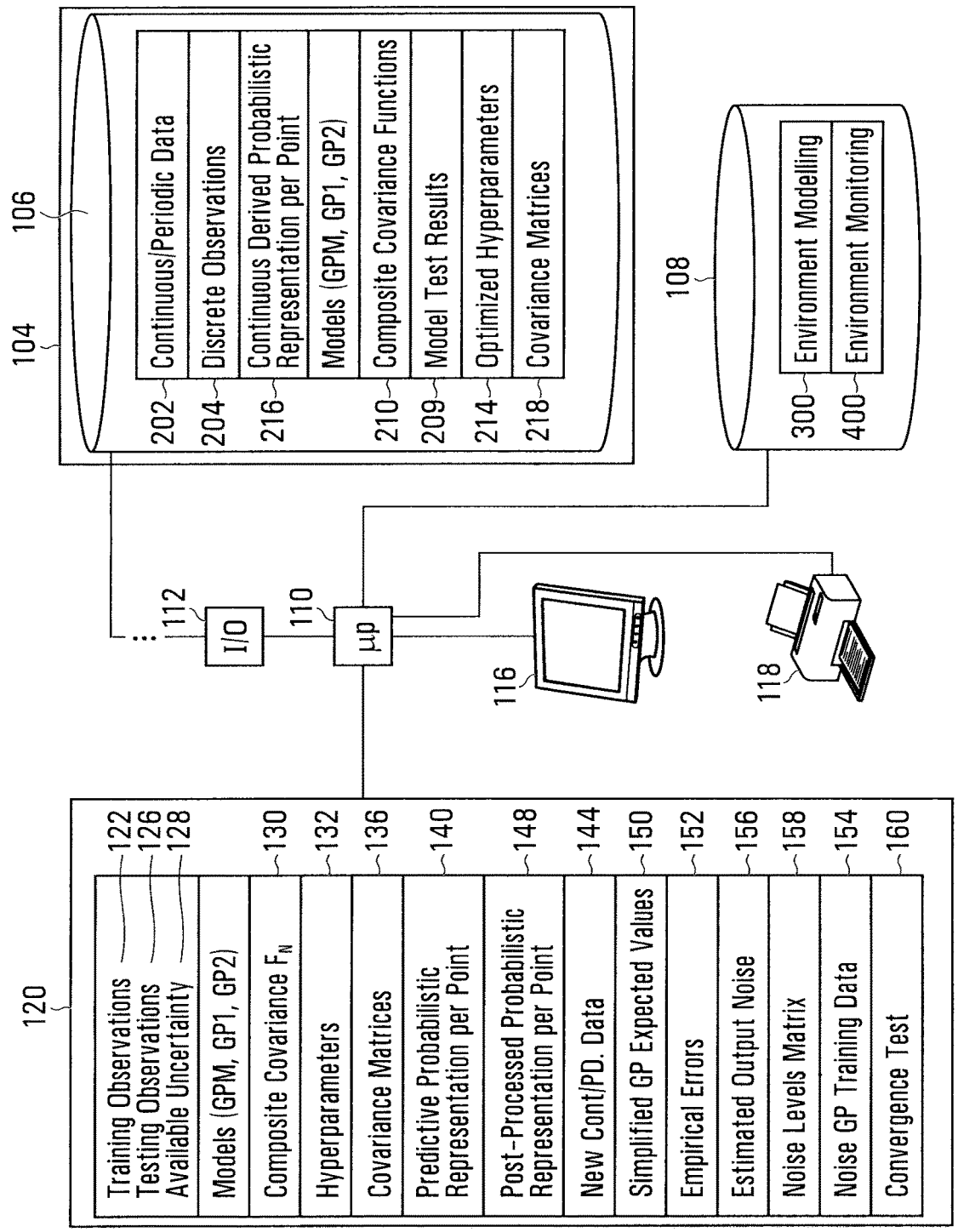
FIG. 2A is a block diagram of an environmental time series data management system of the environmental monitoring system of FIG. 1.

Referring to FIGS. 1 and 2A, an environmental monitoring system for monitoring a physical environmental property that has non-stationary heteroscedastic noise, according to a first embodiment of the present disclosure, is shown generally at 100 in FIG. 1.

In this embodiment, the environmental monitoring system 100 includes a database 106 defined in a computer-readable storage medium shown generally at 104, configured to receive and store physical environmental measurement data. In this embodiment, the physical environmental measurement data include measured values of a dependent variable which represents the physical environmental property, and at least one independent variable with which the physical environmental property is correlated. In this embodiment, the system 100 further includes a processor 110 in communication with the storage medium 104, a communications interface 112 in communication with the processor 110, an output device 114 in communication with the processor 110, and a computer-readable medium 108 in communication with the processor 110.

As discussed in greater detail below, in this embodiment the computer-readable medium stores executable instructions that configure the processor to execute a method that includes the processor receiving the physical environmental measurement data, and the processor constructing a combined input and output noise levels matrix containing output noise terms associated with the physical environmental property and input noise terms associated with the at least one independent variable with which the physical environmental property is correlated. Using the combined input and output noise levels matrix, the processor constructs a main Gaussian Processes (GP) model that models the physical environmental property and its non-stationary heteroscedastic noise. The processor generates and co-operates with the output device 114 to perceptibly output a predictive probabilistic representation of the environmental property, using the main GP model. The predictive probabilistic representation includes a respective range of possible values of the physical environmental property for each respective value of the at least one independent variable, the range of possible values reflecting both the input noise terms associated with the independent variable and the output noise terms associated with the physical environmental property.

In this embodiment, the instructions stored in the computer-readable medium further configure the processor 110 to use a composite covariance function to generate an environmentally adapted covariance matrix corresponding to the values of the at least one independent variable, the composite covariance function including at least one stationary term comprising a rational quadratic term, and at least one non-stationary term. In the present embodiment, the processor 110 is further configured to receive a new value of the at least one independent variable through the communications interface 112, and to use the environmentally adapted covariance matrix and the physical environmental data to generate a predictive probabilistic representation of a range of possible values of the dependent observed physical environmental property corresponding to the new value of the at least one independent variable, the predictive probabilistic representation having moments including an expected value of the dependent variable and a variance. In this embodiment, the processor 110 is further configured to cause the output device 114 to perceptibly output the predictive probabilistic representation.

More particularly, in this embodiment the environmental monitoring system 100 includes an environmental time series data management (ETSDM) system 102. The ETSDM system 102 includes an application server 103, a database server 105 and a client computer 107. In this embodiment, the ETSDM system 102 includes a processor. More particularly, in this embodiment the ETSDM system 102 includes three processors 109, 110 and 111, of the client computer 107, the application server 103 and the database server 105, respectively.

In this embodiment, the application server 103 includes the processor 110 in communication with a local computer-readable medium 108, with the communications interface 112, with the output device shown generally at 114, and with a memory device, which in this embodiment includes a Random Access Memory (RAM) 120. In this embodiment, the computer-readable medium 108 stores instruction codes that configure the processor 110 to execute the various methods described herein, the instruction codes including an environment modelling routine 300 and an environment monitoring thread 400, discussed in greater detail below. In the present embodiment, the communications interface 112 enables the application server 103 to communicate with the other components of the system 100 via at least one communications network. More particularly, in this embodiment the at least one communications network includes both a high-speed local area network (LAN) 195 by which the application server 103 communicates with the database server 105, and at least one wide area network (WAN) 196 by which the application server 103 communicates with the other components of the system 100. In this embodiment, the communications interface 112 also allows the client computer 107 to communicate with the application server 103 via both an application programming interface (API) and a graphical user interface (GUI) executing on the client computer.

In the present embodiment, the client computer 107 includes the processor 109, which is configured to execute a client application (not shown) to enable the client computer 107 to communicate with the application server 103 and the database server 105 over the at least one wide area network shown generally at 196. As noted above, in this embodiment the client computer 107 is configured to communicate with the application server 103 via both an application programming interface (API) and a graphical user interface (GUI) executing on the client computer 107. In this embodiment, the output device 114 includes a video display device 117 and a printer 119 of the client computer 107.

In this embodiment, the database server 105 includes the database 106, along with the processor 111 which is configured to store and manage new environmental data under the direction of the application server 103.

In this embodiment, the at least one wide area network 196 includes the Internet, a cellular communications network and a satellite communications network, and accordingly, in this embodiment the communications interface 112 of the application server 103 includes a wired connection to the Internet as well as wireless connections to the cellular and satellite networks. In this embodiment, the client computer 107 and database server 105 include similar communications interfaces (not shown).

It will be appreciated that the above configuration is illustrative. For example, if desired, the functions of the application server 103, the database server 105 and the client computer 107 can be otherwise divided, or can be combined in a single computing machine.

Application Server Processor

Figure 2B:
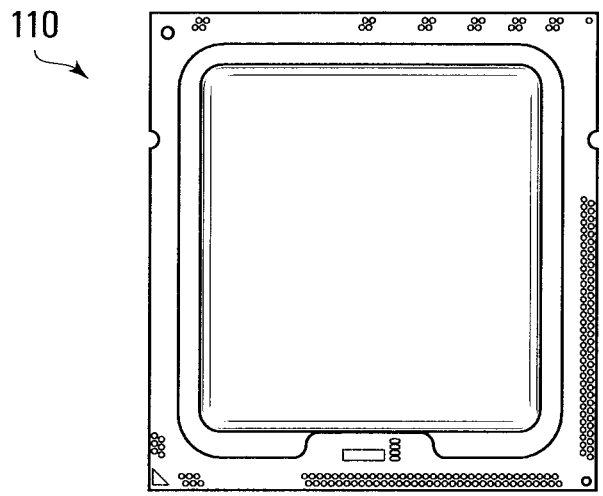
FIG. 2B is a top view of a processor of the environmental time series data management system of FIG. 2A.
Figure 2C:
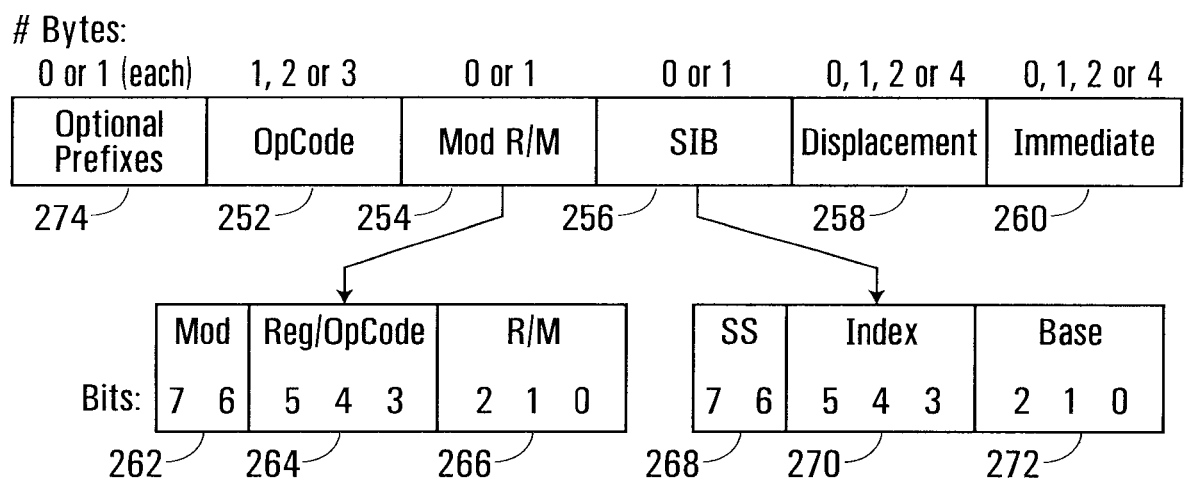
FIG. 2C is a block diagram of an instruction in accordance with a native instruction set architecture of the processor of FIG. 2B.

Referring to FIGS. 1, 2A, 2B and 2C, the processor 110 of the application server 103 is shown in greater detail in FIGS. 2B and 2C. In this embodiment, as shown in FIG. 2B, the processor 110 includes a hardware processor, specifically an Intel Xeon E5-2670 Dodeca-core (12-core) microprocessor, which is particularly well-suited to server applications. In this embodiment, the processor 110 is connected to a motherboard of the application server 103 via a suitable multi-pin connector socket (not shown). More particularly, in this embodiment the processor 110 is connected via an LGA 2011 socket, although alternatively the Intel Xeon processor is also compatible with other sockets including LGA 2011-3, LGA 1150, LGA 1366, and PCI Express 2.0 and 3.0.

Referring to FIGS. 2B and 2C, in this embodiment the processor 110 is structurally configured with an internal microarchitecture which permits it to perform only a predefined set of basic or native operations in response to receiving corresponding instructions selected from a predefined instruction set architecture (ISA) of the processor. The instruction set architecture defines, among other things, the binary machine language OpCodes and native commands that the processor 110 is physically capable of executing. More particularly, in this embodiment the instruction set architecture of the processor 110 includes an x86 instruction set architecture. More particularly still, in this embodiment the processor 110 is configured with a 64-bit implementation of the x86 instruction set architecture. Consequently, in this embodiment the processor 110 receives, via the LGA 2011 socket, binary machine-code instructions in accordance with the processor's x86 instruction set architecture.

Referring to FIG. 2C, the format of a native instruction in accordance with the instruction set architecture of the processor 110 of the present embodiment is shown generally at 250. In this embodiment, in accordance with the 64-bit x86 instruction set architecture, the instruction 250 can comprise instructions varying in length from 1 to 15 bytes. Each instruction 250 generally includes an OpCode field 252, a Mod R/M field 254, an SIB field 256, a displacement field 258 and an immediate field 260. The OpCode field 252 contains one or two bytes defining a native instruction OpCode to be executed. If the instruction OpCode involves register or memory operands then the Mod R/M field 254 contains a byte that specifies an addressing mode and instruction operand size; more particularly, the Mod R/M field 254 includes a Mod sub-field 262 specifying the x86 addressing mode, a Reg/OpCode sub-field 264 specifying the source or destination register, and an R/M sub-field 266 specifying either the operand in a single-operand instruction or the second operand in a two-operand instruction. If the instruction OpCode uses a scaled indexed memory addressing mode, then the SIB field 256 contains a Scaled Indexed Byte for this purpose; more particularly, in this embodiment the SIB field 256 includes a Scale sub-field 268, an Index Scale Value sub-field 270 specifying an index register, and a Base sub-field 272 specifying a base register. The Displacement field 258 stores a memory address displacement for the instruction OpCode. If the instruction OpCode has an immediate operand then the Immediate field 260 stores immediate or constant data.

If desired, subject to the 15-byte instruction size limit of the x86 instruction set architecture, the instruction 250 may further include one or more optional one-byte prefix fields 274, for storing one-byte instruction prefixes such as lock and repeat prefixes, bound prefixes, segment override prefixes, operand size override prefixes, and address-size override prefixes.

The complete native instruction set for the 64-bit x86 instruction set architecture is available to the public from numerous sources. For example, the complete native instruction set for the processor 110 is reproduced in, *Intel® 64 and IA-32 Architectures Software Developer's Manual, Volume 2 (2A, 2B,2C & 2D): Instruction Set Reference, A-Z*, Intel Order Number 325383-060US (Intel: September 2016), which is hereby incorporated herein by reference.

Referring to FIGS. 2A, 2B and 2C, in this embodiment the environment modelling routine 300 and the environment monitoring thread 400 are stored in the computer-readable medium 108 in the form of executable machine codes forming instructions of the form shown in FIG. 2C. Thus, in the present embodiment, the instruction codes of the various functional blocks of those routines, including for example the processor receiving the physical environmental measurement data, constructing the combined input and output noise levels matrix, constructing the main GP model, and co-operating with the output device to generate and perceptibly output the predictive probabilistic representations, are stored in the computer-readable medium 108 in the form of respective sets of machine code instructions selected from the instruction set architecture.

Continuous and Discrete Observations

In the present embodiment, the system 100 further includes environmental measurement devices shown generally at 190, which in this embodiment include a plurality of sensors such as that shown at 192, an automated data logger and transmitter 193 and a plurality of discrete measurement remote uploading devices such as that shown at 194.

In this embodiment, the ETSDM system 102 is configured to continuously or periodically receive new environmental sensor data inputs from the automated data logger and transmitter, each of the inputs including at least a new independent observed physical environmental property value along with its corresponding measurement time (time-value pair). More particularly, in this embodiment the independent observed physical environmental property value is stage (water level). Accordingly, in this embodiment the sensor 192 includes a water level sensor, disposed in a water channel such as a river or stream.

In this embodiment, the automated data logger and transmitter 193 is equipped with a communication link to allow it to continuously accumulate water level and time data and to periodically transmit the accumulated data to the ETSDM system 102 via the at least one wide area network 196. In this embodiment, in which the at least one wide area network 196 includes the Internet, a cellular communications network and a satellite communications network, the communications link of the automated data logger and transmitter 193 includes at least a wireless satellite communication link to the satellite network. Alternatively, any other suitable means of communication between the system 102 and the automated data logger and transmitter 193 may be substituted.

In this embodiment, the sensor 192 continuously measures the water channel's stage, i.e. the water level relative to a datum (fixed reference point), and communicates the measured (stage, time) value pairs to the automated data logger and transmitter 193, which accumulates corresponding pairs of stage values s and measurement time values t. In this embodiment, each data point corresponding to each stage measurement taken by the sensor 192 is logged in the form of a time-value pair (t, s).

Referring to FIGS. 1 and 2A, upon receipt by the system 102, the processor 110 of the application server 103 prepares the received data for storage in the database 106. In this embodiment such preparation includes validation, pre-processing and compression. The application server 103 transmits the prepared data over the LAN 195 to the database server 105, which stores each received sensor data time-value pair in a continuous/periodic data store 202 of the database 106. More particularly, in this embodiment the database server 105 stores the received sensor data points as a sequence of time-value pairs:

$$\mathcal{D}_C = \{(t_i, s_i)\}_{i=1}^n \quad (1)$$

In this embodiment, if available, along with each sensor time-value pair, further information such as a quality code or a form of uncertainty measure for the value measured by the sensor is recorded and stored in the database 106. More particularly, in the present embodiment, if a noise or error value $\varepsilon_{si}$ for the $i^{th}$ value of the sensor 192 is known from the device firmware (which is not typically the case), the input of the $i^{th}$ value from the sensor 192 will also include the noise value $\varepsilon_{si}$, in metadata transmitted by the automated data logger and transmitter 193. In such a case, the resulting record stored in the database 106 will also include the received noise term $\varepsilon_{si}$:

$$\mathcal{D}_C = \{(t_i, s_i, \varepsilon_{si})\}_{i=1}^n \quad (2)$$

As such error information is typically unknown for environmental data, the noise element for continuous data is typically blank (or alternatively, may be fixed to the manufacturer's specification for a long range of time). Also, if additional independent variables are measured in a given embodiment, a new data set analogous to $D_C$ of equation (2) will be constructed and stored in the database 106.

In this embodiment, the automated data logger and transmitter 193 periodically transmits the accumulated sensor data points to the ETSDM system 102 via the wide area network 196, at a predetermined interval such as five minutes.

Also, in this embodiment the sensor 192 used to measure stage includes a pressure transducer that measures water pressure, and the sensor 192 includes firmware to convert the measured water pressure into a corresponding stage value. If desired, therefore, each data input transmitted to the system 102 may additionally include the measured water pressure value from which the corresponding stage value was calculated, which may also be stored in the database 106 in association with its corresponding stage and time values. More generally, such additional values may be included in any embodiment in which the sensor measures the desired property indirectly, by measuring a different property and calculating the desired property. Alternatively, such additional pressure values may be omitted for other stage sensor types that do not use pressure transducers, or more generally for sensors that directly measure their desired properties.

With respect to the discrete observations, in this embodiment, the discrete measurement remote uploading device 194 generally allows a technician to enter various forms of discrete environmental measurements that the technician has just obtained from a field visit, and to upload those measurements into the database 106. The uploading device 194 may include a tablet computer running an uploading application, for example. Alternatively, the technician may record the discrete environmental measurements at the field site, either in paper field forms or electronically, and may upload them to the database 106 at a later time using the client computer 107 after the technician has returned from the field. Thus, in this embodiment, the processor 110 of the application server 103 is configured to receive from the discrete measurement remote uploading device 194 or client computer 107, as the values of the at least one independent variable, observations of the at least one independent observed physical environmental property and corresponding times of the observations. More particularly, in this embodiment each such corresponding time value is received in the form of a time stamp accompanying its respective discrete observation of the independent observed physical environmental property. Likewise, in this embodiment, for each of the measurement times of the at least one independent observed physical environmental property, the processor 110 is configured to receive an observation of a dependent variable representing a dependent observed physical environmental property that is correlated with the independent observed property. More particularly, in this embodiment the processor 110 is configured to receive discrete measurements of stage (water level) and accompanying time values as independent variables and discrete measurements of discharge (volumetric flow rate) as the dependent variable. Alternatively, the observations may include other physical environmental properties. Taking hydrological data as an example, the field technician, in a typical field visit, could conceivably measure a broad range of observed properties, such as water level, measured discharge, water temperature, pH, dissolved oxygen, turbidity and air temperature, to name but a few examples. For the purpose of the present embodiment, however, it is assumed for ease of illustration that the field data include only measured stage (water level) and measured discharge q at measurement time t, so that each received data point is of the form (t, s, q).

Referring to FIGS. 1 and 2A, upon receipt by the system 102, the processor 110 of the application server 103 prepares the received data for storage in the database 106. In this embodiment such preparation includes validation, pre-processing and compression. The application server 103 transmits the prepared data over the LAN 195 to the database server 105, which stores the received discrete data in a discrete data set $D_D$ stored in a discrete observations store 204 of the database 106:

$$\mathcal{D}_D = \{(t_i, s_i, q_i)\}_{i=1}^n \quad (3)$$

Optionally, if desired, each discrete data set may include further elements for further information. For example, if noise or error values $\varepsilon_s$ of the stage measurement and $\varepsilon_q$ of the discharge calculation are known (which is not typically the case), the discrete data set may include additional elements to store the noise values $\varepsilon_s$ and $\varepsilon_q$. Therefore, in this embodiment the discrete observations store 204 stores not only time-stage-discharge data triplets, but also stores associated stage error and discharge error values having the same time index 1 ... n:

$$\mathcal{D}_D = \{(t_i, s_i, \varepsilon_{si}, q_i, \varepsilon_{qi})\}_{i=1}^n \quad (4)$$

Likewise, if there are additional independent variables in a given embodiment, the discrete data set $\mathcal{D}_D$ would include additional elements for such additional independent variables (and for their associated noise values if known, which is not typically the case).

Also in this embodiment, to facilitate the modelling process, the processor separates the independent variables from the dependent variables, and generates and maintains a separate design matrix $X_{DESIGN}$ for the independent variables, a separate output vector y for the dependent variable, and a set of error vectors for all independent and dependent variables if they are available in the discrete observations store 204:

$$X_{DESIGN} = \begin{bmatrix} t_1 & s_1 \\ t_2 & s_2 \\ \vdots \\ t_n & s_n \end{bmatrix} \quad (5)$$

$$y = q = [q_1 \ q_2 \ \ldots \ q_n]^T \quad (6)$$

$$\varepsilon_s = [\varepsilon_{s1} \ \varepsilon_{s2} \ \ldots \ \varepsilon_{sn}]^T \quad (7)$$

$$\varepsilon_q = [\varepsilon_{q1} \ \varepsilon_{q2} \ \ldots \ \varepsilon_{qn}]^T \quad (8)$$

In the present embodiment, any such vectors and matrices that are indicated to be stored in the database 106 are not stored in the form of defined matrices and vectors per se, but rather, for performance reasons, are typically stored as time series according to proprietary storage processes. Alternatively, however, vectors or more generally n-dimensional matrices may be defined and stored if desired.

Uncertainty Modelling for Environmental Data

As noted above, the acquisition, analysis and practical usage of environmental data pose special challenges not typically encountered in other technical fields. From a modeling perspective, the main challenges in environmental data modelling come from four unique characteristics of both continuous and discrete observations: 1) the dynamic behaviour governed by underlying physical processes tends to be non-linear and non-stationary; 2) the uncertainty for measurements varies over time and over the range of measurements (heteroscedasticity); 3) a paucity or lack of observations at extreme conditions makes it difficult to accurately predict unobserved data at those conditions; and 4) some form of uncertainty measure (e.g., quality code, precision, accuracy, etc.) associated with individual observations may or may not be available, and if available, should preferably be used as input to the model. In particular, the time-varying nature of measurement uncertainty, and the lack of sufficient observations at extreme cases (imperfect model), per characteristics 2) and 3) above, are two main sources of uncertainty in environmental data modelling. Further uncertainty results from the fact that the underlying physical processes change over time. All four characteristics mentioned above are considered in the model used in this disclosure.

In the following discussion, scalars are shown in lowercase normal (e.g. $x_1$), vectors in bold lowercase (e.g. $x_i$) and matrices in uppercase (e.g. K).

Let $x_i = [x_1, x_2, \ldots, x_D]^T$ be a D dimensional vector of all independent variables at time step i for i=1 ... n observations and let $y_i$ be the scalar output for the dependent variable at time step i. The noise model for the dependent variable input can be written as:

$$y_i = \tilde{y}_i + \varepsilon_{yi} \quad (9)$$

where $\tilde{y}_i$ is the true value of the dependent variable and $\varepsilon_{yi}$ is its error term at time step i. Similarly, the noise model for the independent variable input can be written as:

$$x_i = \tilde{x}_i + \varepsilon_{xi} \quad (10)$$

where the vector $\tilde{x}_i = [\tilde{x}_{1i}, \tilde{x}_{2i}, \ldots, \tilde{x}_{Di}]^T$ contains the true values of the independent variables and the vector $\varepsilon_{xi} = [\varepsilon_{x1i}, \varepsilon_{x2i}, \ldots, \varepsilon_{xDi}]^T$ contains their associated error terms, at time step i. As discussed above, typically these error terms for both the independent and dependent variables are unknown, but in some cases they are provided along with their respective observations.

In the model of the present embodiment, we assume that the error term for the dependent variable $\varepsilon_{yi}$ is a function of true independent variables. In other words:

$$\varepsilon_{yi} = e_y(\tilde{x}_i) \quad (11)$$

The true value of the dependent variable $\tilde{y}_i$ in equation (9) is unknown and is a complicated function of the true independent variable vector $\varepsilon_i$:

$$\tilde{y}_i = f(\tilde{x}_i), \quad (12)$$

where the function $f$ is unknown and is called a latent function. (Similarly there is an unknown latent function of only time for independent variable model ($\tilde{x}_i = g(t_i)$) that will be discussed later in connection with single sensor modelling).

In this embodiment, environmental observations (and possibly error terms if available) are used to estimate the predictive distribution for the latent function $f$ (rating curve) at unobserved new inputs, which provides an expected value and a variance for $f$ at each time step. By adding the latent function $f$ from equation (9) and using equation (10), we have:

$$y_i = f(x_i - \varepsilon_{xi}) + e_y(x_i - \varepsilon_{xi}) \quad (13)$$

In this equation both $f$ and $e_y$ are unknown nonlinear and non-stationary stochastic processes. To simplify this equation we assume that the average of the error term $e_y$ is smooth, differentiable and doesn't change rapidly over time. We also assume that the latent function $f$ (rating curve) is differentiable and smooth over its domain. These are valid assumptions for most environmental observations. By considering Taylor expansions of functions $f$ and $e_y$ about the input $x_i$ and applying those assumptions, the final equation for the model can be written as:

$$y_i = f_i + \varepsilon_{xi}^T (\nabla_x \bar{f})_i + \varepsilon_{yi} \text{ where} \quad (14)$$

-continued $$(\nabla_x \bar{f})_i = \left[\left(\frac{\partial \bar{f}}{\partial x1}\right)_i, \ldots, \left(\frac{\partial \bar{f}}{\partial xn}\right)_i\right]^T \approx \left[\left(\frac{\Delta \bar{f}}{\Delta x1}\right)_i, \ldots, \left(\frac{\Delta \bar{f}}{\Delta xn}\right)_i\right]^T =$$

$$\left[\frac{\bar{f}_i - \bar{f}_{i-1}}{x1_i - x1_{i-1}}, \ldots, \frac{\bar{f}_i - \bar{f}_{i-1}}{xn_i - xn_{i-1}}\right]^T$$

is the gradient vector of the expected value or average value $\bar{f}_i$ of the latent function $f_i = f(x_i)$ with respect to the D-dimensional input $x_i$. In this equation the second term $\varepsilon_{x_i}^T (\nabla_x \bar{f})_i$ represents how input uncertainty $\varepsilon_{x_i}^T$ propagates into the output by multiplying by the gradient of $\bar{f}_i$ and then linearly adding to the output uncertainty $\varepsilon_{y_i}$.

In this embodiment, we assume both input and output noise are Gaussians with mean 0 and variance that change over the input range:

$$\varepsilon_{y_i} \sim \mathcal{N}(0, \sigma_{y_i}^2) \tag{15}$$

$$\varepsilon_{x_i} \sim \mathcal{N}(0, \Sigma_{x_i}) \tag{16}$$

where $\sigma_{y_i}^2$ is the output variance which is assumed to be a function r of the D-dimensional input vector $x_i$ (i.e. $\sigma_{y_i} = r(x_i)$) and $\varepsilon_{x_i}$ is assumed to be a multivariate Gaussian with a diagonal covariance matrix:

$$\Sigma_{x_i} = \begin{bmatrix} \sigma_{x1i}^2 & \cdots & 0 \\ \vdots & \ddots & \vdots \\ 0 & \cdots & \sigma_{xDi}^2 \end{bmatrix}. \tag{17}$$

In this embodiment, we also model $f$ and $e_y$ as Gaussian Processes (GP), or more particularly, as stochastic processes having multi-variate Gaussian distributions (see e.g. Rasmussen, C., & Williams, C., *Gaussian Processes for Machine Learning* (Boston: MIT Press, 2006 for more details). As discussed further below, because of the complex noise model that the present embodiment addresses, standard GP solutions pre-dating the present application cannot be used.

With the above assumptions, the probability of an observation $y_i$ for the final probabilistic model can be derived from equation (14):

$$P(y_i|f_i, x_i) \sim \mathcal{N}(f_i, \sigma_{y_i}^2 + (\nabla_x \bar{f})_i^T \Sigma_{x_i} (\nabla_x \bar{f})_i)$$
$$\text{for } i=1, \ldots, n \tag{18}$$

If X denotes an n by D design matrix of all input observations as described above and all outputs are denoted by the vector $y=[y_1, y_2, \ldots, y_D]^T$, the present embodiment seeks to find the predictive distribution $P(f^*|X, y, x^*)$ at a new input $x^*$ given all observations using novel techniques that incorporate Bayesian inference.

In a Bayesian modelling framework, the "posterior probability" represents the probability of a hypothesis H given observed evidence E, and is denoted P(H|E). For example, in the present embodiment the posterior probability may represent the probability of observing a discharge value $f^*$ given a new (stage, time) measurement $x^*$ and the previously observed discrete observations X. The "prior probability" represents the inherent likelihood of the hypothesis H, or more particularly the probability of hypothesis H before the evidence E is observed, and is denoted P(H). The "likelihood" represents the compatibility of the observed evidence with the hypothesis, or more particularly, the probability of observing the evidence E given the hypothesis, and is denoted P(E|H). The "marginal likelihood" or "model evidence" is denoted P(E) and is the same for all possible hypotheses H, and can therefore be simply treated as a scaling factor z. Generally, the posterior probability equals the likelihood multiplied by the prior probability divided by the scaling factor, i.e.

$$P(H|E) = \frac{P(E|H)P(H)}{P(E)} = \frac{P(E|H)P(H)}{\int P(E|H)P(H)dH} = \frac{P(E|H)P(H)}{z} \tag{19}$$

In most practical applications, the integral in the denominator is over high dimensional space and intractable, and different approximations are used. If we substitute E and H from the above observation model, the posterior distribution which is the joint probability over function $f=[f_1, f_2, \ldots, f_n]^T$ that represents the true value of dependent variables (e.g. discharge) can be calculated from Bayes' rule as follows:

$$P(f|X, y) = \frac{P(y|f, X)P(f)}{P(y|X)} = \frac{P(y|f, X)P(f)}{\int P(y|f, X)P(f)df} \tag{20}$$

Having the posterior distribution calculated from the above equation, the predictive distribution for unobserved dependent variable $f^*$ at new independent variable vector $x^*$ can be calculated from sum (or marginalization) and product (Bayes) rules in probability theory:

$$P(f^*|X,y,x^*) = \int P(f^*|X,y,x^*,f)P(f|X,y)df \tag{21}$$

In this embodiment, we use GP to define our prior knowledge about $f$ (i.e. $f = \mathcal{GP}(0, K(X, X))$). In other words $P(f) \sim \mathcal{N}(0, K(X, X))$ where $K(X, X)$ is a covariance matrix for this multivariate Gaussian constructed from a predetermined covariance function $k(x, x')$ that represents our prior knowledge about the shape of $f$ (rating curve) before observing data as discussed before. As an example that foreshadows one of the types of covariance functions employed in the present embodiment, one example of a rational quadratic covariance function may be defined as:

$$k_{RQ}(x, x') = \sigma_f^2 \left(1 + \frac{1}{2\alpha}(x-x')^T \Lambda^{-2} (x-x')\right)^{-\alpha} \tag{22}$$

The covariance function $k_{RQ}(x, x')$ can be evaluated at any two given input points x and x' and the result represents the correlation (similarity/dissimilarity) between those two points. $\sigma_f^2$, $\alpha$, $\Lambda$ are called hyperparameters that need to be estimated from observation. As discussed in greater detail below, the present embodiment employs a novel composite covariance function combining at least one term that is stationary (only depends on differences x–x') and at least one term that is non-stationary (does not depend on differences x–x').

By using GP prior and Gaussian likelihood in our uncertainty model as described above, it can be shown that the expected value and variance for the predictive distribution can be calculated by:

$$K_y = \text{diag}\{\sigma_{yi}^2\}_{i=1}^n + \text{diag}\{(\nabla_x \bar{f})_i^T \Sigma_{x_i} (\nabla_x \bar{f})_i\}_{i=1}^n = \begin{bmatrix} \sigma_{y1}^2 & \cdots & 0 \\ \vdots & \ddots & \vdots \\ 0 & \cdots & \sigma_{yn}^2 \end{bmatrix} + \begin{bmatrix} (\nabla_x \bar{f})_1^T \Sigma_{x_1} (\nabla_x \bar{f})_1 & \cdots & 0 \\ \vdots & \ddots & \vdots \\ 0 & \cdots & (\nabla_x \bar{f})_n^T \Sigma_{x_n} (\nabla_x \bar{f})_n \end{bmatrix} \quad (23)$$

$$k_{y^*} = \sigma_{y^*}^2 + (\nabla_x \bar{f})_*^T \Sigma_{x_*} (\nabla_x \bar{f})_* \quad (24)$$

$$\mathbb{E}[f^* \mid X, y, x^*] = k(x^*, X)[K(X, X) + K_y]^{-1} y \quad (25)$$

$$\mathbb{V}[f^* \mid X, y, x^*] = k(x^*, x^*) - k(x^*, X)[K(X, X) + K_y]^{-1} k(X, x^*) \quad (26)$$

$$\mathbb{V}[y^* \mid X, y, x^*] = \mathbb{V}[f^* \mid X, y, x^*] + k_{y^*} \quad (27)$$

where:
$K(X, X)$ is the covariance matrix for all input observations with $K \in \mathbb{R}^{n*n}$ and $K_{ij} = k(x_i, x_j)$ for $i, j = 1 \ldots n$ or $$K(X, X) = \begin{bmatrix} k(x_1, x_1) & \cdots & k(x_1, x_n) \\ \vdots & \ddots & \vdots \\ k(x_n, x_1) & \cdots & k(x_n, x_n) \end{bmatrix} \quad (28)$$

Similarly, $k(x^*, X)$ is a vector of covariance between new input $x^*$ and
all input observations $X$ with $k \in \mathcal{GP}^{1*n}$ and $k_i = k(x^*, x_i)$ for $i=1 \ldots n$ or $k(x^*, X) = [k(x^*, x_1) k(x^*, x_1) \ldots k(x^*, x_1)]$ and $k(X, x^*) = k(x^*, X)^T$; and $\mathbb{V}[y^* \mid X, y, x^*]$ is the total variance for the noisy prediction. The first term $\mathbb{V}[f^*\mid X, y, x^*]$ is the model variance and the second term $k_{y^*}$ is the variance associated with input and output uncertainties.

Under the GP model, log marginal likelihood can be derived as:

$$\log P(y \mid X) = -\frac{1}{2} y^T [K(X, X) + K_y]^{-1} y - \frac{1}{2} \log|K(X, X) + K_y| - \frac{n}{2} \log 2\pi \quad (29)$$

In the above equations, K is in fact a function of a covariance function hyperparameters vector $\theta$ ($K = K_\theta$) and therefore predictive distribution and log marginal likelihood are functions of:
1. observations X and y;
2. hyperparameters vector $\theta$ for all covariance functions and unknown noise terms;
3. input and output noise variances terms in $K_y$ and $k_{y^*}$; and
4. the expected values $\bar{f}$ for the latent function $f$.

In typical standard GP solutions, there is only one fixed and stationary noise term $\sigma^2$ and therefore $K_y = k_{y^*} = \sigma^2$. Also there is no latent function expected value term $\bar{f}_i$. In this case, typical GP solutions for finding predictive distributions become straightforward. For example, a standard GP solution in these simplified circumstances could involve the following steps:
1. Choose a covariance function k to represent the prior knowledge about the shape of the latent function $f$ before observing data.
2. Partition all observations into training and test data sets. Typically 30% of observations should ideally be reserved for testing the model.
3. Learn hyperparameters θ from observation data X and y with any gradient based optimization algorithm to maximize the log marginal likelihood. To do so, negative log marginal likelihood may be used as an objective function F=−log P(y|X) to be minimized, its derivative with respect to θ may be calculated:

$$\frac{\partial F}{\partial \theta_j} = \frac{1}{2} \text{tr}\left( (\alpha \alpha^T - K'^{-1}) \frac{\partial (K')}{\partial \theta_j} \right) \quad (30)$$

where $K' = K(X, X) + K_y$ and $\alpha = K'^{-1} y$.
A typical gradient based optimization algorithm starts with some initial values for parameters θ and iteratively updates the parameters to move along the direction of the negative gradient $$-\frac{\partial F}{\partial \theta_j}$$

in order to find the minimum of F. The updated value for the parameter at each step can be calculated for example by $$\theta_{k+1} = \theta_k - \beta \frac{\partial F}{\partial \theta}$$

where β is the step size parameter.
4. Once hyperparameters are estimated, covariance matrices $K(X, X), k(x^*, X), k(X, x^*), k(x^*, x^*)$ and output Gaussian noise terms $K_y = k_{y^*} = \sigma^2$ (if it is considered, to be learned as an unknown hyperparameter in vector θ) can easily be calculated.
5. Now given a new input $x^*$ from the test data set, a corresponding expected value and variance of the predictive distribution can be analytically calculated from equations (25), (26) and (27) above.
6. If the resulting error between the expected value and the actual observed value for the test data is too large, the covariance function may be modified or the optimization parameters may be changed, and steps 3-5 may be repeated.

By analysing equations (25), (26), (27) and the log marginal likelihood of equation (29), it can be seen that the standard GP approach outlined above is insufficient for the purposes of the present embodiment:
1. Unlike the assumption of fixed, stationary noise underlying the above standard approach, for environmental data, the output noise variances $\sigma_{yi}^2$ and $\sigma_{y^*}^2$ (if unknown) are complicated functions of input and are not constant. In other words $\sigma_{yi} = r(x_i)$ and $\sigma_{y^*} = r(x^*)$ and as discussed above output error is also a stochastic process.
2. In order to propagate input uncertainties $\Sigma_{x_i}$, the slope of the mean for the posterior distribution $\bar{f}_i$ must be calculated at all training points. However, for environmental data, evaluating the posterior mean typically results in an analytical unsolvable differential equation; $\bar{f}_i$ is a complicated function of its derivative $(\nabla_x \bar{f})_i$.

To address the above problems, the present embodiment employs a novel iterative process, described in greater detail below in the "Operation" section in connection with blocks 310 to 340 of the environment modelling routine 300. The novel iterative process of the present embodiment may be briefly summarized as follows:
1. Define three Gaussian Processes (GPs):
   GPM: is a Main GP modelling a dependent physical environmental property;
   GP1: is a Simplified GP with Gaussian stationary noise $\varepsilon_{yi} \sim \mathcal{N}(0,\sigma^2)$; and
   GP2: is a Noise GP to model logarithms of noise levels $e(x_i)=\log(r(x_i))$. This e GP is governed by a different covariance function than GPM and GP1: more particularly, in this embodiment the Noise GP is governed by a squared exponential covariance function:

$$k_e(x,x')=\sigma_f^2 \exp(-\tfrac{1}{2}(x-x')^T\Lambda^{-2}(x-x')) \quad (31)$$

where $\sigma_f^2$ and $\Lambda=\mathrm{diag}[\lambda 1, \ldots \lambda D]$ are hyperparameters and $\theta_e=[\lambda 1 \ldots \lambda D \sigma_f]^T$. The e process for training data is $e=\{e_1, e_2, \ldots, e_n\}$
2. Given all training data, estimate GP1 for predicting $f$ from x with stationary noise variance $\sigma^2$.
3. Given GP1, calculate $\bar{f}_i$ which is the posterior mean (or expected value) $\bar{f}_i$ at all training points $x_i$.
4. Given GP1, calculate empirical error $e_i=\log(var[y_i,\hat{y}_i])$ where $\hat{y}_i$ is the GP1 estimate at $x_i$. To calculate this variance, we take m>50 different samples $\hat{y}_i^j$ from the GP1 predictive distribution and then calculate variance using:

$$var[y_i,\hat{y}_i] \approx \frac{1}{m}\sum_{j=1}^{m}(y_i-\hat{y}_i^j)^2.$$

This forms an empirical training data set for GP2: $\mathcal{D}=\{(x_1, e_1), (x_2, e_2), \ldots, (x_n, e_n)\}$
where $e_i=\log(var[y_i,\hat{y}_i])$ for i=1 n.
5. Given GP1 and the training data set $\mathcal{D}$ from step 4, estimate the predictive distribution for GP2.
6. Given training data D and the optimized hyperparameters of GP2, estimate logarithmic output noise levels for the main GPM.
7. Given the expected values $\hat{f}_i$ from step 3 and logarithmic noise levels $\sigma_{yi}=r(x_i)$ from step 6, construct all unknown terms in $K_y$ and $K_{y,*}$.
8. Given all training data X and y, and $K_y$ from step 7, estimate predictive distributions for GPM.
9. If the results of the current iteration have not converged to within a small range of the previous iteration, then set GP1=GPM and return to step 3 to perform the next iteration. Otherwise GPM is considered to have been solved for, and can then be used to generate a predictive probabilistic representation of the output y, for any known or unknown input $x_i$.

The present inventor has found that convergence tends to occur quickly in just a few iterations of the above method with a typical number of stage-discharge discrete observations. In fact, even the first iteration tends to yield a good estimate of expected value for the predictive probabilistic distribution. In practice, independent and dependent noise levels for discrete observations are either not available or partially available, but almost always the range is given. Thus, the iterative process should be able to set constraints on parameter optimization for both performance and accuracy of the process, especially in respect of extremely sparse measurements.

Operation

Figure 3A:
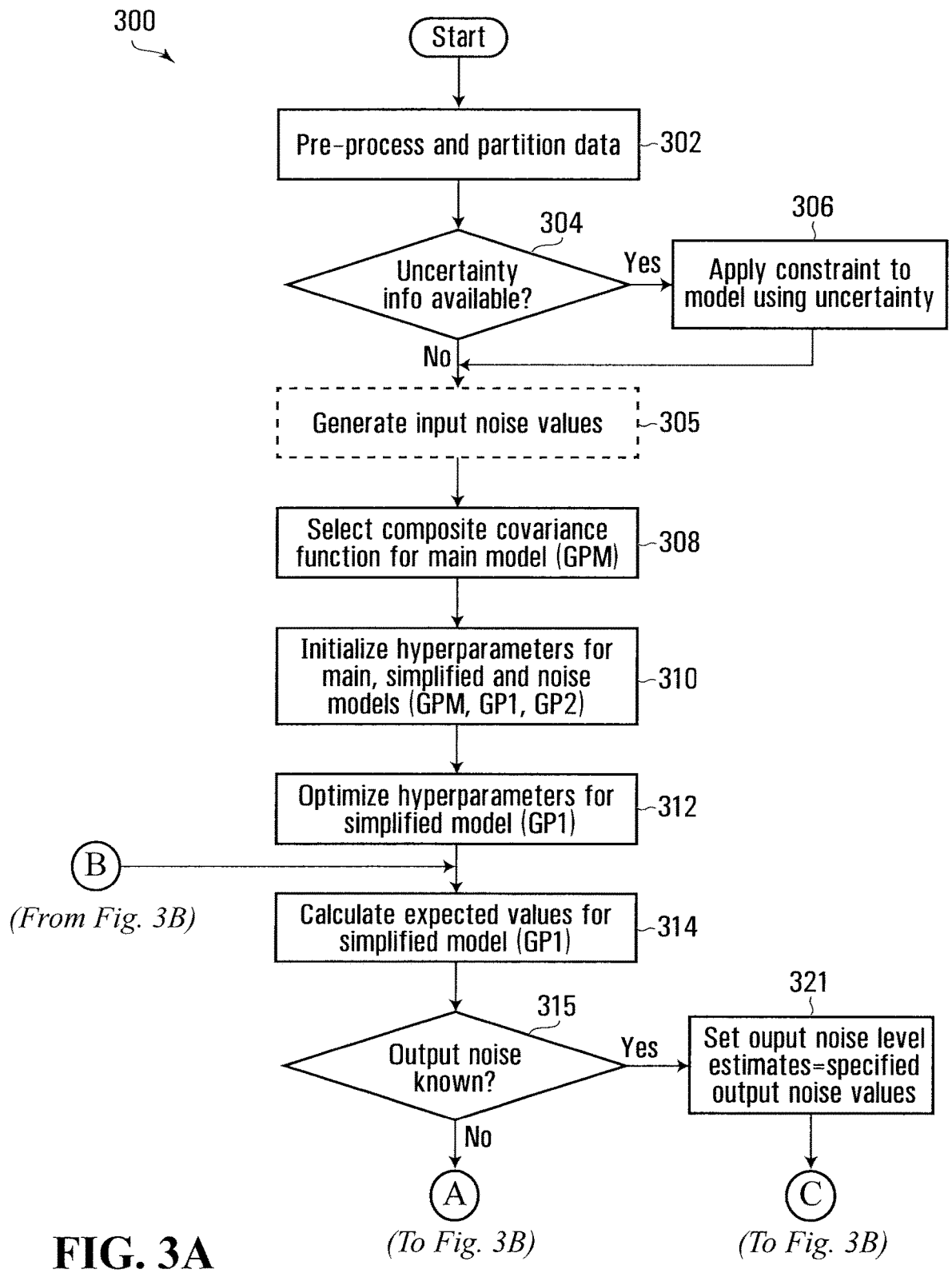
FIGS. 3A-3C are a flow-chart of an environmental modelling routine executed by the processor of the system of FIG. 1.
Figure 3B:
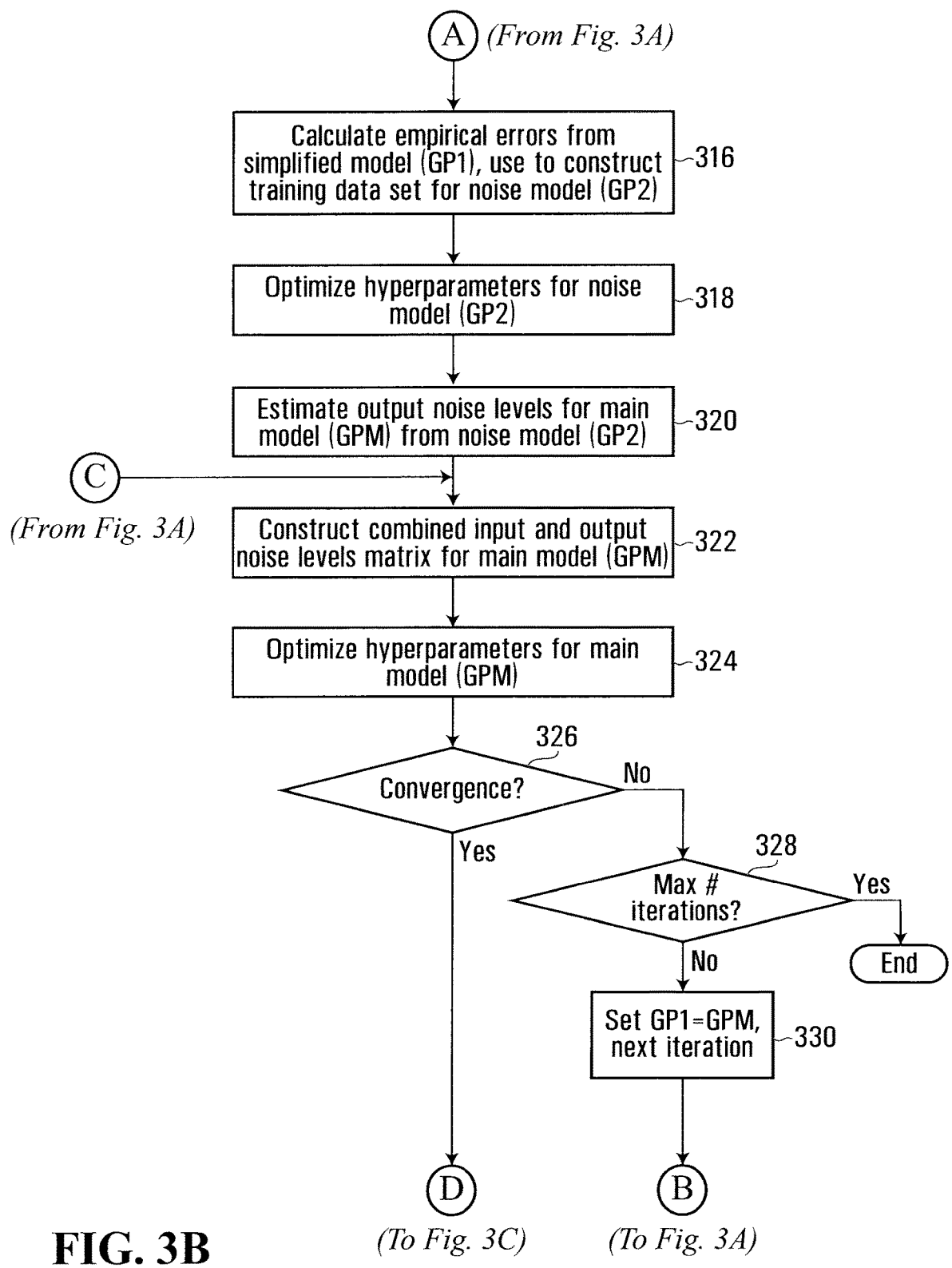
Figure 3C:
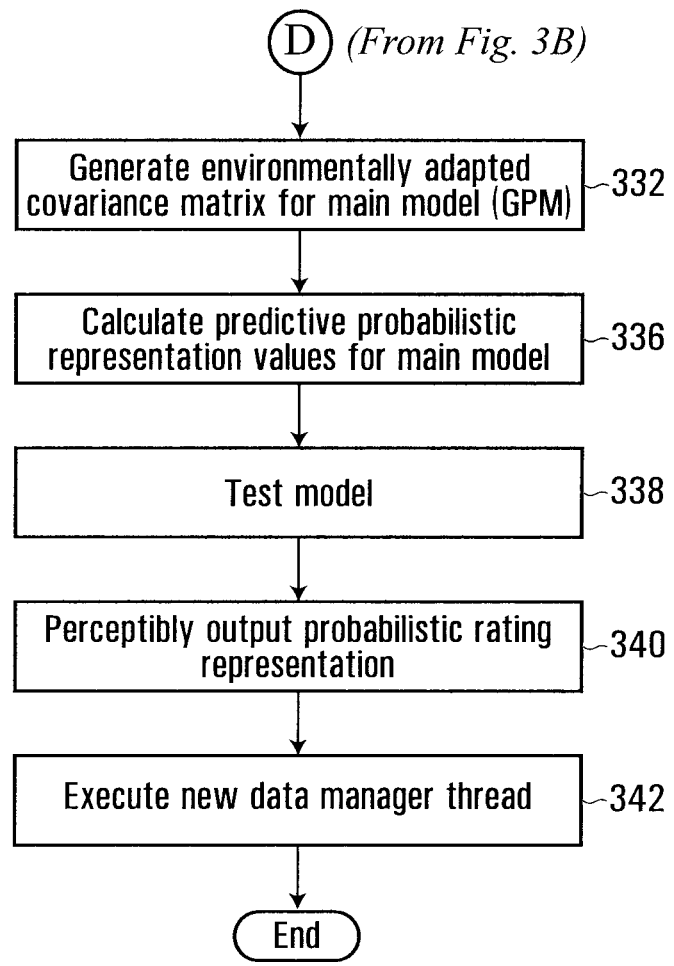

Referring to FIGS. 1, 2A and 3, an environment modelling routine is shown generally at 300 in FIGS. 2A and 3. Generally, in this embodiment the environment modelling routine 300 configures the processor 110 of the application server 103 to model and monitor a physical environmental property that has non-stationary heteroscedastic noise, by first constructing a combined input and output noise levels matrix containing output noise terms associated with the physical environmental property and input noise terms associated with at least one independent variable with which the physical environmental property is correlated, then using the combined input and output noise levels matrix to construct a main Gaussian Processes (GP) model that models the physical environmental property and its non-stationary heteroscedastic noise, then co-operating with an output device to generate and perceptibly output a predictive probabilistic representation of the environmental property, using the main GP model. The predictive probabilistic representation includes a respective range of possible values of the physical environmental property for each respective value of the at least one independent variable, the range of possible values reflecting both the input noise terms associated with the independent variable and the output noise terms associated with the physical environmental property.

More particularly, in this embodiment the environment modelling routine 300 configures the processor 110 to construct the combined input and output noise levels matrix by constructing a simplified GP model representing the physical environmental property with stationary noise independent of inputs, then using the simplified GP model to construct a noise GP model representing noise levels associated with the environmental property. In this embodiment the environment modeling routine then configures the processor to use the simplified GP model and the noise GP model to construct the main GP model.

Advantageously, in contrast with standard GP approaches, the process carried out by the processor under the direction of the environment modelling routine 300 allows input uncertainty to be propagated without encountering analytically intractable differential equations, and allows the avoidance of assumptions about output noise that are inappropriate for environmental data, such as the typical GP assumption of fixed stationary noise. By avoiding intractability, the execution of the environment modelling routine 300 solves a technical problem with the operation of the processor 110, making it possible to obtain a solution using a combination of native instructions from among the predefined instruction set architecture of the processor 110. As noted above, it has been found that such a process also tends to converge quickly in a small number of iterations with a typical number of field visit observations, thereby providing yet another technical advantage by tending to reduce the number of floating-point operations that the processor must perform to arrive at a solution. This latter technical advantage is particularly useful for processing the large data sets that tend to typify environmental data, which often include both continuous/periodic data and discrete field data accumulated over years or decades.

In the example of the present embodiment, the environment modelling routine 300 models stage-discharge relationships, with the independent input variables being time and the physical environmental property of stage (water level), and the dependent output variable being the physical environmental property of discharge (volumetric flow rate). For this example, the following terms are used:

$x_i = [t_i, s_i]^T$, $y_i = q_i$, $\varepsilon_{yi} = \varepsilon_{qi}$, $\varepsilon_{xi} = [0, \varepsilon_{si}]^T$, $\sigma^2_{yi} = \sigma^2_{qi}$, $\Sigma_{x_i} = \begin{pmatrix} 0 & 0 \\ 0 & \sigma^2_{si} \end{pmatrix}$ where t is the time, s is stage and q is discharge.

In this embodiment, the environment modelling routine 300 directs the processor to define and solve for three Gaussian processes, namely, the Main GP model, the Simplified GP model and the Noise GP model discussed above. To assist in understanding the environment modelling routine 300, those three GPs are briefly summarized below.

GPM:

In stage-discharge modeling, from equation (14), the uncertainty model can be re-written as:

$$q_i = f_i + \varepsilon_{xi}^T (\nabla_x \overline{f})_i + \varepsilon_{qi} \qquad (32)$$

where $$(\nabla_x \overline{f})_i = \left[\left(\frac{\partial \overline{f}}{\partial t}\right)_i, \left(\frac{\partial \overline{f}}{\partial s}\right)_i\right]^T \approx \left[\left(\frac{\Delta \overline{f}}{\Delta t}\right)_i, \left(\frac{\Delta \overline{f}}{\Delta s}\right)_i\right]^T =$$

$$\left[\frac{\overline{f}_i - \overline{f}_{i-1}}{t_i - t_{i-1}}, \frac{\overline{f}_i - \overline{f}_{i-1}}{s_i - s_{i-1}}\right]^T$$

is a vector of derivatives of the average or expected value $\overline{f}$ of the latent function with respect to stage s and time t at time step i and $\varepsilon_{xi} = [0, \varepsilon_{si}]^T$, assuming there is no uncertainty on time steps $t_i$. With the assumption of Gaussian noise we have:

$$\varepsilon_{qi} \sim \mathcal{N}(0, \sigma^2_{qi}) \qquad (33)$$

$$\varepsilon_{x_i} \sim \mathcal{N}(0, \Sigma_{x_i}) \text{ where } \Sigma_{x_i} = \begin{pmatrix} 0 & 0 \\ 0 & \sigma^2_{si} \end{pmatrix} \qquad (34)$$

and $\sigma_{qi} = r(x_i)$. The probability of noisy discharge observation given the model information and inputs will be:

$$P(q_i | f_i, x_i) \sim \mathcal{N}(f_i, \sigma^2_{qi} + (\nabla_x \overline{f})_i^T \Sigma_{x_i} (\nabla_x \overline{f})_i) \text{ for } i = 1, \ldots, n \qquad (35)$$

and if we expand the gradient term replacing $\partial$ with $\Delta$:

$$P(q_i | f_i, x_i) \sim \mathcal{N}\left(f_i, \sigma^2_{qi} + \left(\frac{\Delta \overline{f}}{\Delta s}\right)_i^2 \sigma^2_{si}\right) \text{ for } i = 1, \ldots, n \qquad (36)$$

From the above, the expected values and variances for predictive discharge distribution at new (unobserved) input point $x^* = [t^*, s^*]^T$ under this Main GP model will be given by:

$$K_q = \text{diag}\{\sigma^2_{qi}\}_{i=1}^n + \text{diag}\left\{\left(\frac{\Delta \overline{f}}{\Delta s}\right)_i^2 \sigma^2_{si}\right\}_{i=1}^n = \qquad (37)$$

$$\begin{bmatrix} \sigma^2_{q1} & \cdots & 0 \\ \vdots & \ddots & \vdots \\ 0 & \cdots & \sigma^2_{qn} \end{bmatrix} + \begin{bmatrix} \left(\frac{\Delta \overline{f}}{\Delta s}\right)_1^2 \sigma^2_{s1} & \cdots & 0 \\ \vdots & \ddots & \vdots \\ 0 & \cdots & \left(\frac{\Delta \overline{f}}{\Delta s}\right)_n^2 \sigma^2_{sn} \end{bmatrix}$$

$$k_{q^*} = \sigma^2_{q^*} + \left(\frac{\Delta \overline{f}}{\Delta s}\right)_*^2 \sigma^2_{s^*} \qquad (38)$$

$$\mathbb{E}[f^* | X, q, K_q, x^*] = k(x^*, X)[K(X, X) + K_q]^{-1} q \qquad (39)$$

$$\mathbb{V}[f^* | X, q, K_q, x^*] = k(x^*, x^*) - k(x^*, X)[K(X, X) + K_q]^{-1} k(X, x^*) \qquad (40)$$

$$\mathbb{V}[q^* | X, q, K_q, k_{q^*}, x^*] = \mathbb{V}[f^* | X, q, K_q, x^*] + k_{q^*} \qquad (41)$$

where

X is a n×D design matrix for all input observations;

$q = [q_1, q_2, \ldots, q_n]^T$ is a vector of discharge observations;

$k(x, x')$ is a covariance function evaluated at inputs x, x' and:

$$K_q = \begin{bmatrix} \sigma^2_{q1} + \left(\frac{\Delta \overline{f}}{\Delta s}\right)_1^2 \sigma^2_{s1} & \cdots & 0 \\ \vdots & \ddots & \vdots \\ 0 & \cdots & \sigma^2_{qn} + \left(\frac{\Delta \overline{f}}{\Delta s}\right)_n^2 \sigma^2_{sn} \end{bmatrix} \qquad (42)$$

$$K(X, X) = \begin{bmatrix} k(x_1, x_1) & \cdots & k(x_1, x_n) \\ \vdots & \ddots & \vdots \\ k(x_n, x_1) & \cdots & k(x_n, x_n) \end{bmatrix} \qquad (43)$$

$$k(x^*, X) = [k(x^*, x_1) \; k(x^*, x_2) \; \ldots \; k(x^*, x_n)] \qquad (44)$$

$$k(X, x^*) = [k(x^*, x_1) \; k(x^*, x_2) \; \ldots \; k(x^*, x_n)]^T \qquad (45)$$

For hyperparameter optimization with any standard gradient based optimization, such as fminunc function from Matlab (Mathworks) optimization toolbox, for example, both the objective function used for optimization and its derivatives with respect to all hyperparameters should be constructed and given as a callback function to the optimizer. The negative log marginal likelihood for GPM will be used as the objective function F:

$$F(\theta_{GPM}, X, q, K_q) = -\log P(q | X) = \qquad (46)$$
$$\frac{1}{2} q^T [K(X, X) + K_q]^{-1} q + \frac{1}{2} \log|K(X, X) + K_q| + \frac{n}{2} \log 2\pi$$

where $\theta_{GPM}$ is a hyperparameter vector and the derivatives with respect to hyperparameter $\theta_j$ will be given by:

$$\frac{\partial F}{\partial \theta_j} = \frac{1}{2} tr\left((\alpha \alpha^T - K'^{-1}) \frac{\partial (K')}{\partial \theta_j}\right) \text{ for all } \theta_j \text{ in } \theta_{GPM} \qquad (47)$$

where $K' = K(X, X) + K_q$ and $\alpha = K'^{-1}$. If we assume all noise levels in $K_q$ are given for GPM, and further assume that a composite covariance function as defined by equation (65) to equation (68) below is selected at block 308, then under this assumption the hyperparameter vector would only contain composite covariance function hyperparameters:

$$\theta_{GPM} = [\sigma_{fRQ} \alpha_{RQ} \lambda_{1RQ} \lambda_{2RQ} \lambda_{1EXP} \lambda_{2EXP} \lambda_{1LIN} \lambda_{2LIN}]^T \quad (48)$$

(Alternatively, if input noise values $\sigma_{s1} \ldots \sigma_{sn}$ and/or output noise values $\sigma_{q1} \ldots \sigma_{qn}$ from $K_q$ in equation (42) are unknown, then these additional terms from $K_q$ may be added to the hyperparameter vector of equation (48) to be optimized along with the other hyperparameters. As a further alternative, if input noise values $\sigma_{s1} \ldots \sigma_{sn}$ are unknown then they may be estimated from a separate "single sensor" execution of the environment modeling routine, as discussed below under the heading, "Alternatives".)

Consequently:

$$\frac{\partial (K')}{\partial \theta_j} = \quad (49)$$

$$\frac{\partial (K)}{\partial \theta_j} = \begin{bmatrix} \frac{\partial (k_{RQ})}{\partial \theta_j}(x_1, x_1) + & & \frac{\partial (k_{RQ})}{\partial \theta_j}(x_1, x_n) + \\ \frac{\partial (k_{EXP})}{\partial \theta_j}(x_1, x_1) + & \cdots & \frac{\partial (k_{EXP})}{\partial \theta_j}(x_1, x_n) + \\ \frac{\partial (k_{LIN})}{\partial \theta_j}(x_1, x_1) & & \frac{\partial (k_{LIN})}{\partial \theta_j}(x_1, x_n) \\ \vdots & \ddots & \vdots \\ \frac{\partial (k_{RQ})}{\partial \theta_j}(x_n, x_1) + & & \frac{\partial (k_{RQ})}{\partial \theta_j}(x_n, x_n) + \\ \frac{\partial (k_{EXP})}{\partial \theta_j}(x_n, x_1) + & \cdots & \frac{\partial (k_{EXP})}{\partial \theta_j}(x_n, x_n) + \\ \frac{\partial (k_{LIN})}{\partial \theta_j}(x_n, x_1) & & \frac{\partial (k_{LIN})}{\partial \theta_j}(x_n, x_n) \end{bmatrix} \text{ where}$$

$$\frac{\partial (k_{RQ})}{\partial \theta_j}(x_1, x_1)$$

is the derivative of $k_{RQ}$ with respect to $\theta_j$ (e.g. $\sigma_{fRQ}$) valuated at $(x_1, x_1)$, etc. This means, in order to calculate $$\frac{\partial F}{\partial \theta_j}$$

from equation (47), we first need to calculate the derivative of each covariance function with respect to $\theta_j$ and then construct the matrix given by equation (49). Everything else in equation (47) can be calculated from the current values of $\theta_{GPM}$, X and $K_q$. Note that only the derivative of each covariance function with its own hyperparameter will be non-zero.

In order to optimize GPM hyperparameters with a standard gradient descent algorithm such as fminunc in Matlab optimization toolbox (from Mathworks), the present embodiment employs a callback function with the following pseudo-code:

Optimization Callback for GPM:

--- function EvaluateF(Input $\theta_{GPM}$)
Load X, q, $K_q$ from storage
Evaluate $F_0 = F(\theta_{GPM}, X, q, K_q)$ from equation (46)
Evaluate $g = \frac{\partial F}{\partial \theta_j}$ for all $\theta_j$ in $\theta_{GPM}$ vector from equation (47)
return $F_0$ and g

---

This callback function reads hyperparameters and returns an objective function value $F_0$ and its gradient vector g. The optimization process calls this routine at each iteration.

Even if we assume the noise level at input is given, the predictive distribution for discharge and the objective function F from equations (39), (40), (41) and (46) still depends upon $\bar{f}$ (average of the latent function) and also upon output noise which is a function of input ($\sigma_{qi} = r(x_i)$), which are both unknowns. Therefore, using standard GP approaches to hyperparameter optimization and inference on the Main GP (GPM) would not be possible without estimates of those unknowns. In the present embodiment, such estimates are obtained below at blocks 314 to 322 of the environment modelling routine.

GP1:

The Simplified GP (GP1) is a simplified version of GPM by assuming $\varepsilon_{x_i} = 0$ and $\varepsilon_{qi} = \varepsilon_q \sim \mathcal{N}(0, \sigma_q^2)$ which means output noise is independent of input $x_i$ and also stationary. With that assumption the probability of noisy discharge from equation (36) will become:

$$P(q_i | f_i, x_i) \sim \mathcal{N}(f_i, \sigma_q^2) \text{ for } i=1, \ldots, n \quad (50)$$

This is a standard GP model with $$K_q = \sigma_q^2 I \text{ and } k_{q*} = \sigma_q^2.$$

With these values of $K_q$ and $k_{q*}$ the predictive discharge distribution can be calculated from equations (39), (40) and (41). However in standard GP, the output noise $\sigma_q$ can be considered as a hyperparameter and estimated through optimization. In this case, the augmented hyperparameter vector can be denoted by:

$$\theta_{GP1} = [\sigma_{fRQ} \alpha_{RQ} \lambda_{1RQ} \lambda_{2RQ} \alpha_{EXP} \lambda_{1EXP} \lambda_{2EXP} \lambda_{1LIN} \lambda_{2LIN} \sigma_q]^T \quad (51)$$

(As with equation (48) above, if input noise values $\sigma_{s1} \ldots \sigma_{sn}$ are unknown, then they may be added to the augmented hyperparameter vector of equation (51) for optimization. If desired, the simplified GP model may be further simplified by assuming constant input noise $\sigma_s$, and adding only a single simplified input noise parameter $\sigma_s$ to the augmented hyperparameter of equation (51). Alternatively, the input noise values $\sigma_{s1} \ldots \sigma_{sn}$ may be calculated by a separate "single sensor" execution of the environment modelling routine as discussed below under the heading, "Alternatives".)

The objective function and its derivatives from equations (46) and (47) for the Main GP (GPM) can be used for optimization with new values of $K_q$ and $k_{q*}$. In this case the term $$\frac{\partial (K')}{\partial \sigma_q} = 2\sigma_q I$$

and the derivative for the rest of $\theta_j$ in $\theta_{GP1}$ can simply be calculated from covariance function derivatives as before.

The callback function for optimization will be the same as for the Main GP (GPM) above, with the exceptions that the hyperparameter vector $\theta_{GP1}$ will include the additional hyperparameter $\sigma_q$, and that the callback function for GP1 can be successfully executed using only stage and discharge observations, without having to obtain estimates of the average of the latent function or output noise.

In this regard, unlike GPM, for which standard GP hyperparameter optimization would require estimates of the average of the latent function or output noise, to optimize hyperparameters and run inference on the simplified GP (GP1), only stage and discharge observations (X,q) are required. However, the results are inaccurate because of the inaccurate assumptions that were used to simplify the model (i.e., the assumptions that output noise is stationary and independent of inputs). In the present embodiment, as discussed below in connection with blocks 314 to 322, the Simplified GP model (GP1) is used, in conjunction with the Noise GP model (GP2), to obtain estimates of the additional unknowns discussed above for the Main GP, namely, latent function average ($\bar{f}$) and output noise as a function of input ($\sigma_{qi} = r(x_i)$), in order to permit hyperparameter optimization and inference for the Main GP model (GPM).

GP2:

In this embodiment, the Noise GP model (GP2) is used to model the logarithm of noise levels at time step $t_i$, i.e.

$$e(x_i) = \log(r(x_i)) \quad (52)$$

where $$\sigma_{qi} = r(x_i) = \exp(e(x_i)). \quad (53)$$

In other words, in GP2, the input is $x_i$ similar to GPM and GP1 but output is the logarithm of noise levels.

In this embodiment, the Bayesian prior on function e for the Noise GP model (GP2) is governed by a different covariance function than that which governs the main and simplified GP models GPM and GP1, reflecting the fact that GP2 is for modelling the noise levels rather than the physical environmental property data. More particularly, in this embodiment the covariance function for GP2 is a squared exponential covariance function $k_e$:

$$k_e(x,x') = \sigma_f^2 \exp(-\tfrac{1}{2}(x-x')^T \Lambda^{-2}(x-x')) \quad (54)$$

where $\sigma_f^2$ and $\Lambda = \mathrm{diag}[\lambda 1, \ldots, \lambda D]$ are hyperparameters and the hyperparameter vector for GP2 will be:

$$\theta_{GP2} = [\lambda 1 \ldots \lambda D \sigma_f]^T. \quad (55)$$

With no input/output noise terms, the predictive distribution for e process can be calculated from:

$$\mathbb{E}_{[e^*|X,e,x^*]} = k(x^*,X) K(X,X)^{-1} e \quad (56)$$

$$\mathbb{V}_{[e^*|X,e,x^*]} = k(x^*,x^*) - k(x^*,x^*) K(X,X)^{-1} k(X,x^*) \quad (57)$$

Similarly, the objective function and its derivatives are given by:

$$F(\theta_{GP2}, X, e) = \\ -\log P(e|X) = \tfrac{1}{2} e^T K(X,X)^{-1} e + \tfrac{1}{2} \log|K(X,X)| + \tfrac{n}{2} \log 2\pi \quad (58)$$

$$\frac{\partial F}{\partial \theta_j} = \tfrac{1}{2} tr\!\left((K^{-1} K^{-1^T} - K^{-1})\frac{\partial (K)}{\partial \theta_j}\right) \text{ for all } \theta_j \text{ in } \theta_{GP2} \quad (59)$$

where $K = K(X, X)$ is the covariance matrix. Thus, in order to optimize GP2 hyperparameters with a standard gradient descent algorithm such as fminunc in the Matlab optimization toolbox (from Mathworks), the present embodiment employs a callback function, which may be represented by the following pseudo-code:

--- function EvaluateF(Input $\theta_{GP2}$)

Load X, e from storage

Evaluate $F_0 = F(\theta_{GP2}, X, e)$ from equation (58)

Evaluate $g = \dfrac{\partial F}{\partial \theta_j}$ for all $\theta_j$ in $\theta_{GP2}$ vector from equation (59)

Return $F_0$ and g

---

The training data for this e process (i.e. for GP2) is:

$$\mathcal{D} = \{(x_1, e_1), (x_2, e_2), \ldots, (x_n, e_n)\} \quad (60)$$

but unfortunately the $e_i$ values are unknown quantities that need to be estimated. As discussed below in connection with block 316 of the environment modelling routine, empirical estimates for the $e_i$ values calculated from the results of GP1 will be used to construct the training data for this e process (i.e. for the Noise GP model GP2).

Execution of the Environment Modelling Routine

In this embodiment, the environment modelling routine 300 begins with a first block 302 of codes, which directs the processor 110 to pre-process and partition the environmental data. More particularly, the environmental data to be pre-processed and partitioned includes the discrete data set $\mathcal{D}_D$ stored in the discrete observations store 204 of the database 106, as discussed above in connection with equations (3) and (4).

To achieve this, in this embodiment block 302 directs the processor 110 to communicate with the database server 105 to read the contents of the discrete observations store 204 and to calculate the logarithm (base e) of both the independent and dependent physical environmental properties, which in this embodiment are stage and discharge. In this regard, the present inventor used the fact that the relationship between stage and discharge tends to be almost linear in the LOG domain, which facilitates the modelling process. Accordingly, for each of the n stage and n discharge values of the discrete data set $\mathcal{D}_D$ stored in the discrete observations store 204 for time index i=1 . . . n, block 302 directs the processor to calculate corresponding logarithm values:

$$s_{Li} = \log s_i \quad (61)$$

$$q_{Li} = \log q_i \quad (62)$$

In this embodiment, block 302 then directs the processor 110 to normalize the stage and discharge values. Block 302 first directs the processor 110 to calculate the mean $m_s$ and standard deviation $\sigma_s$ of the n stage-log values $s_L$, and to likewise calculate the mean $m_q$ and standard deviation $\sigma_q$ of the n discharge-log values $q_L$. Block 302 then directs the processor to calculate, for each of the n stage-log values and n discharge log-values $s_L$ and $q_L$, a corresponding normalized value:

$$s_{Ni} = \frac{s_{Li} - m_s}{\sigma_s} \quad (63)$$

$$q_{Ni} = \frac{q_{Li} - m_q}{\sigma_q} \quad (64)$$

Block 302 directs the processor 110 to temporarily store the resulting normalized stage and discharge values $s_{Ni}$ and $q_{Ni}$ in a cache memory portion (not shown) of the RAM 120.

In this embodiment, block 302 then directs the processor 110 to partition the normalized observations. In this regard, the present embodiment uses only a portion of the available discrete observations to train the model; a further portion is used for testing, as described below. In this embodiment, block 302 prompts a user to either approve a default partitioning of the data, or to manually enter different partition boundaries to thereby select a specific portion of the discrete observations for training the model. More particularly, in this embodiment the default partitioning uses a random selection of 70% of the discrete observations for training, and uses the remaining 30% for testing, unless the user specifies which particular observations or cluster of observations should be used in which partition. The ability to override the default partitioning in this manner advantageously allows the system 102 to incorporate a user's expertise regarding the water channel to which the discrete observations relate: for example, if the water channel is known to have been relatively stable over the entire timespan of the available discrete observations, then the selection of a specific portion of the observations for training is almost arbitrary and the default partitioning will tend to yield good results, whereas if the water channel has changed significantly over the entire timespan of the discrete observations, the user may wish to select a more recent portion of the discrete observations for training. Upon receiving the user's response via an input device such as a keyboard (not shown), block 302 directs the processor 110 to partition the discrete observations into training observations and testing observations. Block 302 directs the processor 110 to copy the training portion and testing portion of the normalized discrete observations to, respectively, a training observations store 122 and a testing observations store 126 in the RAM 120.

In this embodiment, block 304 then directs the processor 110 to determine whether uncertainty information is available for any of the training data stored in the training observations store 122. More particularly, block 304 directs the processor 110 to determine whether the discrete observations store 204 in the database 106 contains either non-zero stage error values $\varepsilon_{si}$ or non-zero discharge error values $\varepsilon_{qi}$ for all time-index values corresponding to those of the training data.

If so, then block 306 directs the processor 110 to apply a constraint to the environmental model using the uncertainty information. More particularly, in this embodiment if input noise information is available for the discrete observations of the independent physical environmental property (in this case, stage), then block 306 directs the processor 110 to set an input noise flag active, and likewise if output noise information is available for the discrete observations of the dependent physical environmental property (in this case, discharge), then block 306 directs the processor to set an output noise flag (not shown) active, to indicate that input and/or output uncertainty information is available, respectively. Block 306 directs the processor to copy the available input and output uncertainty information to an input noise portion and an output noise portion, respectively, of an available uncertainty store 128 in the RAM 120. As a simple example, referring back to equations (42) and (48) above, if all of the n stage values s within the training data had the same known associated error $\varepsilon_s$, then block 306 directs the processor 110 to constrain the model by setting the input noise flag active and by setting each of the noise values $\sigma_{s1} \ldots \sigma_{sn}$ in equation (42) equal to $\varepsilon_s$ rather than including $\sigma_{s1} \ldots \sigma_{sn}$ within equation (48) as additional hyperparameters to be optimized according to the steps described below. As a generalization of this example, if stage errors $\varepsilon_{si}$ are known, block 306 sets $\sigma_{si}=\varepsilon_{si}$ for each of the input noise values. Block 306 directs the processor to store the input noise values $\sigma_{si}$ in an input noise portion of the available uncertainty store 128 in the RAM 120.

In most cases, however, known uncertainty information will be unavailable for some or all of the training data, in which case the determination at block 304 is negative, in which case the processor is directed to blocks 308 to 340, to build an environmental model corresponding to the discrete observations.

In this embodiment, block 308 directs the processor 110 to select a composite covariance function for the Main GP (GPM), which will also be used for the Simplified GP (GP1). (However, as discussed below in connection with block 318, a different covariance function is used for the Noise GP, GP2.)

Conventionally, the construction or selection of a suitable covariance function tends to be a complex process requiring significant expertise and ingenuity, in order to select a covariance function having a general form that is sufficiently close to the true form to allow the hyperparameters to be optimized in a feasible number of iterations. In contrast, the present embodiment avoids the need for users to possess such expertise and ingenuity, by configuring the processor 110 to automatically select a composite covariance function from among a plurality of predefined composite covariance functions stored in a composite covariance functions store 210 in the database 106, in which each of the predefined composite covariance functions corresponds to a particular respective observed physical environmental property that the system 102 is designed to model. Thus, for example, the predefined composite covariance function corresponding to stage-discharge data may differ from the predefined composite covariance function for turbidity data. Advantageously, the automatic selection of an appropriate predefined composite covariance function improves the repeatability and consistency of rating curves, in comparison to conventional approaches in which different hydrologists would often select different covariance functions and arrive at slightly different rating curves.

In this embodiment, in which the environmental data comprises stage-discharge data, block 308 directs the processor 110 to automatically select, from among the plurality of predefined composite covariance functions in the composite covariance functions store 210, a composite covariance function that the processor will use to generate an environmentally adapted covariance matrix corresponding to the values of the at least one independent variable, as discussed in greater detail below in connection with block 332. More particularly, in this embodiment the automatically selected composite covariance function includes at least one stationary term including a rational quadratic term, and at least one non-stationary term. More particularly still, in this embodiment the at least one non-stationary term includes a linear term, and further includes an exponential term. In this regard, such a composite covariance function is not believed to be known in the art, and has been found to be particularly advantageous for modelling environmental data. In the present embodiment, for example, the physical environmental data includes hydrological data relating to a waterway, the at least one independent variable includes stage and time (stage representing a measured water level of the waterway, and the time at which the water level was measured), and the dependent variable includes a discharge or flow rate of the waterway at the time. In such an embodiment, the exponential term provides a good initial form for modelling the water channel data, the linear term provides improved results for extreme high and extreme low stage values, and the rational quadratic term advantageously provides the flexibility to have breakpoints across the channel and to model possible nonlinear changes in the time dimension that may result from environmental changes (the rational quadratic term can model nonlinearity in both the stage and time dimensions). As the above advantages illustrate that this particular form of composite covariance function is particularly well-adapted to modelling environmental data, which indeed it was created for the purpose of modelling, the resulting corresponding covariance matrix is referred to herein as an "environmentally adapted" covariance matrix, and likewise, the composite covariance function itself may be referred to as an "environmentally adapted" covariance function.

More particularly still, in this embodiment block 308 directs the processor to select, as the covariance function, the following composite covariance function which is stored in the composite covariance functions store 210 for stage-discharge data:

$$k = k_{EXP} + k_{RQ} + k_{LIN} \qquad (65)$$

wherein:
the rational quadratic term $k_{RQ}$ is given by:

$$k_{RQ}(x, x') = \sigma_f^2 \left(1 + \frac{1}{2\alpha}(x - x')^T \Lambda^{-2}(x - x')\right)^{-2\alpha} \qquad (66)$$

wherein:
$\Lambda = \text{diag}[\lambda_1, \ldots \lambda_D]$ where D is the number of dimensions of the input vector $x_i = [t_i \ s_i]^T$, so that in this embodiment where D=2, $$\Lambda = \begin{bmatrix} \lambda_1 & 0 \\ 0 & \lambda_2 \end{bmatrix},$$

wherein $\lambda_1$ and $\lambda 2$ are scaling hyperparameters;
$\sigma_f$ is a scalar noise factor hyperparameter; and
$\alpha$ is a scaling factor hyperparameter;
the exponential term $k_{EXP}$ is given by:

$$k_{EXP}(x,x') = (x^T \underline{\Lambda}^{-2} x')^\alpha \qquad (67)$$

and the linear term $k_{LIN}$ is given by:

$$k_{LIN}(x,x') = x^T \underline{\Lambda}^{-2} x' \qquad (68)$$

Block 308 directs the processor 110 to store the selected composite covariance function in a composite covariance function store 130 in the RAM 120.

Although the form of the diagonal matrix $\Lambda$ is the same for all three terms, the values of the hyperparameters $\lambda_1$ and $\lambda_2$ are different for each of the three terms. Similarly, the hyperparameter a is different for the rational quadratic term than for the exponential term. Accordingly, the composite covariance function defined by equations (65) to (68) for the Main GP model GPM has three sets of hyperparameters to be optimized:

$$\theta_{RQ} = [\sigma_{fRQ} \alpha_{RQ} \lambda_{1RQ} \lambda_{2RQ}]^T \qquad (69)$$

$$\theta_{EXP} = [\alpha_{EXP} \lambda_{1EXP} \lambda_{2EXP}]^T \qquad (70)$$

$$\theta_{LIN} = [\lambda_{1LIN} \lambda_{2LIN}]^T \qquad (71)$$

Collectively, therefore, the hyperparameters to be optimized for GPM may be denoted by a column vector:

$$\theta = [\sigma_{fRQ} \alpha_{RQ} \lambda_{1RQ} \lambda_{2RQ} \alpha_{EXP} \lambda_{1EXP} \lambda_{2EXP} \lambda_{1LIN} \lambda_{2LIN}]^T \qquad (72)$$

As noted above, if input noise is unknown, then the additional input noise terms $\sigma_{s1} \ldots \sigma_{sn}$ from equation (42) above are also added to $\theta$ and treated as additional hyperparameters to be estimated by optimization. Thus, in this embodiment block 308 directs the processor to check whether the input noise flag that was set at block 306 is active to indicate available input noise, and if not, block 308 directs the processor to add the input noise terms $\sigma_{s1} \ldots \sigma_{sn}$ to the hyperparameter vector of equation (72) for optimization. (Alternatively, unknown input noise can be determined from a separate "single sensor" execution of the environment modelling routine, as discussed under "Alternatives" below.) Note that output noise terms $\sigma_{yi}^2$ (or $\sigma_{qi}^2$ in this embodiment) are estimated differently as described below at blocks 320 and 321. Generally, k from equation (65) above corresponds to the noise-free or latent function $f(x)$ from equation (14) above. The additional noise terms of equation (14) correspond to independent and dependent noise terms shown in the $K_y$ matrix.

Alternatively, different composite covariance functions may be stored and selected for different types of environmental data. For example, a composite covariance function relating to index velocity data may omit an exponential term and provide only a linear non-stationary term in combination with a stationary rational quadratic term in both time and index velocity input dimensions.

In this embodiment, following selection of the main composite covariance function at block 308, block 310 directs the processor 110 to initialize the hyperparameters for the three defined Gaussian processes. To achieve this, block 310 first directs the processor 110 to initialize the hyperparameters shown in equation (72) above for the Main GP (GPM). Block 310 first directs the processor 110 to determine whether optimized hyperparameters for the selected composite covariance function and for the discrete observations have been previously stored in an optimized hyperparameters store 214 in the database 106. If so, then block 310 directs the processor 110 to use the previously optimized hyperparameters as the initial values of the hyperparameters, and to store these initial values in a Main GP hyperparameters portion of a hyperparameters store 132 in the RAM 120. If not, then in the present embodiment, block 310 directs the processor to set the initial value of all hyperparameters for GPM to 1.

In this embodiment, block 310 then directs the processor 110 to initialize the hyperparameters for the Simplified GP model GP1. More particularly, block 310 directs the processor 110 to copy the hyperparameters that it has just initialized for GPM, and to append a further hyperparameter for output noise, initialized to $\sigma_q = 1$, thereby initializing hyperparameter values for all of the hyperparameters in the augmented hyperparameter vector of equation (51) above. Block 310 directs the processor to store the initialized hyperparameter values in a Simplified GP hyperparameters portion of the hyperparameters store 132 in the RAM 120.

In this embodiment, block 310 also directs the processor 110 to initialize the hyperparameters for the Noise GP model GP2. As with the Main GP hyperparameters, block 310 directs the processor 110 to determine whether optimized hyperparameters for the noise GP model GP2 have been previously stored in an optimized hyperparameters store 214 in the database 106, and if so, to use the previously optimized hyperparameters as the initial values of the GP2 hyperparameters, and to store these initial values in a Noise GP hyperparameters portion of the hyperparameters store 132 in the RAM 120. If no such noise hyperparameters have been previously optimized and stored, then in the present embodiment, block 310 directs the processor to set the initial value equal to one, for each of the hyperparameters of the hyperparameter vector of equation (55) above, and to store the initialized hyperparameter values in the Noise GP hyperparameters portion of the hyperparameters store 132 in the RAM 120.

In the present embodiment, following hyperparameter initialization at block 310, block 312 directs the processor 110 to estimate hyperparameters of the Simplified GP model GP1. To achieve this, block 312 directs the processor to optimize the hyperparameters by executing a callback function to a standard optimization routine, such as the fminunc function in the Matlab (from Mathworks) optimization toolbox, for example. In the present embodiment, the optimal hyperparameters for GP1 are those that maximize its log marginal likelihood, or equivalently, that minimize its negative log marginal likelihood. Therefore, similarly to the objective function of the Main GP model GPM of equation (46) above, in the present embodiment the negative log marginal likelihood for GP1 is used as the objective function, and the fminunc function of Matlab is used to minimize the objective function. For example, the callback function may be represented by the following pseudo-code:

--- function EvaluateF(Input $\theta_{GP1}$)

Load X, q, $K_q$ from storage

Evaluate $F_0 = F(\theta_{GP1}, X, q, K_q)$ from equation (46)

Evaluate $g = \dfrac{\partial F}{\partial \theta_j}$ for all $\theta_j$ in $\theta_{GP1}$ vector from equation (47)

return $F_0$ and g

--- where the hyperparameters $\theta_{GP1}$ are given by equation (51) above (including additional input noise hyperparameters $\sigma_{s1} \ldots \sigma_{sn}$ if they were unavailable at blocks 304-306);

equations (37) and (38) reduce to:

$$K_q = \sigma_q^2 I \text{ and } k_{q*} = \sigma_q^2 \tag{73}$$

as a result of the simplifying assumptions underlying the Simplified GP model GP1, wherein I is the identity matrix;

$F_0 = F(\theta_{GP1}, X, q, K_q)$ is the objective function for GP1=negative log marginal likelihood for GP1, of the same form as equation (46) for GPM, replacing $\theta_{GPM}$ with $\theta_{GP1}$ and replacing $K_q$ with $\sigma_q^2 I$; and $$g = \frac{\partial F}{\partial \theta_j}$$

are the partial derivatives of the objective function with respect to each hyperparameter, of the same form as equation (47) for GPM. For the output noise hyperparameter $\sigma_q$, the partial derivative term $$\frac{\partial (K')}{\partial \theta_j} = 2\sigma_q I.$$

The other partial derivatives of the objective function can simply be calculated from the covariance function derivatives. Thus, in this embodiment the callback function executed at block 312 for the Simplified GP model GP1 returns the requested value of the objective function $F_0$ and its gradient vector g, for each iteration. The callback function continues to iteratively adjust and test hyperparameter values, producing new values of $F_0$ and its gradient vector g, until $F_0$ converges to a minimum. Upon convergence, the callback function returns the co-ordinates in hyperparameter space of the located minimum, thereby returning optimized values of all of the hyperparameters of the augmented hyperparameter vector $\theta_{GP1}$ of equation (51) above. Block 312 directs the processor 110 to store the optimized hyperparameters in a Simplified GP portion of the hyperparameters store 132 in the RAM 120. In this embodiment, block 312 also directs the processor 110 to transmit the optimized hyperparameters to the database server 105, for storage in a Simplified GP portion of an optimized hyperparameters store 214 in the database 106.

In this embodiment, block 314 then directs the processor 110 to generate an average or expected value of the Simplified GP model GP1, for each of a plurality of training points. In this embodiment, the training points are the points in independent variable space for which partitioned discrete observations are stored in the training observations store 122 in the RAM 120, following execution of block 302 above. Given training data X and q stored in the training observations store 122 at block 302 above, and the optimized hyperparameters $\theta_{GP1}$ of the Simplified GP model GP1 stored in the Simplified GP portion of the hyperparameters store 132 at block 312 above, block 314 directs the processor 110 to calculate an expected or average value from equation (39) above, for each training data point, as follows:

$$\bar{f}_i = \mathbb{E}[f_i|X,q,K_q,x_i] = k(x_i,X)[K(X,X)+K_q]^{-1}q \tag{74}$$

where $x_i$ are training inputs and $\bar{f}_i$ is the expected or estimated mean value for discharge q at training point $x_i$. Block 314 directs the processor 110 to store the resulting expected values in a Simplified GP expected values store 150 in the RAM 120.

In this embodiment, block 315 then directs the processor 110 to determine whether output noise (discharge error) information for the training data set is available and was stored in the available uncertainty store 128, as discussed above at blocks 304-306, by checking whether the output noise flag was set active at block 306. If so, then block 321 directs the processor to read the output noise values $\sigma_{qi}$ stored in the output noise portion of the available uncertainty store 128, and to store them as output noise estimates in an estimated output noise store 156 in the RAM 120, and the processor is then directed to block 322 below.

In typical cases involving environmental data, however, output noise is not available, in which case the determination at block 315 is negative. In this case, the processor is directed by blocks 316 to 320 below to generate estimates of output noise levels for the Main GP model GPM, using the Noise GP model GP2.

In this embodiment, block 316 directs the processor 110 to generate an empirical error term of the Simplified GP model GP1 for at least some of the plurality of training points. More particularly, block 316 directs the processor to randomly select at least m different samples $\hat{q}_i^j$ (preferably m>50) of the expected or estimated discharge values that were stored in the simplified GP expected values store 150 at block 314 above (labelled as estimates of the expected value or average $\hat{f}_i$ in connection with block 314). Block 316 then directs the processor to compare the actual observed discharge values $q_i$ stored in the training observations store 122 to the samples $\hat{q}_i^j$, and to calculate a variance for each training point:

$$\text{var}[q_i, \hat{q}_i] \approx \frac{1}{m}\sum_{j=1}^{m}(q_i - \hat{q}_i^j)^2 \qquad (75)$$

In this embodiment, block 316 then directs the processor 110 to calculate an empirical error term $e_i$ for each of the n training points, and to store the resulting error terms in an empirical errors store 152 in the RAM 120:

$$e_i = \log(\mathcal{V}ar[y_i, \hat{y}_i]) \text{ for } i=1 \ldots n \qquad (76)$$

Block 316 then directs the processor 110 to construct a training data set for the Noise GP model GP2 using the empirical error terms $e_i$:

$$\mathcal{D} = \{(x_1, e_1), (x_2, e_2), \ldots, (x_n, e_n)\} \qquad (77)$$

Block 316 directs the processor 110 to store the resulting training data set in a noise GP training data store 154 in the RAM 120.

In the present embodiment, block 318 then directs the processor 110 to estimate hyperparameters of the Noise GP model GP2, in a manner similar to the hyperparameter optimization for the Simplified GP model GP1 above at block 312. More particularly, in this embodiment block 318 directs the processor 110 to pass the training data set stored in the noise GP training data store 154 (generated at Block 316 using equation (77)), along with the initialized values of the hyperparameters stored in the Noise GP hyperparameters portion of the hyperparameters store 132 (generated at block 310), to a callback function of Matlab (or any other suitable standard optimization package). Recall that, in view of the fact that a different covariance function given by equation (54) above is used for the Noise GP model GP2 than for the other two GPs, the different objective function and its derivatives as specified in equations (58) and (59) above are also passed to the callback function. Accordingly, block 318 may be represented by the following illustrative pseudo-code:

--- function EvaluateF(Input $\theta_{GP2}$)

Load X, e from storage

Evaluate $F_0 = F(\theta_{GP2}, X, e)$ from equation (58)

Evaluate $g = \frac{\partial F}{\partial \theta_j}$ for all $\theta_j$ in $\theta_{GP2}$ vector from equation (59)

Return $F_0$ and g

--- where X,e comprise the training data set D generated at block 316 above. In this embodiment, the callback function executed at block 318 for the Noise GP model GP2 returns the requested value $F_0$ of the objective function F from equation (58) and its gradient vector g from equation (59), for each iteration. The callback function continues to iteratively adjust and test hyperparameter values, producing new values of $F_0$ and its gradient vector g, until $F_0$ converges to a minimum. Upon convergence, the callback function returns the co-ordinates in hyperparameter space of the located minimum, thereby returning optimized values of all of the hyperparameters of the hyperparameter vector $\theta_{PG2}$ of equation (55) above. Block 318 directs the processor 110 to store the optimized hyperparameters in a Noise GP portion of the hyperparameters store 132 in the RAM 120. In this embodiment, block 318 also directs the processor 110 to transmit the optimized hyperparameters to the database server 105, for storage in a Noise GP portion of an optimized hyperparameters store 214 in the database 106.

In this embodiment, block 320 then directs the processor 110 to generate output noise levels for the Main GP model GPM using the Noise GP model GP2. To achieve this, in this embodiment block 320 first directs the processor 110 to use the training data set $\mathcal{D}$ from the noise GP training data store 154 and the optimized hyperparameters $\theta_{GP2}$ from the Noise GP portion of the hyperparameters store 132, in conjunction with equation (56) above, to calculate an expected value or predicted mean:

$$\bar{e}_i = \mathbb{E}[e_i | X, e, x_i] \text{ for all } i=1 \ldots n \qquad (78)$$

where $x_i$ are training inputs. Since the $\bar{e}_i$ values from equation (78) represent the expected value or estimated mean for logarithmic noise level at training inputs, it follows that the unknown output noise terms $\sigma_{qi}$ for the main GP model (GPM) can be estimated as:

$$\sigma_{qi} = r(x_i) = \exp(\bar{e}_i) \qquad (79)$$

Block 320 directs the processor to use equations (56), (78) and (79) above to generate the above estimates of output noise levels, and to store them in the estimated output noise store 156 in the RAM 120.

In this embodiment, block 322 then directs the processor 110 to construct a combined input and output noise levels matrix for the Main GP model (GPM) using the generated output noise levels from block 320 above. More particularly, block 322 directs the processor to use the expected values $\bar{f}_i$ of the Simplified GP model GP1 that were calculated at block 314 and stored in the simplified GP expected values store 150, along with their corresponding stage values s from the training observations store 122, as well as the estimated output noise levels $\sigma_{qi}$ that were calculated at block 320 and stored in the estimated output noise store 156, to construct a combined input and output noise levels matrix $K_q$ given by equation (42) above. With respect to the input noise term $\sigma_{s1} \ldots \sigma_{sn}$ in equation (42), if known input noise was available at blocks 304-306 (or was generated through a separate "single sensor" execution of the environment modelling routine as discussed below under "Alternatives"), then these values are stored in the input noise portion of the available uncertainty store 128; alternatively, if input noise was unknown at blocks 304-306 then the input noise terms $\sigma_{s1} \ldots \sigma_{sn}$ were added to the hyperparameters vector given by equation (51), and were optimized and stored in the simplified GP portion of the hyperparameters store 132, at block 312 above. Block 322 directs the processor 110 to store the combined input and output noise levels matrix in a noise levels matrix store 158 in the RAM 120.

In this embodiment, block 324 then directs the processor 110 to estimate the hyperparameters of the Main GP model (GPM), using the combined input and output noise levels matrix generated at block 322 above. To achieve this, block 324 first directs the processor 110 to re-initialize the hyperparameters for the Main GP model GPM, by setting the hyperparameter values $\theta_{GPM}$ of the Main GP portion of the hyperparameters store 132 equal to the already optimized hyperparameters $\theta_{GP1}$ stored in the Simplified GP portion of the hyperparameters store 132. Block 324 then directs the processor to pass the re-initialized hyperparameters to a standard optimization callback function, along with the training data X and q from the training observations store 122 and the combined input and output noise levels matrix $K_q$ from the noise levels matrix store 158. Thus, the callback function executed by the processor at block 324 may be represented by the following illustrative pseudo-code:

```
function EvaluateF(Input θ_GPM)
Load X, q, K_q from storage
Evaluate F_0 = F(θ_GPM, X, q, K_q) from equation (46)
Evaluate g = ∂F/∂θ_j  for all θ_j in θ_GPM vector from equation (47)
return F_0 and g
```

In this embodiment, the callback function executed at block 324 for the Main GP model GPM returns the requested value $F_0$ of the objective function F from equation (46) and its gradient vector g from equation (47), for each iteration.

The callback function continues to iteratively adjust and test hyperparameter values, producing new values of $F_0$ and its gradient vector g, until $F_0$ converges to a minimum. Upon convergence, the callback function returns the co-ordinates in hyperparameter space of the located minimum, thereby returning optimized values of all of the hyperparameters of the hyperparameter vector $\theta_{GPM}$ of equation (48) above. Block 324 directs the processor 110 to store the optimized hyperparameters in a Main GP portion of the hyperparameters store 132 in the RAM 120. In this embodiment, block 318 also directs the processor 110 to transmit the optimized hyperparameters to the database server 105, for storage in a Main GP portion of an optimized hyperparameters store 214 in the database 106.

In this embodiment, block 326 then directs the processor 110 to test for convergence. More particularly, in this embodiment block 326 directs the processor to calculate a sum of objective functions:

$$F_{total} = F_{GPM} + F_{GP2} \quad (80)$$

where $F_{GPM}$ is the objective function for the Main GP model GPM given by equation (46) and $F_{GP2}$ is the objective function for the Noise GP model GP2 given by equation (58). Block 326 directs the processor 110 to compare the sum of objective functions to the contents of a convergence test store 160 in the RAM 120: on the first iteration of block 326, the convergence test store 160 will contain a default value (in this embodiment, zero), and on subsequent iterations of block 326, the convergence test store 160 will contain the sum of objective functions $F_{total}$ for the previous iteration of block 326.

If the magnitude of the difference between the current sum of objective functions and the contents of the convergence test store 160 exceeds the predefined threshold value δ, then block 328 directs the processor 110 to determine whether a predefined maximum number of iterations has been reached, suggesting that the total objective function is oscillating rather than converging. If so, the environment modelling routine 300 is ended; optionally, if desired, block 328 may prompt a user to adjust one or more parameters of the environment modelling routine 300, such as decreasing the step sizes of each hyperparameter iteration for example, and may further prompt the user to re-execute the environment modelling routine 300 with the adjusted parameters.

If it is determined at block 328 that the maximum number of iterations has not been reached, block 330 directs the processor to overwrite the contents of the convergence test store 160 with the current sum of objective functions $F_{total}$. Block 330 further directs the processor 110 to set GP1=GPM with the hyperparameters of the current iteration, and returns the processor back to block 314 above for the next iteration of blocks 314-328.

On the other hand, if at block 326 it is determined that the magnitude of the difference between the current sum of objective functions $F_{total}$ and the contents of the convergence test store 160 is less than a predefined threshold value δ, then convergence is deemed to have occurred, and the processor is directed to block 332.

In this embodiment, block 332 directs the processor 110 to use a composite covariance function to generate an environmentally adapted covariance matrix corresponding to the values of the at least one independent variable, the composite covariance function including at least one stationary term including a rational quadratic term, and at least one non-stationary term. More particularly, in this embodiment block 332 directs the processor to generate the covariance matrix K(X, X) for the Main GP model GPM, using the definition of the covariance matrix from equation (43), the composite covariance function defined by equations (65) to (68) that was selected at block 308 above, and the optimized hyperparameters $\theta_{GPM}$ that were obtained at block 324 and stored in the Main GP portion of the hyperparameters store 132. In this embodiment, block 332 directs the processor 110 to store the environmentally adapted covariance matrix in a Main GP portion of a covariance matrices store 136, and also directs the processor 110 to transmit the environmentally adapted covariance matrix to the database server 105, for storage in a covariance matrices store 218 in the database 106.

In the present embodiment, block 336 then directs the processor 110 to calculate predictive probabilistic representation values for the Main GP model GPM. More particularly, in this embodiment block 336 directs the processor to generate a predictive probabilistic representation of a range of possible values of the dependent observed physical environmental property (in this case, discharge), for each of a plurality of independent variable (stage, time) data points. To achieve this, block 336 directs the processor to use the composite covariance function of equations (65) to (68) with the optimized hyperparameters $\theta_{GPM}$ that were stored in the Main GP portion of the hyperparameters store 132, and the corresponding covariance matrix stored in the Main GP portion of the covariance matrices store 136, to solve for the expected value or average $\mathbb{E}$ given by equation (39) and the variance $\mathbb{V}$ given by equation (41), for each input $x_i$ of each discrete observation stored in the training observations store 122. Block 336 directs the processor to store the resulting expected value $\mathbb{E}$ and variance $\mathbb{V}$ for each training data input $x_i$ in a predictive probabilistic representation-per-point store 140. Block 336 also directs the processor 110 to transmit the resulting expected value and variance for each training point to the database server 105, for storage in a continuous derived probabilistic representation per point store 216 in the database 106.

In this embodiment, block 338 directs the processor 110 to test the model constructed above. For each of the testing discrete observations $x_i$ stored in the testing observations store 126, block 338 directs the processor 110 to calculate the expected value $\mathbb{E}$ for each test data point, in the same way as was done at block 336 for the training data, and compare it to the actual observed discharge value $q_i$. More particularly, block 338 directs the processor to compare the expected and actual values for all of the testing discrete observations $x_i$, and to determine whether a predefined comparative function, which in this embodiment is the root-mean-square of the difference values, RMS=

$\sqrt{\Sigma_{i=1}^{n}(\mathcal{F}^{*}_{i}-q_{i})^{2}/n}$, has fallen below a predefined minimum threshold. If so, then the model is considered to pass the test. Alternatively, the model may be tested in other ways. For example, the testing discrete observations may be compared to the expected value and variance values to ensure that at least a desired percentage (e.g. 95%) of the testing values $q_i$ do not deviate from the expected value by more than either the variance or another error measure that is functionally dependent upon the variance. Block 338 directs the processor to store the results of the test in a model test results store 209 in the database 106, in association with the contents of the optimized hyperparameters store 214 and of the covariance matrices store 218 that correspond to the current model being tested.

Once the model has been successfully tested, the predictive probability distribution can be used to generate a dependent variable output (discharge), in the form of a probability distribution represented by an expected value and a variance from equations (25), (26) and (27), for any further independent variable input vector (stage, time), irrespective of whether the further input vector is new or old sensor data for which no output is available, or new or old input vectors for which an output is available, as discussed below.

Referring to FIGS. 1, 2A, 3, 5A and 5B, in this embodiment, block 340 then directs the processor 110 to co-operate with the output device 114 to perceptibly output predictive probabilistic representations of a range of possible values of the dependent observed physical environmental property (discharge), each such representation corresponding to a respective observation of the independent variables (stage and time). More particularly, in this embodiment the processor co-operates with the video display device 117 to display the predictive probabilistic representation. In this embodiment the predictive probabilistic representation includes, for each respective value of the at least one independent variable, an expected value of the physical environmental property and an associated variance. To achieve this, in this embodiment block 340 directs the processor 110 to communicate with the client computer 107 via the communications interface 112, to cause the video display device 117 to display the predictive probability distributions generated at block 336 for the testing observations from the testing observations store 126. Block 340 directs the processor 110 to post-process the probability distributions, or more particularly their expected values and variances, to reverse the effects of the pre-processing that was carried out at block 302, effectively de-normalizing and taking the exponentials of the probability distributions, to thereby reverse the effects of equations (61) to (64) above. Block 340 directs the processor 110 to store the post-processed probability distributions in a post-processed probability distributions store 148 in the RAM 120. Block 340 then directs the processor 110 to communicate with the client computer 107 to cause the video display device 117 to generate a visual display of the probabilistic representations of the dependent environmental property. For example, referring to FIGS. 5A and 5B in which a conventional discharge rating curve having no quantification of uncertainty is shown at 502 for comparison, block 340 advantageously directs the processor to instead co-operate with the video display device 117 to display an expected value curve 504 in conjunction with a heteroscedastic combined variance band 506 that reflects both the input noise terms and the output noise terms of the combined input and output noise levels matrix. The expected value curve 504 includes the expected value of the physical environmental property, and the heteroscedastic combined variance band extends above and below the expected value curve 504 and has a variable height 508 for a particular expected value that is proportional to the associated variance for the particular expected value. Advantageously, the perceptibly displayed predictive probabilistic representation comprising the expected value curve 504 and combined variance band 506 immediately inform a decision-maker or other user of the system 100 of the errors associated with the expected value curve 504, so that the decision-maker can consider not only whether the expected value curve 504 crosses a critical threshold, but more significantly whether the combined variance band 506 crosses the critical threshold.

In this embodiment, block 340 also prompts the user as to whether to print the probabilistic rating representations displayed above. If so, block 340 directs the processor 110 to co-operate with the printer 119 to print the predictive probabilistic representations, by communicating with the client computer 107 to cause the printer 119 to generate a tangible printout (in this embodiment including ink on paper) representing the predictive probabilistic representations.

Figure 6:
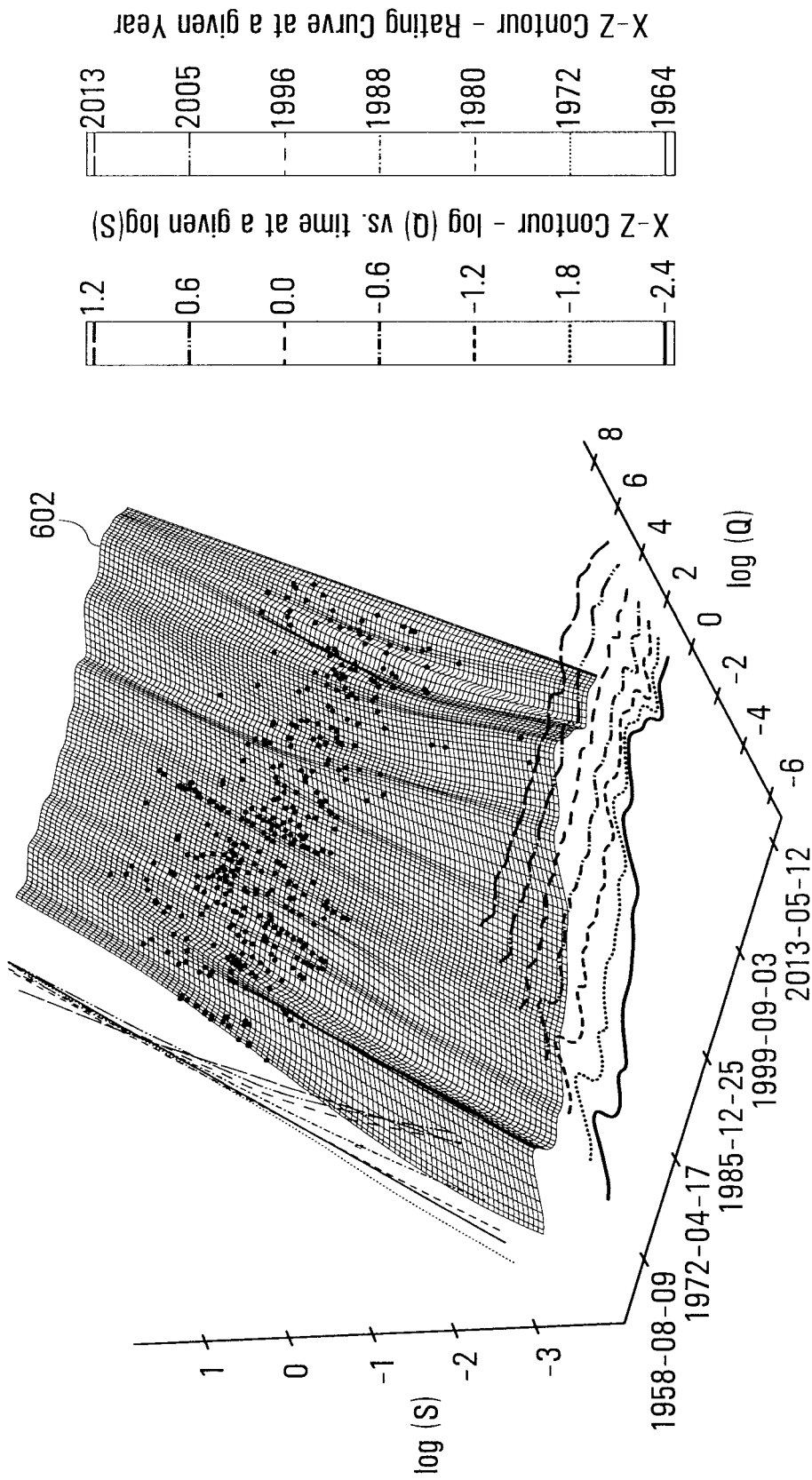
FIG. 6 graphically depicts a time-varying rating surface generated by the system of FIG. 1.

In addition to perceptibly outputting the predictive probabilistic representations for the testing discrete observations, in this embodiment block 340 also prompts the user to select other types of perceptible output options. For example, referring to FIGS. 3 and 6, in this embodiment block 340 prompts the user as to whether to generate and perceptibly output a rating hypersurface comprising an expected value of the dependent observed physical environmental property for each combination of values of the at least one independent variable. If so, then in this embodiment block 340 directs the processor 110 to co-operate with the output device 114 to generate and perceptibly output a time-varying rating surface or hypersurface reflecting the evolution over time of a relationship between the dependent observed physical environmental property and the at least one independent observed physical environmental property. More particularly, in this embodiment block 340 directs the processor 110 to co-operate with the video display device 117 to generate and perceptibly output a three-dimensional rating surface 602 shown in FIG. 6 comprising an expected value of the discharge or flow rate for each combination of values of stage and time. If desired, the variance may also be shown as a variable vertical thickness of the expected value surface, but is not shown in FIG. 6 to avoid obscuring the expected value surface.

In this embodiment, if the user wishes to display probabilistic rating representations for times, or more generally input vectors, for which no predictive probability distribution has yet been calculated, block 340 presents the user with the option of repeating the functions of block 336 above to construct appropriate probability distributions for other possible input points, thereby enabling the perceptible output of the corresponding predictive probabilistic rating representations.

In this embodiment, block 342 then directs the processor to either continue executing an environment monitoring thread 400 stored in the database 106 or to begin executing it if it is not already in progress, and the environment modelling routine 300 is then ended.

Environment Monitoring Thread

Figure 4:
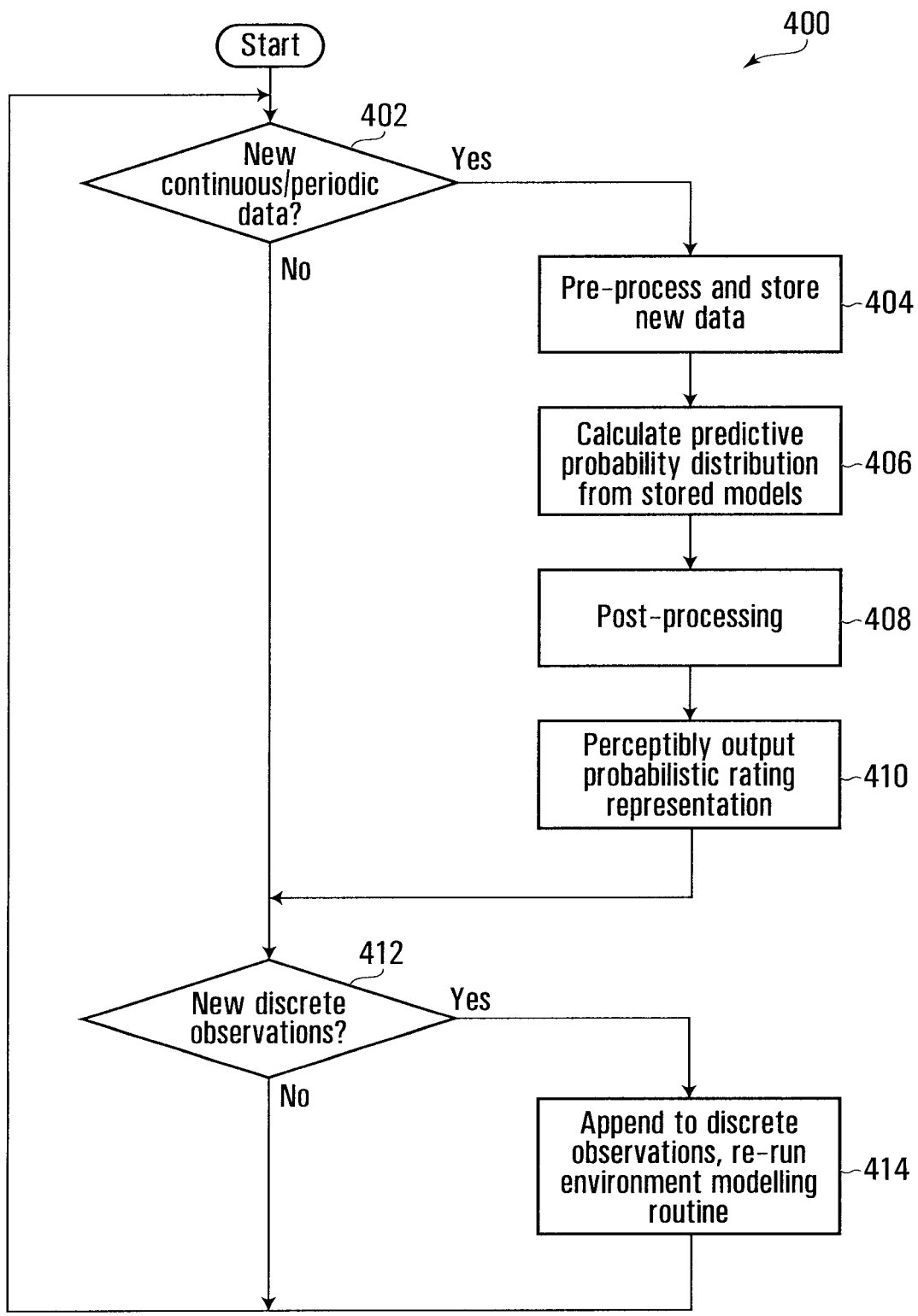
FIG. 4 is a flow-chart of an environment monitoring thread executed by the processor of the system of FIG. 1.

Referring to FIGS. 2A and 4, the environment monitoring thread is shown generally at 400 in FIG. 4. Generally, in this embodiment the environment monitoring thread 400 configures the processor 110 to receive physical environmental measurement data including measured values of a dependent variable which represents the physical environmental property, and of at least one independent variable with which the physical environmental property is correlated. Depending upon whether the received physical environmental measurement data is automated continuous/periodic data or manually acquired field data, the environment monitoring thread either generates and perceptibly outputs a new predictive probabilistic representation, or re-generates the combined input and output noise levels matrix and the main GP model to take into account the new field data, as discussed in greater detail below.

In this embodiment, the environment monitoring thread 400 begins with a first block 402 of codes, which directs the processor 110 to determine whether new continuous/periodic data, including a new value of the at least one independent variable, has been received by the processor 110. More particularly, in this embodiment block 402 enables the processor 110 to continuously or periodically receive new values of the at least one independent variable, the new values including new environmental sensor data inputs, each of the sensor data inputs including at least a new stage value and a new measurement time value, but excluding any observation of the dependent variable (discharge), which is to be calculated by the system 100. In this embodiment, the processor 110 receives such continuous/periodic data in the form of measurement signals transmitted by one or more of the remote sensors 192 disposed in the environment or by a remote data logger disposed in proximity to the remote sensors. More particularly, in this embodiment the remote sensors 192 transmit measurement signals encoding each of their respective measurements to the automated data logger and transmitter 193, which accumulates and periodically re-transmits the measurement signals to the processor 110. In this embodiment, the measurement signals include at least time and stage values representing a water level of a waterway as measured by one or more stage sensors such as the sensor 192 disposed in the waterway.

Upon receipt of new continuous/periodic data, block 404 directs the processor 110 to store the new data in the continuous/periodic data store 202 in the database 106, and to pre-process the new data in the manner described above in connection with block 302 of the environment modelling routine 300. In this embodiment, block 404 directs the processor 110 to store both the raw data and the pre-processed data in the continuous/periodic data store 202 in the database 106, and to copy the pre-processed data to a new continuous/periodic data store 144 in the RAM 120.

In this embodiment, block 406 then directs the processor 110 to use the main GP model to generate and perceptibly output a predictive probabilistic representation of a range of possible values of the dependent observed physical environmental property corresponding to the new value of the at least one independent variable, the predictive probabilistic representation having moments including an expected value of the dependent variable and a variance, in the manner described above in connection with the environment modelling routine 300. More particularly, in this embodiment block 406 directs the processor 110 to co-operate with the output device 114 to generate and perceptibly output a new expected flow rate (discharge) value and a new flow rate variance value corresponding to the new stage and new measurement time values. To achieve this, in this embodiment block 406 first directs the processor to load into the hyperparameters store 132, the most recently optimized hyperparameters from the optimized hyperparameters store 214 in the database 106, for the model to which the incoming data corresponds. Block 406 then directs the processor to construct all covariance matrices and the $K_q$ and $k_q$ terms in equations (23) and (24), and to use equations (25) and (27) to generate an expected value $\mathbb{E}$ and variance $\mathbb{V}$ for each new data point in the new continuous/periodic data store 144, in a manner similar to block 336 above.

Figure 5A:
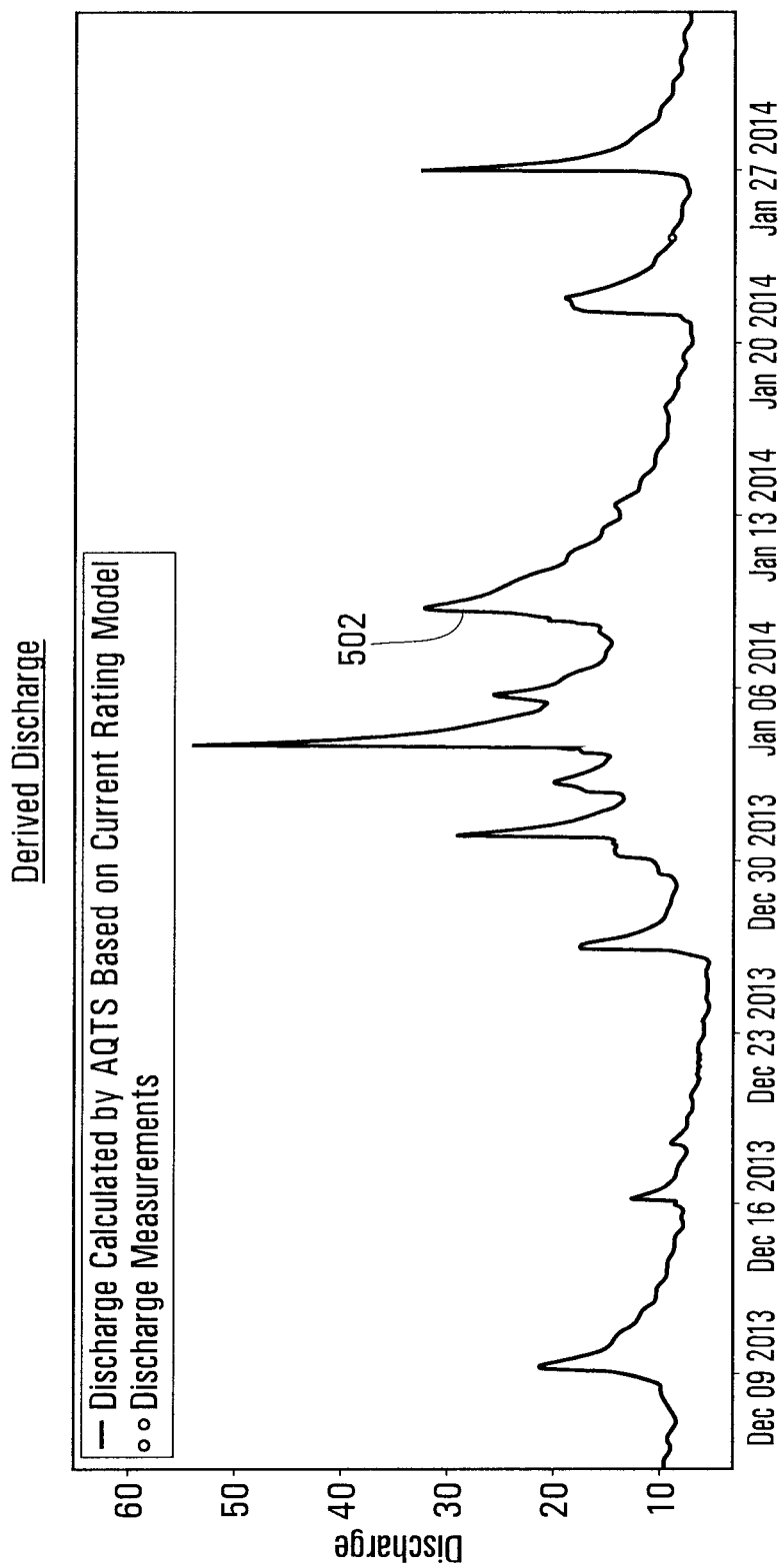
FIGS. 5A and 5B graphically depict a representation of discharge without uncertainty information, and a predictive probabilistic representation of discharge including an expected value and a variance, respectively.
Figure 5B:
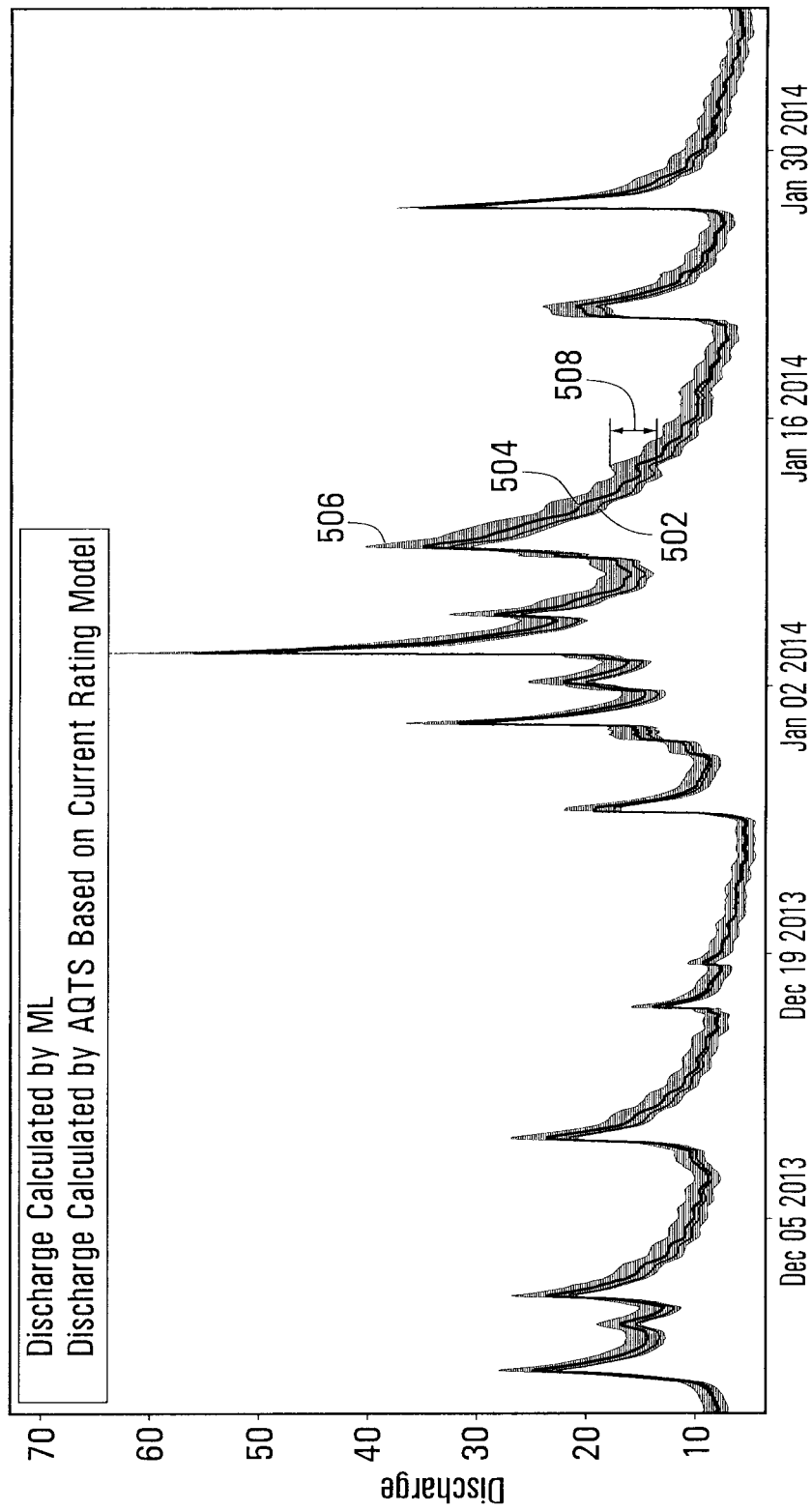

Block 408 then directs the processor 110 to post-process the resulting predictive probability distributions to reverse the effect of pre-processing at block 404, and block 410 then directs the processor 110 to communicate with the client computer 107 to cause the video display device 117 to perceptibly output a probabilistic rating representation comprising the expected value curve and the variance band of the predictive probability distributions (i.e., $\mathbb{V}[y^*|X, y, x^*]$ and $\mathbb{E}[f^*|X, y, x^*]$), in a manner similar to that shown in FIG. 5B and discussed above in connection with the environment modelling routine 300.

If no new continuous/periodic data was detected at block 402, or after execution of blocks 404-410 if new continuous/periodic data was detected, block 412 then directs the processor 110 to determine whether it has received new field data including at least one new discrete field observation of the at least one independent variable and the dependent variable, from the discrete measurement remote uploading device 194 or from the client computer 107. If so, block 414 directs the processor 110 to append the new discrete data to the discrete observations store 204 in the database 106, and then directs the processor 110 to re-execute the environment modelling routine 300 in its entirety, thereby re-generating the environmentally adapted covariance matrix, the combined input and output noise levels matrix, and ultimately the main GP model, to take into account the new field data. Alternatively, if discrete data are received more frequently than a user wishes to re-optimize the hyperparameters, block 414 may impose a predefined or user-defined minimum interval between successive re-optimizations.

Alternatives

Other embodiments may involve variations of the above methods. For example, in the environment modelling routine 300 described above, the iterative optimization is performed by optimizing hyperparameters for GPM (which starts from GP1) and GP2 separately with standard GP optimization and using the main optimization convergence criteria (objective function) composed of sum of the marginal likelihood functions for both GPs as described in connection with step 9 (block 326) to end the iterative loop. In an alternative embodiment, however, the composite objective function for both GPs is used at step 9 to adjust all hyperparameters for GPM and GP2 at each iteration. Generally, although the method of the environment modelling routine 300 described above tends to converge with high accuracy, this alternative embodiment may tend to achieve convergence faster for some large data sets. However, for environmental discrete observations such as stage-discharge, the optimization method of the environment modelling routine 300 has tended to outperform the alternative method in both performance and accuracy and has therefore been presented as the main embodiment above.

Figure 7A:
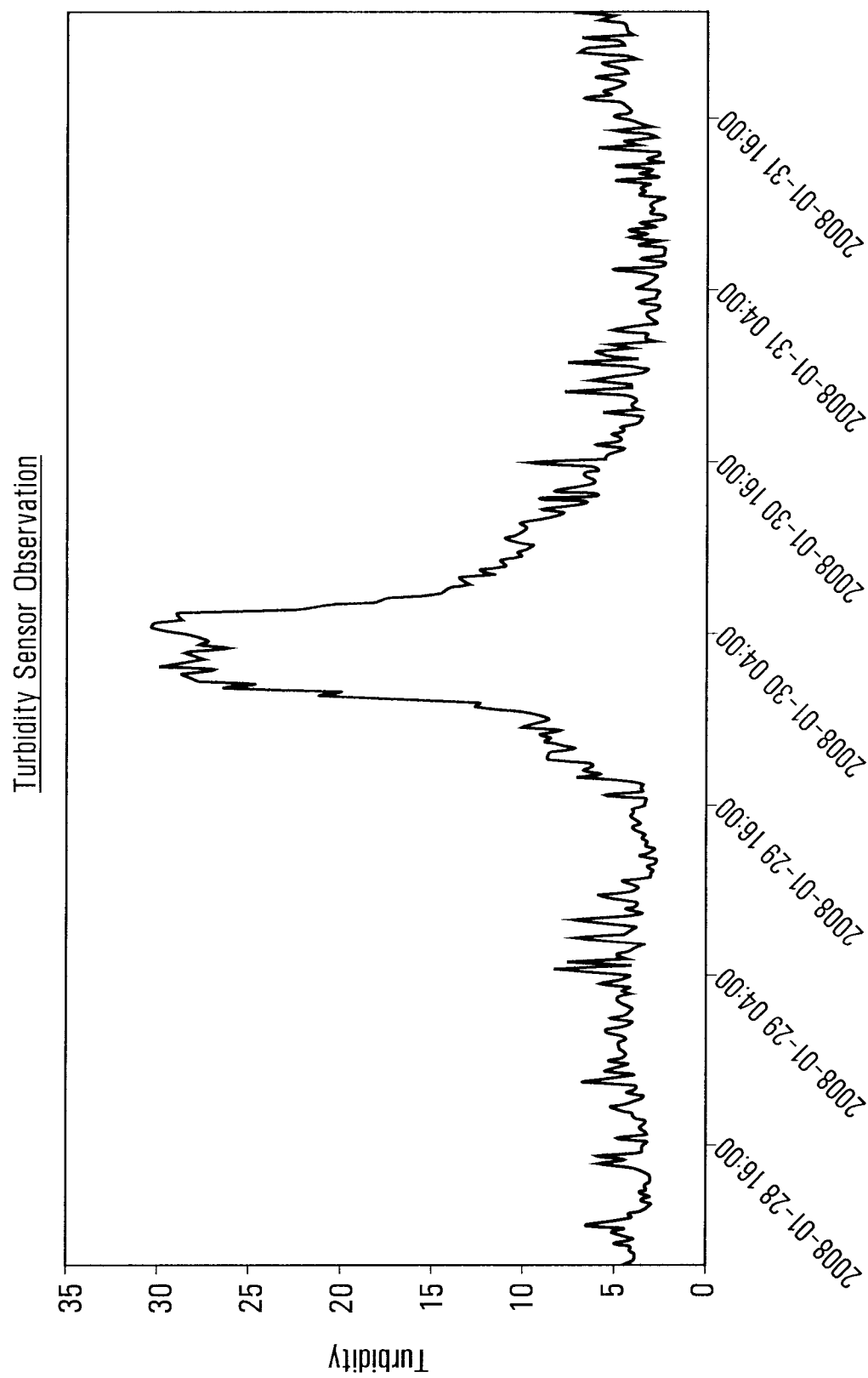
FIGS. 7A and 7B graphically depict a representation of turbidity without uncertainty information, and a predictive probabilistic representation of turbidity including an expected value and a variance, respectively.
Figure 7B:
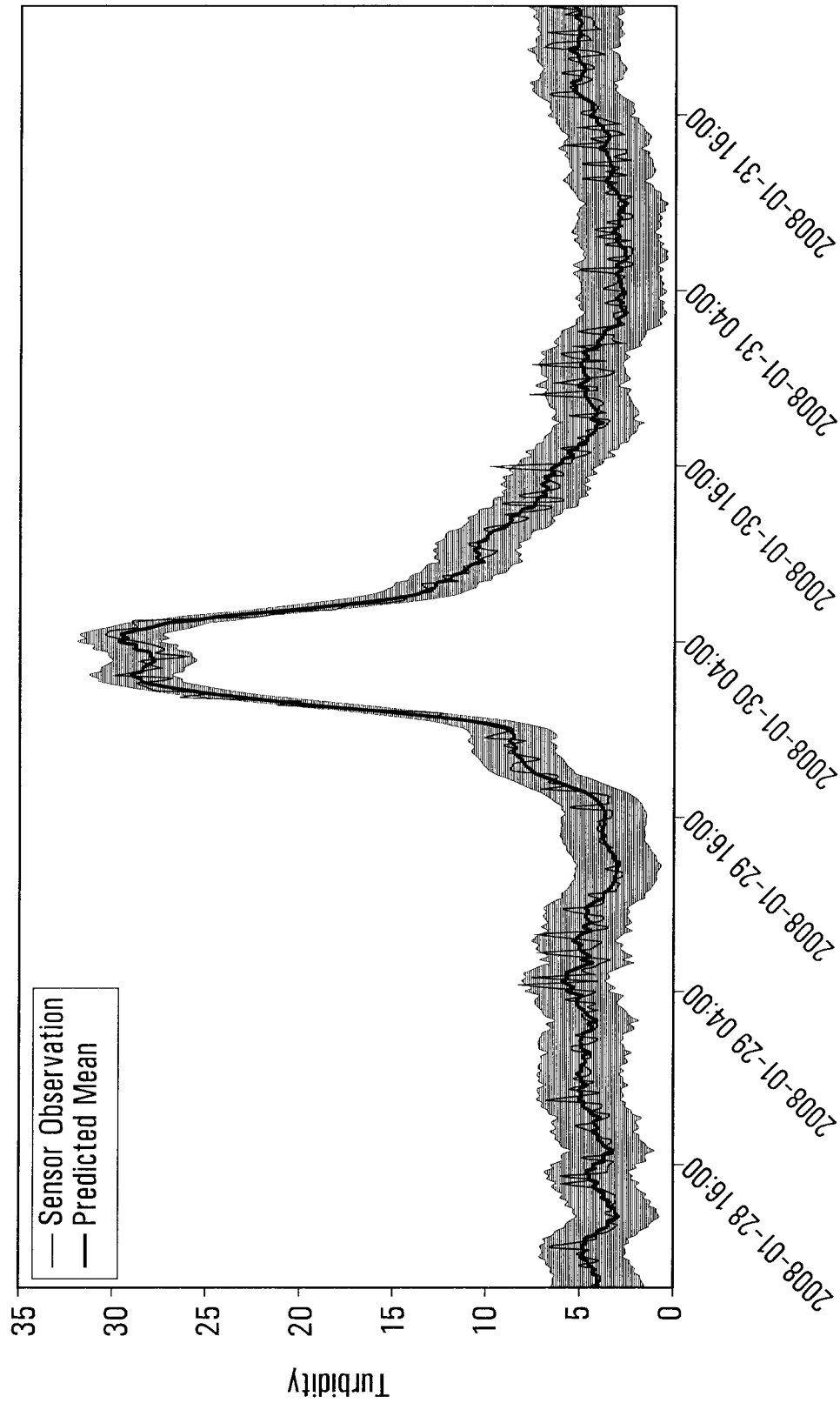

Although the main embodiment described above has focused on hydrometric data, in which the independent variable inputs are stage and time and the dependent variable is discharge, other embodiments of the invention may be successfully applied to other types of environmental data. For example, FIGS. 7A and 7B show the application of similar techniques to water quality data, specifically turbidity data. More generally, the techniques described herein may be applicable to any environmental property for which discrete observations are obtained, such as E. coli levels, phosphorus levels, etc. As with the main embodiments discussed above, for such alternative embodiments involving other types of environmental data, a composite covariance function comprising a rational quadratic stationary term and a non-stationary term may be employed, although the precise form of the non-stationary and stationary terms may differ from those employed for stage-discharge data. For example, the composite covariance function for an illustrative water quality embodiment may include a rational quadratic term as the stationary term in combination with a linear term as the non-stationary term. In such an embodiment, the rational quadratic term allows nonlinear aspects of both time and other independent variable(s) to be accurately modeled, while the linear term improves accuracy as the model extends into extreme high and low values of the independent variables for which few or no observations may be available.

As a further example, the methods of the present disclosure may also be applied in different ways to hydrometric data. For example, rather than focusing on discharge as the dependent observed environmental property, for some applications it may be desirable to focus on stage (water level) as the dependent observed property, while the independent variable may comprise a pressure transducer measurement from a sensor that calculates stage measurements from observed pressure measurements.

As a further example, another hydrometric application of the methods described herein relates to index velocity. The methods generally proceed in the same manner as described earlier herein, but with a higher-dimensional covariance function to accommodate a larger number of independent variables. For example, the independent variables may include time, and may further include one to many index velocity measurements from a plurality of Acoustic Doppler Velocity Meters (ADVMs), either for individual cells or cell average signals. If desired, the independent variables may further include stage (water level). The dependent variable may be discharge, or may be overall mean velocity. Generally, such use of discharge as a dependent variable correlated with index velocity as an independent variable is not believed to be known in the art. Such embodiments tend to provide more accurate estimates for discharge when directly modeled with index velocity, or with both index velocity and stage, as predictors (independent variables). In addition, such embodiments tend to simplify relevant hydro acoustic methodologies and protocols. For example, a conventional cross section survey to measure area (to multiply it by mean velocity to get discharge) is no longer necessary in such embodiments, and the elimination of this step tends to reduce the uncertainty associated with the final estimate of discharge. The relationship between the dependent and independent variables tends to be close to linear (in linear space, without logarithmic pre-processing) but changing over time. In such an embodiment, the composite covariance function preferably includes both a non-stationary linear term, which assists in modeling extreme high and low values of the independent variables, and a stationary rational quadratic term, which assists in modeling nonlinear aspects of both time and other independent variable(s), as discussed above.

Figure 7C:
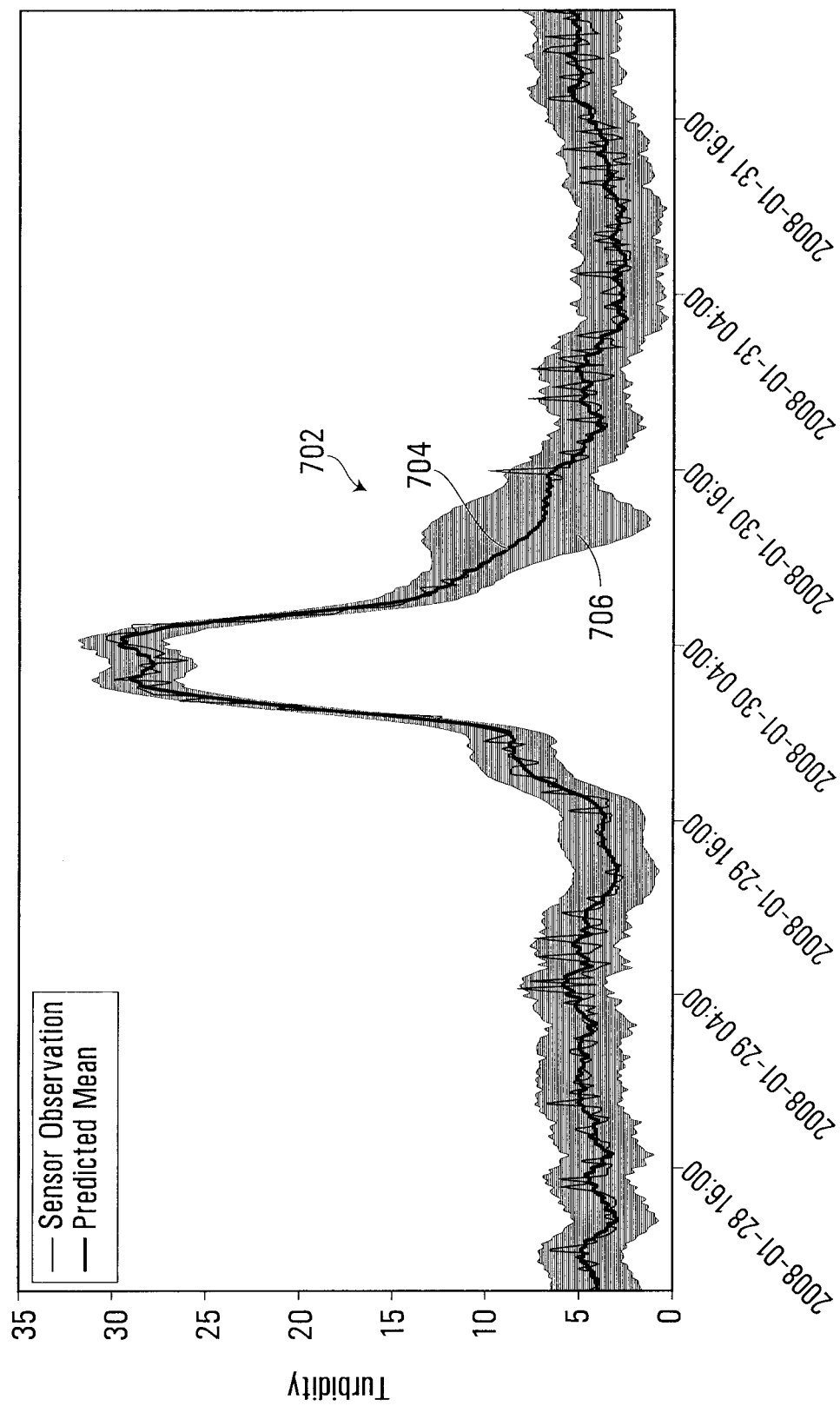
FIG. 7C graphically depicts a gap-filling function of the system of FIG. 1.

As another example, referring to FIGS. 3 and 7C, the present embodiment also advantageously presents the user with a gap-filling option. In this regard, there may be time intervals for which no data, neither manual nor automated sensor data, is available, even for the independent physical environmental property or properties. In this embodiment, any such gaps in the independent physical environmental property data can be filled by executing the environment modelling routine 300 above in only a slightly different manner, by treating what was previously considered to be the "independent" physical environmental property as if it were the dependent or output property, and treating time as the sole independent variable. With continuous sensor data, for example, the only independent variable is time steps and the dependent variable is the actual observed property values so there is no independent variable noise. In equation (9), $\varepsilon_{yi}=e_y(t_i)$ which is still a function of input time, and $K_y=\text{diag}\{\sigma_{yi}^2\}_{i=1}^n$ and also $k_{y,*}=\sigma_{y,*}^2$. With this simplification, step 3 in the iterative process (block 314 above) can be skipped and no derivative calculation is needed. Otherwise, the environment modelling routine 300 may be executed as described above, to yield expected values and variances for the missing data, and to cause the display device to perceptibly display them. For example, referring to FIG. 7A, if no input data is available for a particular gap 702, block 320 may nevertheless generate probability distributions, comprising an expected value 704 and variance 706 for each possible input in a given range. (FIGS. 7A-7C depict turbidity sensor data rather than discharge, but the advantageous effects are similar for other types of environmental sensor data.) This process can be run online when new continuous observations are received. This type of model is referred to as a single sensor data model since there is no predictor except time.

Figure 8:
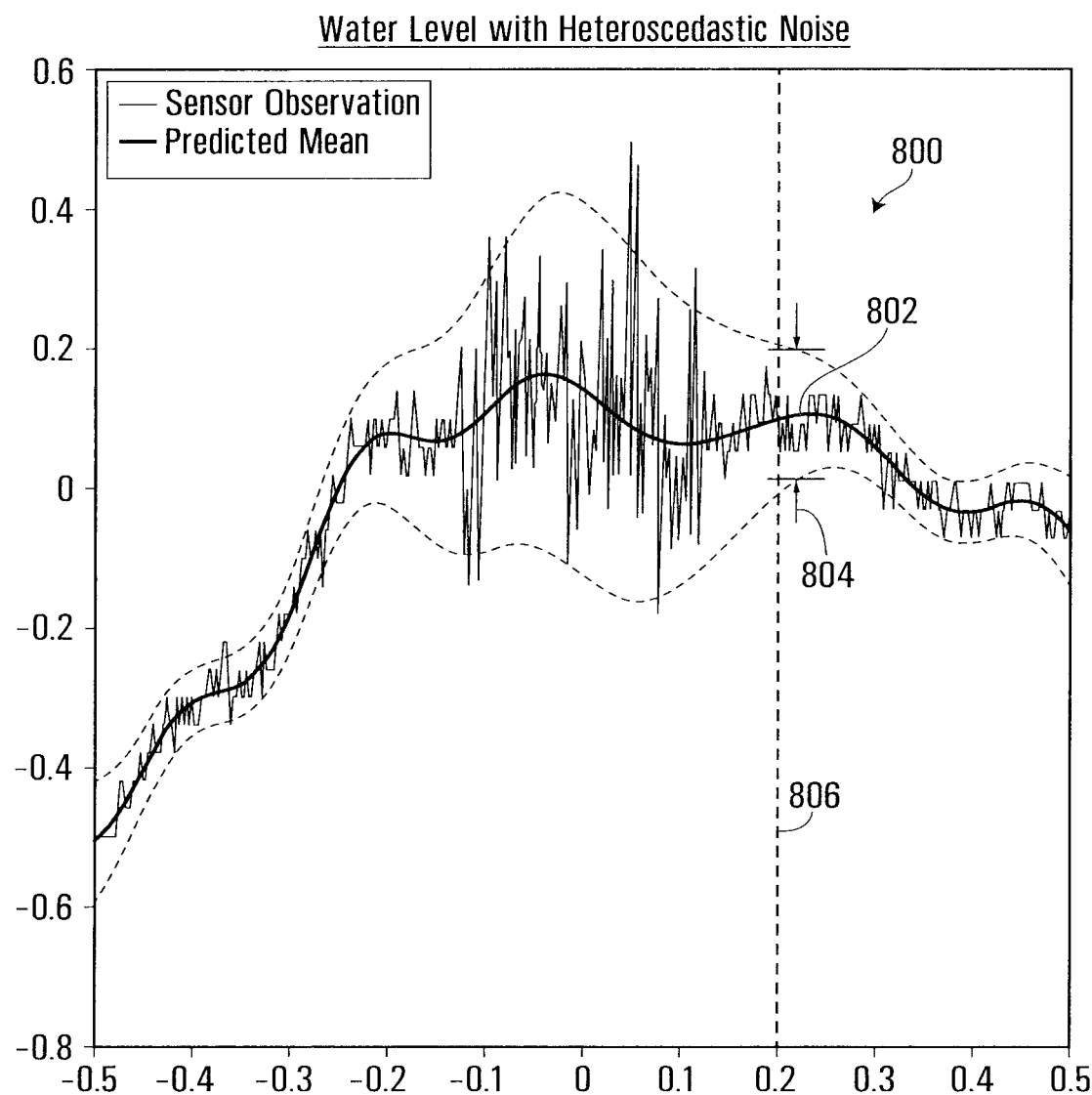
FIG. 8 graphically depicts a predictive probabilistic representation of stage (water level) including an expected value and a variance.

Similarly, referring to FIG. 8, such a "single sensor" data model may also be used to estimate input noise, if input noise is not known. For example, in relation to stage-discharge relationships, time may be treated as the sole independent variable, stage (water level) may be treated as the sole dependent variable, and the environment modelling routine 300 may otherwise be applied as described above. Thus, in FIG. 8, a predictive probabilistic representation of stage (water level) is shown generally at 800 in FIG. 8, and includes an expected stage value 802 and a variance 804 representing noise associated with each such stage value. (FIG. 8 in fact shows a predictive probabilistic representation of continuous/periodic sensor data as generated above at blocks 406 to 410 with heteroscedastic input noise represented by the variance 804, but a predictive probabilistic representation of discrete field observations of stage would have the same general form as FIG. 8.) Referring back to FIG. 3A, in such an alternative embodiment, if at block 304 it is determined that input noise is unavailable, then before executing the remainder of the environment modelling routine 300, an additional block 305 of codes directs the processor 110 to generate input noise values $\sigma_{s1} \ldots \sigma_{sn}$ by executing blocks 308 to 320 treating time as the sole independent variable and stage as the dependent variable, in order to generate "output" stage noise values given by equation (79) above, which are then treated as the "input" stage noise values $\sigma_{s1} \ldots \sigma_{sn}$ accompanying the training data for a subsequent execution of blocks 308-342 treating stage and time as independent variables and discharge as the dependent variable. In such an embodiment, block 305 directs the processor 110 to store the generated stage noise values $\sigma_{s1} \ldots \sigma_{sn}$ in the input noise portion of the available uncertainty store 128 in the RAM 120.

Example

Hydroelectric Power Generation Station Spillway Control

Figure 9:
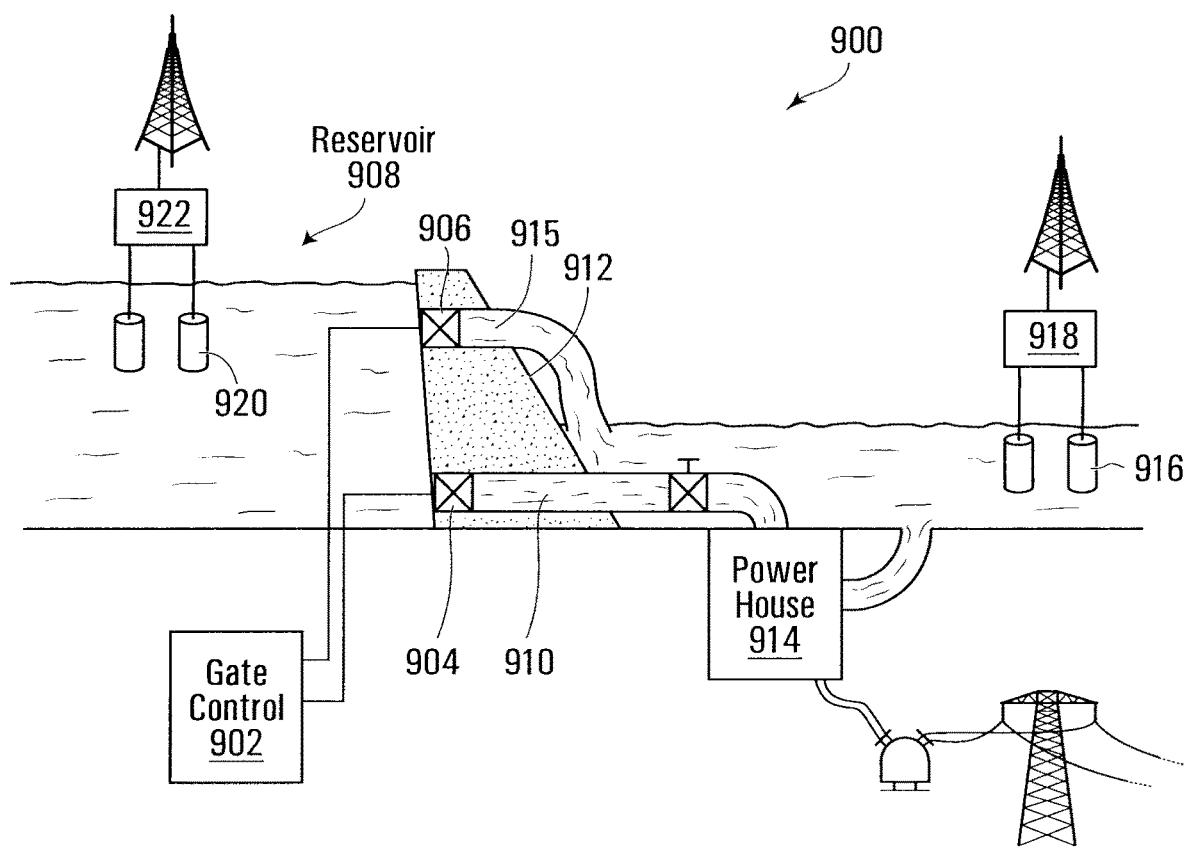
FIG. 9 is a schematic representation of a hydroelectric power generation station including a spillway controlled in accordance with an embodiment of the present disclosure.

Referring to FIGS. 1, 8 and 9, a flow control system for a hydroelectric power generation station having a spillway, according to another illustrative embodiment, is shown generally at 900 in FIG. 9.

In this embodiment, the flow control system 900 includes a gate control system 902 for controlling a power generation gate 904 and a spillway gate 906, which in this embodiment include electro-mechanical gates. In this embodiment, the power generation gate 904, when opened, allows water to flow from a reservoir 908 through a power house conduit 910 defined through a dam 912, and then through a power house 914 to drive a turbine and generator, to thereby generate electricity. The spillway gate 906, when opened, allows water to flow from the reservoir 908 through a spillway conduit 915 defined through the dam 912, to thereby bypass the power house 914. More particularly, in this embodiment the gate control system 902 includes an environment monitoring system similar to the system 100 shown in FIG. 1, in communication with electromechanical actuators (not shown) to enable the processor of the gate control system 902 to open and close the power generation gate 904 and the spillway gate 906. In this embodiment, the gate control system 902 includes downstream stage sensors such as that shown at 916 for measuring the water level downstream of the dam 912, and upstream stage sensors such as that shown at 920 for measuring the water level in the reservoir 908 upstream of the dam 912, in communication with a processor of the gate control system 902 via respective automated data logger/transmitters 918 and 922.

In practice, there may be a number of different reasons why the operators of the hydroelectric power generation station may wish the spillway gate 906 to automatically open and close under certain circumstances, pertaining to a range of economical, social and environmental constraints. For example, applicable regulations may require the hydroelectric power generation station to maintain a minimum downstream stage (water level), to ensure continued viability of aquatic life. Alternatively, or in addition, regulations or riparian rights may require the hydroelectric power generation station to maintain a certain minimum downstream discharge (flow rate). Alternatively, or in addition, regulations or safety or engineering requirements may impose an upper limit for the stage (water level) of the upstream reservoir, and likewise operational requirements to keep the power house 914 operating may impose a lower limit for upstream stage. More generally, constraints (such as a maximum or minimum) upon the upstream or downstream stage or discharge may be imposed. In some cases, two or more of these and other similar constraints apply. For ease of illustration, however, for the remainder of the discussion of this embodiment it is simplistically assumed that the only constraint is a requirement for downstream stage (water level) to remain above a minimum threshold.

Referring back to FIG. 8, consider the dilemma of a hypothetical hydroelectric power generation station lacking the benefit of the present embodiment. Typically, using conventional environmental modeling techniques, the operator of the hydroelectric power generation station might be provided with graphical information resembling the curve of expected stage values 802 and the individual data points for which it was generated, but not with the heteroscedastic combined variance band represented by the values of the variance 804 indicated by the dashed lines in FIG. 8. Consequently, the operator of the generation station would conventionally have to empirically determine an appropriate safety margin to account for the possibility of measurement error or noise. Since information regarding uncertainty is often unavailable in conventional systems, there may be a tendency to adopt a stationary, constant safety margin. However, from FIG. 8 it can be seen that a single, constant safety margin would not result in efficient or successful functioning of the hydroelectric generation station. If such a margin were set high enough to ensure that the spillway gate always opens before the minimum threshold is reached, then the constant safety margin would have to be so large that the spillway 906 would often be opened unnecessarily. For example, if a conventional hydroelectric station operator coincidentally selected as a safety margin, a value equal to the maximum height of the heteroscedastic variance band of values of the variance 804, corresponding to the large variance near the center of FIG. 8, then it can be readily seen that the safety margin would be unnecessarily large at the left and right regions of FIG. 8. In those latter regions, the spillway gate 906 would be frequently opening unnecessarily, because the difference between the measured downstream water level and the minimum threshold level would frequently be less than the massive safety margin, even though the true values of the downstream stage would not actually fall below the minimum threshold. This results in lost potential energy and therefore reduced energy efficiency of the hydroelectric power generation station: every time the spillway is opened and water from the reservoir is allowed to flow downstream, the gravitational potential energy that had been previously stored in the water when it was in the reservoir 908, which could have been converted into electricity if the water had been allowed to flow through the power house 914, is instead lost. There is therefore, in practice, a competing desire to minimize the opening of the spillway gate, in order to minimize such energy loss. However, if the operator of the hydroelectric station were to adopt too small a constant safety margin, it can readily be seen from FIG. 8 that there could be numerous instances in which an adopted safety margin could be too small to account for the actual uncertainty underlying the measurements. For example, if one were to look at the local stage data spanning the region in which the independent variable value ranges from 0.15 to 0.25 in FIG. 8, one might think it would be safe, at least for that region, to adopt a safety margin such that 100% of the measured stage values in that region were within the safety margin. However, with the added benefit of the heteroscedastic combined variance band represented by the values of the variance 804 of the present embodiment, it can immediately be seen that such a safety margin would in fact be considerably smaller than the actual uncertainty surrounding the expected stage values in this region. Consequently, adopting a smaller fixed safety margin to try to improve energy efficiency may in fact result in situations in which the spillway gate 906 fails to open when required to do so, if the adopted safety margin was less than the difference between the measured and true downstream stage values.

To address the above difficulties, in this embodiment the processor of the gate control system 902 executes the environment modelling routine 300 and the environment monitoring thread 400, wherein the physical environmental property represented by the dependent variable comprises stage, wherein the stage represents a measured water level of the waterway. The processor of the gate control system then receives a new measured stage value, and uses the main GP model to generate and perceptibly output a predictive probabilistic representation of a range of possible stage values corresponding to the new measured stage value. The gate control system processor then causes the spillway to be opened if the range of possible stage values includes any value below a predefined minimum stage threshold value, regardless of whether the new measured stage value is below the threshold value.

Alternatively, as noted above, the decision to open the spillway gate 906 may be based on other factors, including upstream reservoir stage, downstream or upstream discharge (flow rates), or combinations thereof, for example. For example, if discharge is one of the factors, the processor of the gate control system 902 executes the environment modelling routine 300 with discharge (flow rate) as the dependent variable and with stage and time as the independent variables. Rather than a conventional rating curve such as that shown at 502 in FIG. 5A, the processor of the gate control system 902 would thus model and represent the discharge with an expected value curve 504 in conjunction with a heteroscedastic combined variance band 506 as shown in FIG. 5B and as discussed earlier herein. As new current measurements of stage and time are received, the processor generates a predictive probabilistic representation of a range of possible discharge values for each new measurement of stage and time. If it is desired to maintain a minimum downstream flow rate, the processor of the gate control system 902 causes the spillway to be opened if the range of possible discharge values for the new stage and time measurement includes any value below a predefined minimum discharge threshold value, or in other words if any part of the heteroscedastic combined variance band 506 corresponding to the new stage and time measurement crosses below the minimum discharge threshold value, regardless of whether the expected discharge, represented by the value of the expected value curve 504 for the new stage and time measurement, is below the threshold value. Conversely, if a maximum downstream flow rate applies then the processor of the gate control system 902 causes the spillway gate 906 to be closed if any part of the heteroscedastic combined variance band 506 rises above a maximum discharge threshold value. More generally, if desired, multiple control parameters involving stage and/or discharge may be used to control the operation of the spillway gate 906, either applied separately, or combined in a single control function.

In another similar embodiment, a civic flood warning system includes an environment modeling system similar to the systems 100 and 900. A processor of the flood warning system executes the environment modelling routine 300 and the environment monitoring thread 400, and similarly receives new stage values and uses the main GP model to generate and perceptibly output a predictive probabilistic representation of a range of possible stage values corresponding to the new measured stage value. The flood warning system will then activate a civic flood warning, such as an evacuation warning, if the range of possible stage values includes any value above a predefined maximum stage threshold value, regardless of whether the new measured stage value is above the threshold value. As with the hydroelectric power generation station embodiment, variations of the above flood warning system may alternatively activate the civic flood warning based on discharge measurements, or on combinations of stage and discharge measurements.

Although a specific computerized system 100 was shown above in FIG. 1 and a specific processor 110 and its instruction set architecture were illustrated above in FIGS. 2B and 2C, alternatively, other computerized systems and other types of processors may be substituted. However, although other types of processors may be substituted, the use of some type of hardware processor is nevertheless essential, in the sense that neither the steps nor the results accomplished by the illustrative embodiments described herein could be achieved without the use of a processor, by disembodied or purely mental means. At least some of the technical advantages that were described above in connection with the processor 110, including avoidance of intractability to enable a solution to be achieved by a combination of native instructions of the instruction set architecture of the processor 110, and reducing the number of floating-point operations that the processor must execute to arrive at a solution, would apply equally to either a processor with a different structural microarchitecture that configures it to have the same instruction set architecture (ISA) as the processor 110, or to a processor with a different microarchitecture and different ISA than the processor 110. For the purpose of the designation of Canada in the present PCT international application, wherever a processor is referenced in the claims appended below: (1) for the purpose of the material effects principle (e)(iii) of the judgment of the Supreme Court of Canada in *Free World Trust v. Électro Santé, Inc.*, (2000), 9 C.P.R. (4th) 168 (S.C.C.), it is believed that on the publication date of the present application, persons skilled in the art would not have known of any variants or substitutes for a processor, which would have performed substantially the same function in substantially the same way to achieve substantially the same results as a processor; and (2) for the purpose of the intent-of-the-inventor principle (e)(iv) of *Free World Trust*, the inventor and the applicant intend that the processor and its use are essential elements of the system claims and method claims in which they are respectively recited.

In addition to the embodiments described above, it is contemplated that any one or more features of any particular embodiment may be combined with any one or more features of any other embodiment, except where such features have been explicitly described as mutually exclusive alternatives.

More generally, while specific embodiments have been described and illustrated, such embodiments should be considered illustrative only and not as limiting the invention as defined by the accompanying claims.

What is claimed is:

1. A computer-implemented method of monitoring a physical environmental property that has non-stationary heteroscedastic noise, the method comprising:
  a processor receiving physical environmental measurement data comprising measured values of:
    a dependent variable which represents the physical environmental property; and
    at least one independent variable with which the physical environmental property is correlated;
  the processor constructing a combined input and output noise levels matrix containing output noise terms associated with the physical environmental property and input noise terms associated with the at least one independent variable with which the physical environmental property is correlated;
  using the combined input and output noise levels matrix, the processor constructing a main Gaussian Processes (GP) model that models the physical environmental property and its non-stationary heteroscedastic noise; and the processor co-operating with an output device to generate and perceptibly output a predictive probabilistic representation of the environmental property, using the main GP model, wherein the predictive probabilistic representation comprises a respective range of possible values of the physical environmental property for each respective value of the at least one independent variable, the range of possible values reflecting both the input noise terms associated with the independent variable and the output noise terms associated with the physical environmental property.

2. A computer-readable medium storing instructions which, when executed by a processor, cause the method of claim 1 to be carried out.

3. A system for monitoring a physical environmental property that has non-stationary heteroscedastic noise, the system comprising:
   a database defined in a storage medium and configured to receive and store physical environmental measurement data comprising measured values of:
      a dependent variable which represents the physical environmental property; and
      at least one independent variable with which the physical environmental property is correlated;
   a processor in communication with the storage medium;
   a communications interface in communication with the processor;
   an output device in communication with the processor; and
   a computer-readable medium in communication with the processor;
   wherein the computer-readable medium stores executable instructions that configure the processor to execute a method comprising:
   the processor receiving the physical environmental measurement data;
   the processor constructing a combined input and output noise levels matrix containing output noise terms associated with the physical environmental property and input noise terms associated with the at least one independent variable with which the physical environmental property is correlated;
   using the combined input and output noise levels matrix, the processor constructing a main Gaussian Processes (GP) model that models the physical environmental property and its non-stationary heteroscedastic noise; and
   the processor generating and co-operating with the output device to perceptibly output a predictive probabilistic representation of the environmental property, using the main GP model, wherein the predictive probabilistic representation comprises a respective range of possible values of the physical environmental property for each respective value of the at least one independent variable, the range of possible values reflecting both the input noise terms associated with the independent variable and the output noise terms associated with the physical environmental property.

4. The system of claim 3, wherein:
   the predictive probabilistic representation comprises, for each respective value of the at least one independent variable, an expected value of the physical environmental property and an associated variance;
   the output device comprises a video display device or a printer; and
   the instructions that configure the processor to co-operate with the output device comprise instructions that configure the processor to co-operate with the video display device or the printer to output a graphical representation of an expected value curve and a heteroscedastic combined variance band that reflects both the input noise terms and the output noise terms, wherein the expected value curve comprises the expected values of the physical environmental property, wherein the heteroscedastic combined variance band extends above and below the expected value curve, and wherein a height of the heteroscedastic combined variance band for a particular expected value is proportional to the associated variance for the particular expected value.

5. The system of claim 3, wherein the instructions further configure the processor to co-operate with the output device to generate and perceptibly output a time-varying rating surface or hypersurface reflecting the evolution over time of a relationship between the dependent observed physical environmental property and the at least one independent observed physical environmental property.

6. The system of claim 3, wherein the instructions further configure the processor to co-operate with the output device to generate and perceptibly output a rating hypersurface comprising an expected value of the dependent observed physical environmental property for each combination of values of the at least one independent variable.

7. The system of claim 3, wherein the instructions further configure the processor to:
   receive a new value of the at least one independent variable through the communications interface;
   use the main GP model to generate, and cause the output device to perceptibly output, a predictive probabilistic representation of a range of possible values of the dependent observed physical environmental property corresponding to the new value of the at least one independent variable, the predictive probabilistic representation having moments including an expected value of the dependent variable and a variance.

8. The system of claim 3 wherein the instructions further configure the processor to:
   receive new field data comprising at least one new discrete field observation of the at least one independent variable and of the dependent variable; and
   re-generate the combined input and output noise levels matrix and the main GP model to take into account the new field data.

9. The system of claim 3, wherein the physical environmental data comprises hydrological data relating to a waterway and the at least one independent variable comprises stage and time, wherein the stage represents a measured water level of the waterway and the time represents a time at which the water level was measured, and wherein the dependent variable comprises a flow rate of the waterway at the time.

10. The system of claim 9 wherein the instructions further configure the processor to generate and perceptibly output a three-dimensional rating surface comprising an expected value of the flow rate for each combination of values of stage and time.

11. The system of claim 9 wherein the instructions further configure the processor to:
   continuously or periodically receive new values of the at least one independent variable, the new values comprising new environmental sensor data inputs, each of the inputs comprising at least a new stage value and a new measurement time value; and co-operate with the output device to generate and perceptibly output a new expected flow rate value and a new flow rate variance value corresponding to the new stage and new measurement time values.

12. The system of claim 3, wherein:
the instructions that configure the processor to construct the combined input and output noise levels matrix comprise instructions that configure the processor to:
construct a simplified GP model representing the physical environmental property with stationary noise independent of inputs; and
use the simplified GP model to construct a noise GP model representing noise levels associated with the environmental property; and
the instructions that configure the processor to construct the main GP model comprise instructions that configure the processor to use the simplified GP model and the noise GP model to construct the main GP model.

13. The system of claim 12, wherein the instructions that configure the processor to construct the simplified GP model comprise instructions that configure the processor to estimate hyperparameters of the simplified GP model.

14. The system of claim 12, wherein the instructions that configure the processor to construct the noise GP model comprise instructions that configure the processor to:
generate an average value of the simplified GP model for each of a plurality of training points;
generate an empirical error term of the simplified GP model for at least some of the plurality of training points;
construct a training data set for the noise GP model using the empirical error terms; and
estimate hyperparameters of the noise GP model.

15. The system of claim 12, wherein:
the instructions that configure the processor to construct the main GP model comprise instructions that configure the processor to generate output noise levels for the main GP model using the noise GP model;
the instructions that configure the processor to construct the combined input and output noise levels matrix comprise instructions that configure the processor to generate the combined input and output noise levels matrix for the main GP model using the generated output noise levels; and
the instructions that configure the processor to construct the main GP model comprise instructions that configure the processor to estimate hyperparameters of the main GP model using the combined input and output noise levels matrix.

16. The system of claim 3, further comprising one or more remote sensors disposed in the environment and configured to measure at least the at least one independent variable, and wherein the instructions that configure the processor to receive the physical environmental measurement data comprise instructions that configure the processor to receive measurement signals transmitted by either the one or more remote sensors or by an associated remote data logger disposed in the environment in proximity to the remote sensors.

17. The system of claim 16 wherein the one or more remote sensors comprise one or more stage sensors disposed in a waterway, and wherein the instructions that configure the processor to receive the measurement signals comprise instructions that configure the processor to receive at least time and stage values representing a water level of a waterway as measured by the one or more stage sensors disposed in the waterway.

18. The system of claim 3 wherein:
the processor comprises a hardware processor structurally configured to perform only a predefined set of native operations in response to receiving corresponding instructions selected from a predefined instruction set architecture of the processor;
the instructions that configure the processor to receive the physical environmental measurement data comprise a first set of machine codes selected from the instruction set architecture;
the instructions that configure the processor to construct the combined input and output noise levels matrix comprise a second set of machine codes selected from the instruction set architecture;
the instructions that configure the processor to construct the main GP model comprise a third set of machine codes selected from the instruction set architecture;
the instructions that configure the processor to co-operate with the output device to generate and perceptibly output the predictive probabilistic representation comprise a fourth set of machine codes selected from the instruction set architecture; and
the first, second, third and fourth sets of machine codes selected from the instruction set architecture are stored in the computer-readable medium.

19. A system for controlling a spillway of a hydroelectric power generation station located in a waterway, the system comprising the system of claim 3, wherein the physical environmental property represented by the dependent variable comprises stage, wherein the stage represents a measured water level of the waterway, and wherein the instructions further comprise instructions that configure the processor to:
receive a new measured stage value;
use the main GP model to generate and perceptibly output a predictive probabilistic representation of a range of possible stage values corresponding to the new measured stage value; and
cause the spillway to be opened if the range of possible stage values includes any value below a predefined minimum stage threshold value, regardless of whether the new measured stage value is below the threshold value.

20. An environmental monitoring system comprising:
a storage medium comprising a database storing physical environmental data comprising values of:
at least one independent variable; and
a dependent variable representing a dependent observed physical environmental property that is correlated with the independent variable;
a processor in communication with the storage medium;
a communications interface in communication with the processor;
an output device in communication with the processor; and
a computer-readable medium in communication with the processor;
wherein the computer-readable medium stores executable instructions that configure the processor to:
use a composite covariance function to generate an environmentally adapted covariance matrix corresponding to the values of the at least one independent variable, the composite covariance function comprising at least one stationary term comprising a rational quadratic term, and at least one non-stationary term;

receive a new value of the at least one independent variable through the communications interface; and use the environmentally adapted covariance matrix and the physical environmental data to generate a predictive probabilistic representation of a range of possible values of the dependent observed physical environmental property corresponding to the new value of the at least one independent variable, the predictive probabilistic representation having moments including an expected value of the dependent variable and a variance; and cause the output device to perceptibly output the predictive probabilistic representation.

* * * * *